US010534465B2

(12) United States Patent
Katsuta et al.

(10) Patent No.: US 10,534,465 B2
(45) Date of Patent: Jan. 14, 2020

(54) DISPLAY DEVICE

(71) Applicant: Japan Display Inc., Tokyo (JP)

(72) Inventors: Tadayoshi Katsuta, Tokyo (JP); Koji Noguchi, Tokyo (JP); Daisuke Ito, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/251,190

(22) Filed: Jan. 18, 2019

(65) Prior Publication Data

US 2019/0155434 A1 May 23, 2019

Related U.S. Application Data

(63) Continuation of application No. 15/469,657, filed on Mar. 27, 2017, now Pat. No. 10,228,788.

(30) Foreign Application Priority Data

Apr. 4, 2016 (JP) .................................. 2016-075162

(51) Int. Cl.
*G06F 3/045* (2006.01)
*G06F 3/041* (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/041; G06F 3/0412; G06F 3/0416; G06F 3/0418; G06F 3/044;
(Continued)

(56) References Cited

U.S. PATENT DOCUMENTS

| 5,990,629 A | 11/1999 | Yamada et al. |
| 9,218,085 B2 | 12/2015 | Hwang et al. |

(Continued)

FOREIGN PATENT DOCUMENTS

| JP | 2012-230657 A | 11/2012 |
| JP | 2014-164752 A | 9/2014 |

(Continued)

OTHER PUBLICATIONS

Korean Office Action dated Feb. 9, 2018 for the corresponding Korean Patent Appiication No. 10-2017-0041633, with partial translation.

(Continued)

*Primary Examiner* — Joe H Cheng
(74) *Attorney, Agent, or Firm* — Michael Best & Friedrich LLP

(57) ABSTRACT

A performance of a display device having an input device is improved. A display device includes: an electro-optical layer; a first driving electrode and a second driving electrode which drives the electro-optical layer; a driver chip which outputs a video signal; a switch circuit which is arranged outside the driver chip, which selects a potential to be supplied to the second driving electrode, and which includes a first switch element and a second switch element; a shift register circuit connected to the switch circuit; and a detection circuit which detects that an object is close or in contact. Each of the first switch element and the second switch element is selectively turned ON or OFF by the shift register circuit. The detection circuit is electrically connected to the first switch element and the second switch element.

12 Claims, 26 Drawing Sheets

(51) Int. Cl.
    *G06F 3/044* (2006.01)
    *G09G 3/36* (2006.01)
(52) U.S. Cl.
    CPC . *G09G 3/3648* (2013.01); *G06F 2203/04107* (2013.01); *G06F 2203/04108* (2013.01); *G09G 2354/00* (2013.01)
(58) Field of Classification Search
    CPC .......... G02F 1/13338; G02F 1/136286; G02F 1/1368; G09G 3/3677; G09G 3/3685
    See application file for complete search history.

(56) References Cited

U.S. PATENT DOCUMENTS

| | | | |
|---|---|---|---|
| 9,342,177 | B2 | 5/2016 | Seo et al. |
| 9,746,950 | B2 | 8/2017 | Fukushima et al. |
| 2010/0253638 | A1 | 10/2010 | Yousefpor et al. |
| 2012/0242615 | A1 | 9/2012 | Teraguchi et al. |
| 2012/0262387 | A1 | 10/2012 | Mizuhashi et al. |
| 2012/0274612 | A1 | 11/2012 | Sogabe et al. |
| 2013/0147724 | A1 | 6/2013 | Hwang et al. |
| 2013/0321296 | A1 | 12/2013 | Lee et al. |
| 2013/0335343 | A1 | 12/2013 | Lee et al. |
| 2014/0111446 | A1 | 4/2014 | Lee et al. |
| 2014/0240300 | A1 | 8/2014 | Katsuta et al. |
| 2014/0292700 | A1 | 10/2014 | Mizuhashi et al. |
| 2014/0292709 | A1 | 10/2014 | Mizuhashi et al. |
| 2014/0292711 | A1 | 10/2014 | Teranishi et al. |
| 2015/0084912 | A1 | 3/2015 | Seo et al. |
| 2015/0205433 | A1 | 7/2015 | Mizuhashi et al. |
| 2015/0220204 | A1* | 8/2015 | Noguchi ............... G06F 3/0412 345/174 |
| 2015/0355765 | A1 | 12/2015 | Fukushima et al. |
| 2015/0363016 | A1* | 12/2015 | Furutani .................. G09G 3/36 345/173 |
| 2015/0370401 | A1 | 12/2015 | Mizuhashi et al. |
| 2016/0225787 | A1* | 8/2016 | Katsuta ................. H01L 27/124 |
| 2016/0291786 | A1 | 10/2016 | Yokoi |
| 2016/0349881 | A1 | 12/2016 | Fukushima et al. |
| 2016/0370698 | A1 | 12/2016 | Kobayashi |
| 2017/0220153 | A1* | 8/2017 | Koide ..................... G06F 3/044 |
| 2017/0357353 | A1 | 12/2017 | Katsuta |
| 2017/0357355 | A1 | 12/2017 | Fukushima et al. |
| 2018/0130399 | A1* | 5/2018 | Mayumi ................. G06F 3/044 |
| 2018/0173367 | A1* | 6/2018 | Mayumi ................. G06F 3/044 |

FOREIGN PATENT DOCUMENTS

| | | |
|---|---|---|
| JP | 2014-199605 A | 10/2014 |
| JP | 2015-064854 A | 4/2015 |
| JP | 2015-122057 A | 7/2015 |
| JP | 2015-230599 A | 12/2015 |

OTHER PUBLICATIONS

Japanese Office Action dated Dec. 3, 2019 for the corresponding Japanese patent application No. 2016-075162, with machine English translation.

* cited by examiner

DISPLAY DEVICE

CROSS-REFERENCE TO RELATED APPLICATIONS

This application is a continuation of U.S. patent application Ser. No. 15/469,657, filed on Mar. 27, 2017, now U.S. Pat. No. 10,228,788 B2, which claims the foreign priority of Japanese Patent Application No. 2016-75162, filed on Apr. 4, 2016, the entire contents of which are hereby incorporated by reference into this application.

TECHNICAL FIELD OF THE INVENTION

The present invention relates to a display device. More particularly, the present invention relates to a display device including an input device.

BACKGROUND OF THE INVENTION

In recent years, there is a technique in which an input device called a touch panel or a touch sensor is attached on a display surface side of a display device, and in which an input position is detected and output when an input operation is performed by bringing an input tool such as a finger or a touch pen (also referred to as a stylus pen) close to or in contact with the touch panel. A display device having such a touch panel is widely used for not only computers but also portable information terminals such as mobile phones.

For example, Japanese Patent Application Laid-Open Publication No. 2015-64854 (Patent Document 1) describes a display device integrated with a touch screen in which a touch scan signal is applied to each of a plurality of driving electrodes via a signal wire.

For example, Japanese Patent Application Laid-Open Publication No. 2015-122057 (Patent Document 2) describes a display device integrated with a touch screen panel in which a touch driving signal is applied to all or some of a plurality of electrodes grouped into a plurality of electrode groups.

SUMMARY OF THE INVENTION

As one of the detection methods for detecting the contact position at which the finger or others is in contact with the input device, an electrostatic capacitive method is cited. The input device using the electrostatic capacitive method has, for example, the following configuration. That is, a plurality of capacitive elements connected to detection electrodes are provided within a detection surface of the input device. When an input operation is performed by bringing an input tool such as a finger or a touch pen close to or in contact with the capacitive element, the input position is detected by using a change in the electrostatic capacitance of the capacitive element. Hereinafter, in the specification of the present application, the input operation for bringing the input tool close to or in contact with the detection surface of the input device is referred to as "touch" or "touch operation" in some cases. The detection of the input tool touch by the input device is referred to as "touch detection" in some cases.

A display device including an input device is provided with a plurality of driving electrodes for driving an electro-optical layer in display of an image and a touch detection electrode for detecting a touched position on a coordinate surface in touch detection. When some of the plurality of driving electrodes for driving the electro-optical layer can also be used as touch detection electrodes, the number of electrodes is smaller than that in a case of when the touch detection electrode and the plurality of driving electrodes are independently provided.

However, when the number of display driving electrodes and the number of touch detection electrodes are increased in order to improve the performance of image display operation and touch detection operation, the layout of the wires connected to a plurality of electrodes or the terminal layout of the semiconductor chip for controlling the display operation and the touch detection operation is complicated. For example, when a plurality of wire paths connected to a plurality of touch detection electrodes are connected to a display driver chip for controlling the display operation, the number of terminals of the driver chip increases. The increase in the number of terminals of the driver chip causes an increase in the size of the driver chip or an increase in the complexity of the structure of the driver chip.

An object of the present invention to provide a technique for improving a performance of a display device including an input device.

The typical summary of the inventions disclosed in the present application will be briefly described as follows.

A display device according to an aspect of the present invention includes: an electro-optical layer; a first driving electrode and a second driving electrode which drives the electro-optical layer; a driver chip which outputs a video signal; a switch circuit which is arranged outside the driver chip, which selects a potential to be supplied to the second driving electrode, and which has a first switch element and a second switch element; a shift register circuit connected to the switch circuit; and a detection circuit which detects that an object is close or in contact. Each of the first switch element and the second switch element is selectively turned ON or OFF by the shift register circuit. The detection circuit is electrically connected to the first switch element and the second switch element.

BRIEF DESCRIPTIONS OF THE DRAWINGS

DESCRIPTIONS OF THE PREFERRED EMBODIMENTS

Figure 1:
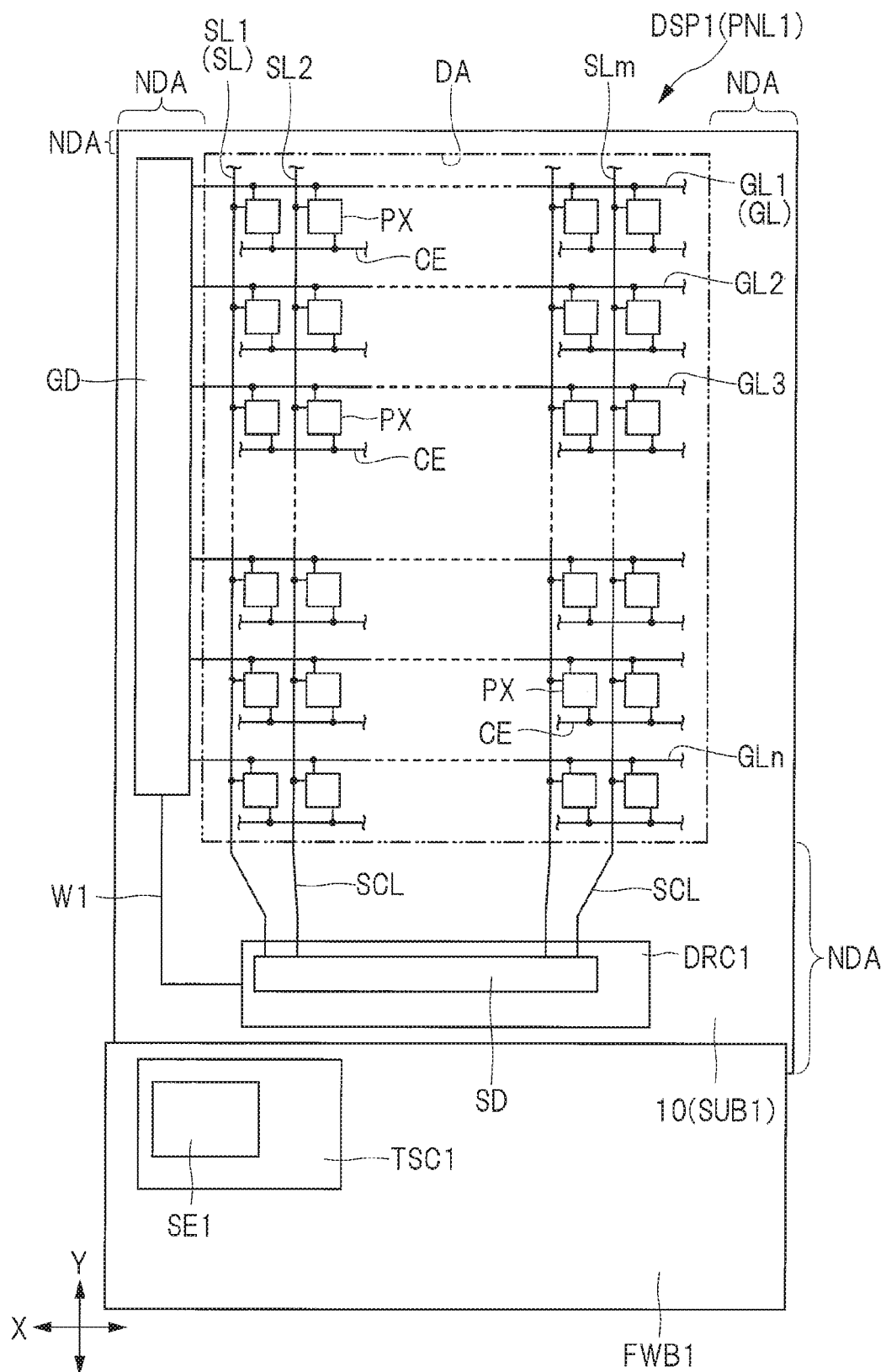
FIG. 1 is a plan view illustrating an example of one configuration of a display device according to one embodiment.

The following is explanation for each embodiment of the present invention with reference to drawings.

Note that disclosure is merely one example, and appropriate modification with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same or similar reference characters, and detailed description for them is appropriately omitted in some cases.

In the drawings used in the embodiments, hatchings attached to distinguish the structures are omitted depending on the drawings in some cases.

In the present application, the input device means a device that detects a command input from the outside as a signal. The specification of the present application will explain an electrostatic capacitive detection type input device which detects an input as a signal by detecting an electrostatic capacitance which changes in accordance with a capacitance of an object that is close to or in contact with an electrode.

The method to detect the electrostatic capacitance includes a mutual-capacitive sensing method for detecting the electrostatic capacitance between two electrodes arranged to face each other while being spaced apart from each other. In the specification of the present application, note that the mutual-capacitive sensing method will be simply referred to as a mutual-capacitive method. The method to detect the electrostatic capacitance includes a self-capacitive sensing method for detecting an electrostatic capacitance of a single electrode. In the specification of the present application, note that the self-capacitive sensing method will be simply referred to as a self-capacitive method. In the above explanation, the self-capacitive method detects the electrostatic capacitive of a single electrode. However, more specifically, an electrostatic capacitive between the single electrode and a reference potential such as a ground potential is detected. In the self-capacitive method, a portion to which the reference potential is supplied is a conductive pattern arranged in periphery of the electrode with such a separation distance as being capable of forming a detectable electrostatic capacitance together with the electrode, and is not particularly limited in a shape and others as long as the portion is connected to a supply path of a fixed potential.

A touch panel is an aspect of the input device, and is an input device that detects an input signal and calculates and outputs a touch position when an input operation is performed so as to bring an input tool such as a finger or a touch pen close to or in contact with the input device. In other words, the touch position is coordinates of a position at which the input signal is detected on a coordinate surface for detecting the input signal.

As seen in the touch panel, the input device which calculates the touch position is used together with a display device in many cases. In the present application, a display device with an input function which is obtained by assembling the display device and the input device so as to be formed of independent components from each other and which is used while the display device and the input device overlap each other will be referred to as an external type or on-cell type display device. And, a display device with an input function which is used while some or all of the components configuring an input detection unit for detecting an input signal is embedded into components configuring a display unit for displaying an image will be referred to as a built-in type or in-cell type display device. The in-cell type display device includes a display device in which some or all of the components configuring the input detection unit are shared with some or all of the components configuring the display unit. The in-cell type display device includes a display device in which the components configuring the input detection unit are not shared with the components configuring the display unit.

The technique explained in the following embodiment can be widely applied to a display device including a mechanism for supplying a signal from periphery of a display region to a plurality of elements in the display region where the electro-optical layer is provided. As the display devices as described above, various display devices such as a liquid crystal display device, an organic EL (Electro-Luminescence) display device, and a plasma display device can be exemplified. In the following embodiments, the liquid crystal display device will be cited and explained as a typical example of the display device.

The liquid crystal display is roughly classified into two categories, described below, depending on an application direction of an electric field for changing an orientation of liquid crystal molecules of a liquid crystal layer as a display functional layer. That is, the first category includes a so-called vertical electric field mode in which an electric field is applied in a thickness direction (or an out-of-plane direction) of the display device. The vertical electric field mode includes, for example, a Twisted Nematic (TN) mode and a Vertical Alignment (VA) mode. The second category includes a so-called horizontal electric field mode in which an electric field is applied in a plane direction (or an in-plane direction) of the display device. The horizontal electric field mode includes, for example, an In-Plane Switching (IPS) mode, a Fringe Field Switching (FFS) mode as one type of the IPS mode, and others. Although the technique described below can be applied to both of the vertical electric field mode and the horizontal electric field mode, a display device of the horizontal electric field mode will be cited and explained as an example in the embodiment described below.

First Embodiment

<Configuration of Display Device>

Figure 2:
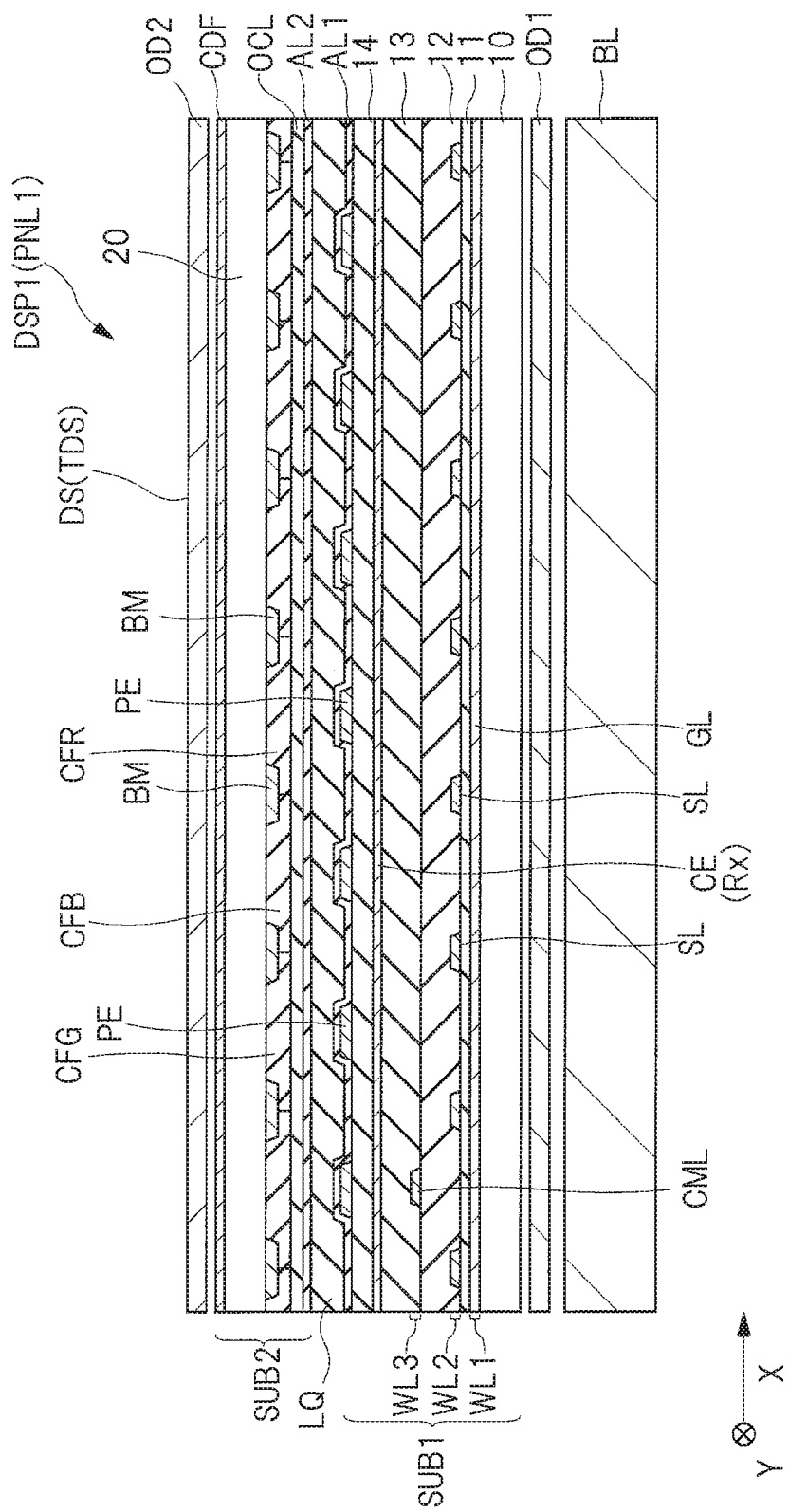
FIG. 2 is an enlarged cross-sectional view illustrating a portion of a display region of the display device illustrated in FIG. 1.
Figure 3:
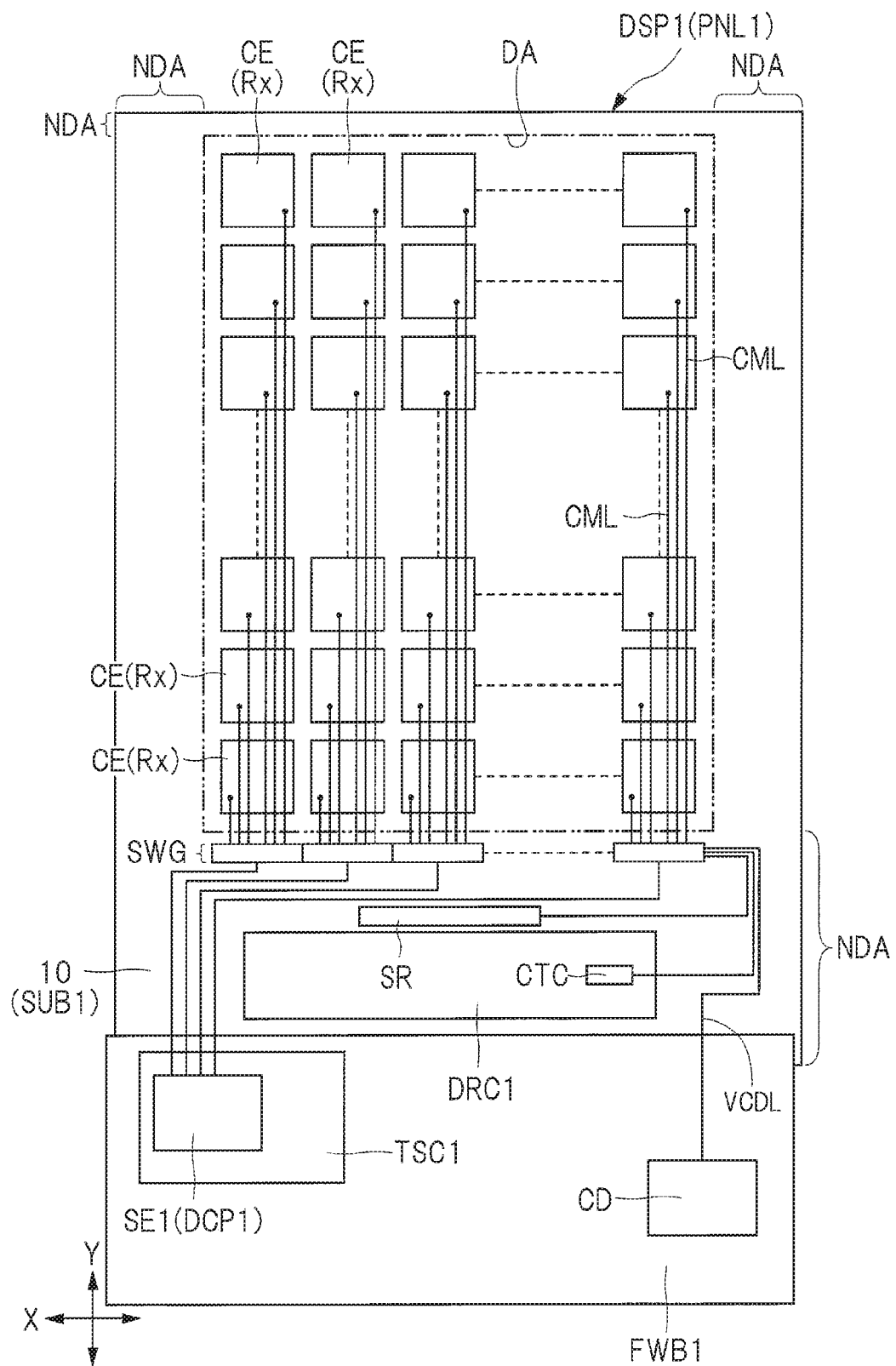
FIG. 3 is a plan view illustrating an example of an arrangement of common electrodes in the display device illustrated in FIG. 1.
Figure 4:
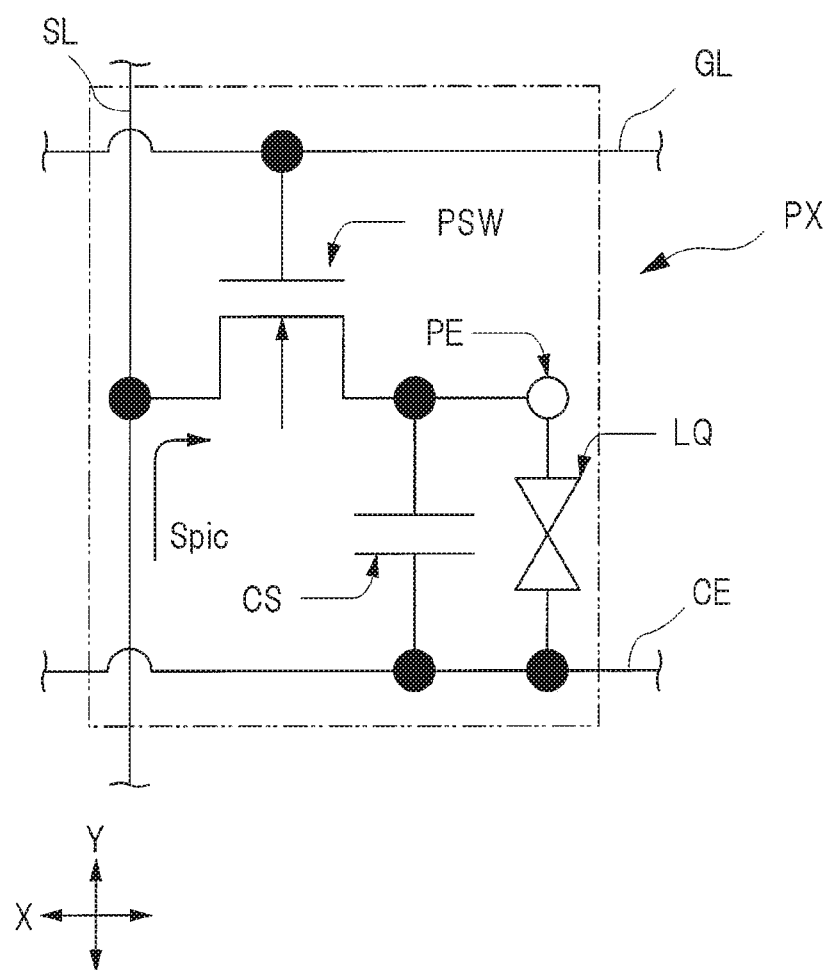
FIG. 4 is an equivalent circuit diagram illustrating pixels in the display device illustrated in FIG. 1.

FIG. 1 is a plan view illustrating an example of one configuration of a display device according to one embodiment. FIG. 2 is an enlarged cross-sectional view illustrating a portion of a display region of the display device illustrated in FIG. 1. FIG. 3 is a plan view illustrating an example of an arrangement of common electrodes in the display device illustrated in FIG. 1. FIG. 4 is an equivalent circuit diagram illustrating pixels in the display device illustrated in FIG. 1. In FIGS. 1 and 3, note that the constituent members of the display panel are separately illustrated in FIG. 1 and FIG. 3 for easiness of viewing. In order to show an example of a positional relation between a scan line GL and a signal line SL in a thickness direction of a substrate SUB1, a scan line GL provided on a different cross section from FIG. 2 is illustrated together in FIG. 2.

As illustrated in FIG. 1, the display device DSP1 has a display panel PNL1, a driver chip DRC1 for driving the display panel PNL1, and a detection unit SE1 having a function of a touch detection with an electrostatic capacitive method. In other words, the display device DSP1 is a display device having a touch detection function. The display panel PNL1 includes a display surface DS (see FIG. 2) on which an image is displayed. The driver chip DRC1 is an IC (Integrated Circuit) chip including a driving circuit for driving the display panel PNL1. In the examples as illustrated in FIG. 1 and FIG. 3, the display device DSP1 includes a flexible wiring board FWB1 which is a wire member connected to the display panel PNL1. The detection unit SE1 is a part including a detection circuit DCP1 (see FIG. 3) that controls the touch detection operation and processes the signal output from the detection electrodes Rx (see FIG. 3). The detection unit SE1 is formed in a detection chip TSC1 which is an IC (integrated circuit) chip for touch detection mounted on the flexible wiring board FWB1. The detection unit SE1 serving as the touch detection circuit and the detection method using the detection unit SE1 will be described later. Although not illustrated, note that the display device DSP1 has a control module and others provided outside the display panel PNL1, and the control module may be electrically connected to the display panel PNL1 via the flexible wiring board FWB1. Note that the detection circuit DCP1 may be arranged inside the driver chip DRC1.

As illustrated in FIG. 1 and FIG. 2, the display panel PNL1 includes a substrate SUB1, a substrate SUB2 (see FIG. 2) arranged to face the substrate SUB1, a liquid crystal layer LQ (see FIG. 2) serving as an electro-optical layer arranged between the substrate SUB1 and the substrate SUB2. In other words, the display device DSP1 according to the present embodiment is a liquid crystal display device including the liquid crystal layer LQ serving as the electro-optical layer. In the present first embodiment, note that the substrate SUB1 can also be referred to as an array substrate, and that the substrate SUB2 can be referred to as a counter substrate.

As illustrated in FIG. 2 and FIG. 3, the display device DSP1 includes a plurality of detection electrodes Rx arranged in a matrix form in the display panel PNL1. As described in detail later, the detection unit SE1 detects a change in the electrostatic capacitance of each of the plurality of detection electrodes Rx. In the display device DSP1, the plurality of detection electrodes Rx are provided inside the display panel PNL1, and therefore, the display device DSP1 is an in-cell type display device with a touch detection function.

As illustrated in FIG. 1 and FIG. 3, the display panel PNL1 includes a display region (active region) DA where an image is displayed. In a plan view, two directions intersecting each other, more preferably, orthogonal to each other, are defined as the X axis direction and the Y axis direction. At this time, in a plan view, the plurality of detection electrodes Rx are arranged in a matrix form in the X axis direction and Y axis direction in the display region DA. That is, in a plan view, the plurality of detection electrodes Rx are arranged in a matrix form in the display panel PNL1. In the present application, note that a term "in a plan view" means a case viewed from a direction perpendicular to the display surface of the display panel PNL1.

As illustrated in FIG. 2, the display device DSP1 includes a backlight unit BL. The backlight unit BL is arranged on a back surface side of the substrate SUB1. As the backlight unit BL, various modes are applicable. While both of a mode using a Light Emitting Diode (LED) as the light source or a mode using a Cold Cathode Fluorescent Lamp (CCFL) as the light source are applicable, the explanation for the detailed structures is omitted here.

As illustrated in FIG. 1, the driver chip DRC1 is provided on the substrate SUB1 in a non-display region NDA which is a region of the display panel PNL1 in a plan view, the region being outside the display region DA. The driver chip DRC1 has a signal line driving circuit SD for driving the liquid crystal layer LQ (see FIG. 2), which is an electro-optical layer, via a signal line SL. The signal line driving circuit SD supplies a video signal Spic (see FIG. 4) via the signal line SL to a pixel electrode PE (see FIG. 4) included in each of the plurality of pixels PX.

The display device DSP1 includes a plurality of signal lines SL and a plurality of pixels PX. In the display region DA, a plurality of pixels PX are arranged between the substrate SUB1 and the substrate SUB2. The plurality of pixels PX are arranged in a matrix form in the X axis direction and Y axis direction so that "m×n" pixels are arranged (note that "m" and "n" are positive integers). The plurality of signal line SL extend in the Y axis direction and are arranged in the X axis direction so as to be apart from each other. In the example as illustrated in FIG. 1, "m" signal lines SL are arranged from one side to the other side in the X axis direction in an order of signals lines SL1, SL2, and SLm. Each of the plurality of signal lines SL extends to the non-display region NDA outside the display region DA. Each of the plurality of signal lines SL is electrically connected to the driver chip DRC1 via a signal connection wire SCL serving as a connection wire (also referred to as a lead wire) that connects the signal line SL and the driver chip DRC1 in the display region DA with each other.

The signal line SL and the signal connection wire SCL are a video signal wires that transmit video signals, and the signal line SL and the signal connection wire SCL can be distinguished from each other as follows. That is, among the signal transmission paths which are connected to the driver chip DRC1 and which supply the video signals to the plurality of pixels PX, a signal transmission path in the display region DA is referred to as the signal line SL, and a signal transmission path outside the display region DA is referred to as the signal connection wire SCL. Each of the plurality of signal lines SL linearly extends in the Y axis direction. On the other hand, since the signal connection wire SCL is a wire connecting the signal line SL and the driver chip DRC1, the signal connection wire SCL has a bent portion between the signal line SL and the driver chip DRC1 as illustrated in FIG. 1.

In the example as illustrated in FIG. 1, note that the signal line SL and the driver chip DRC1 are directly connected to each other via the signal connection wire SCL. However, another circuit not illustrated may be formed between the signal line SL and the driver chip DRC1. For example, an RGB selection switch for selecting a signal in red color, a signal in green color, or a signal in blue color may be interposed between the signal line SL and the driver chip DRC1. The RGB selection switch is, for example, a multiplexer circuit which selects a signal line SL for each color and outputs an input signal. In this case, the number of signal connection wires SCL connecting the RGB selection switch and the driver chip DRC1 is smaller than the number of signal lines SL.

The display device DSP1 has a plurality of scan lines GL and a scan line driving circuit GD serving as a scan signal output circuit which outputs scan signals that are input into the plurality of scan lines GL. The scan line driving circuit GD is provided on the substrate SUB1 in the non-display region NDA. The driver chip DRC1 is connected to the scan line driving circuit GD via a wire W1. The plurality of scan lines GL extend in the X axis direction and are arranged so as to be apart from each other in the Y axis direction. In the example as illustrated in FIG. 1, "n" signal lines GL are arranged from one side to the other side in the Y axis direction in an order of scan lines GL1, GL2, and GLn. Each of the plurality of scan lines GL extends to the non-display region NDA outside the display region DA, and is connected to the scan line driving circuit GD. The plurality of scan lines GL intersect with the plurality of signal lines SL.

In FIG. 1, the scan line driving circuit GD is schematically illustrated. The scan line driving circuit GD may include, for example, a plurality of shift register circuits not shown and a switch element (also referred to as a switching element) which is connected to the shift register circuit and which selects a potential to be supplied to the scan line GL based on a control signal. In the example as illustrated in FIG. 1, the scan line driving circuit GD is connected to the driver chip DRC1 via a wire W1. The driver chip DRC1 supplies a control signal such as a clock signal and an enable signal to the scan line driving circuit GD via the wire W1. The example as illustrated in FIG. 1 illustrates an example in which the scan line driving circuit GD is provided on one side in the X axis direction while the scan line driving circuit GD is not provided on the other side in the X axis direction. However, the layout of the scan line driving circuits GD has various modifications. For example, in the X axis direction as illustrated in FIG. 1, the scan line driving circuit GD may be provided on each of the one side and the other side, and the display region DA may be arranged between the scan line driving circuits GD. For example, a buffer circuit for shaping the waveform of the control signal may be connected between the driver chip DRC1 and the scan line driving circuit GD.

As illustrated in FIG. 3, the display device DSP1 includes a plurality of common electrodes CE. The display device DSP1 has a common electrode driving circuit (also referred to as a common potential circuit) CD that drives a common electrode CE when the display device DSP1 displays an image. The common electrodes CE are arranged in a matrix form in the X axis direction and the Y axis direction. A common line CML is connected to each of the plurality of common electrodes CE. The common electrode CE is connected to a switch circuit unit SWG via the common line CML. In the example as illustrated in FIG. 3, the common electrode driving circuit CD is formed on the flexible wiring board FWB1 and is electrically connected to the plurality of common electrodes CE via the driver chip DRC1, the common potential supply line VCDL, and the switch circuit unit SWG.

The present embodiment will be explained by using an example in a case in which the common electrode CE is also used as the detection electrode PRx for touch detection based on the self-capacitive method. Therefore, each of the plurality of common lines CML has a function serving as a wire for detection signal transmission which transmits the signal detected by the detection electrode Rx to the detection unit SE1. Although the details will be described later, the display device DSP1 of the present embodiment performs the touch detection based on the self-capacitive method using the detection electrode Rx. Therefore, each of the plurality of common lines CML has a function serving as a wire for signal transmission for inputting a driving waveform, which is a write signal, to each of the plurality of detection electrodes Rx.

The number of common electrodes CE is smaller than the number of pixels PX illustrated in FIG. 1 although may be the same as the number of pixels PX. When the number of common electrodes CE operating as the detection electrodes Rx is the same as the number of pixels PX, the resolution of touch detection is about the same as the resolution of display image. When the number of common electrodes CE is smaller than the number of pixels PX, the resolution of touch detection is lower than the resolution of display image. However, the number of common lines CML can be reduced. In general, the resolution of display image is often higher than the resolution of touch detection in many cases. Therefore, the number of common electrodes CE is preferably smaller than the number of pixels PX. For example, when a plane area of one detection electrode Rx illustrated in FIG. 3 is about 4 mm$^2$ to 36 mm$^2$, one detection electrode Rx overlaps several tens to several hundreds of pixels PX.

As described in detail later, the switch circuit unit SWG connected with the plurality of common line CML is arranged outside the driver chip DRC1. In the example as illustrated in FIG. 3, the switch circuit unit SWG arranged in the non-display region NDA on the surface of the substrate SUB1. The switch circuit unit SWG is connected to the shift register circuit SR. The shift register circuit SR is a circuit for selectively turning ON and OFF a plurality of switch elements (the details of which will be described later) included in the switch circuit unit SWG. In the example as illustrated in FIG. 3, the shift register circuit SR is provided outside the driver chip DRC1. More specifically, the shift register circuit SR is arranged in the non-display region NDA on the surface of the substrate SUB1. When the shift register circuit SR is arranged outside the driver chip DRC1, the versatility of the driver chip DRC1 is improved. The details of the layout of the signal transmission path connecting each of the plurality of detection electrodes Rx and the detection unit SE1 will be described later. Note that the shift register circuit SR may be arranged inside the driver chip DRC1.

Note that the position at which the scan line driving circuit GD (see FIG. 1) or the common electrode driving circuit CD (see FIG. 3) described above is formed has not only the aspects illustrated in FIG. 1 and FIG. 3 but also various modifications. For example, either one of or both of the scan line driving circuit GD and the common electrode driving circuit CD may be formed in the driver chip DRC1. For example, an aspect in which the common electrode driving circuit CD is arranged on the substrate SUB1 illustrated in FIG. 1 is also included in the aspect in which the common electrode driving circuit CD is formed in the non-display region NDA. For example, the common electrode driving circuit CD may be formed outside the display device DSP1 and be connected to the flexible wiring board FWB1.

As illustrated in FIG. 4, each pixel PX has a pixel switch element PSW and a pixel electrode PE. In the example of the present embodiment, a plurality of pixels PX share the common electrode CE. The pixel switch element PSW includes, for example, a thin film transistor (TFT). The pixel switch element PSW is electrically connected to the scan line GL and the signal line SL. The pixel switch element PSW may be either one of a top gate type TFT and a bottom gate type TFT. The semiconductor layer of the pixel switch element PSW is made of, for example, polycrystalline silicon (polysilicon), but may be made of amorphous silicon.

The pixel electrode PE is electrically connected to the pixel switch element PSW. The pixel electrode PE faces the common electrode CE via an insulating film. The common electrode CE, the insulating film, and the pixel electrode PE form a retention capacitance CS.

In a display period FLd (see FIG. 11 explained later) in which a display image is formed based on a video signal, an electric field is generated between the pixel electrode PE and the common electrode CE on the basis of the driving signal applied to each electrode. Liquid crystal molecules configuring the liquid crystal layer LQ which is an electro-optical layer are driven by the electric field formed between the pixel electrode PE and the common electrode CE. For example, in the display device DSP1 using the horizontal electric field mode as shown in the present embodiment, the pixel electrode PE and the common electrode CE are provided on the substrate SUB1 as illustrated in FIG. 2. The liquid crystal molecules configuring the liquid crystal layer LQ are rotated by using the electric field formed between the pixel electrode PE and the common electrode CE (for example, an electric field which is a part of the fringe electric field and which is in almost parallel with the main surface of the substrate).

That is, in the display operation period, each of the pixel electrode PE and the common electrode CE operates as a driving electrode which drives the liquid crystal layer LQ which is the electro-optical layer. In other words, each of the plurality of pixel electrodes PE is the first driving electrode which drives the electro-optical layer. Each of the plurality of common electrodes CE is the second driving electrode which drives the electro-optical layer. Furthermore, as described above, in the present embodiment, the common electrode CE is also used as the detection electrode Rx for the touch detection based on the self-capacitive method. Therefore, each of the plurality of detection electrodes Rx can be also interpreted as the second driving electrode which drives the electro-optical layer. In the following explanation in the specification of the present application, when "detection electrode Rx" is described, the "detection electrode Rx" can be interpreted as "common electrode CE" or "driving electrode which drives the electro-optical layer" except when there is no notation indicating that the meaning is interpreted as different meaning in particular.

The substrate SUB1 and the substrate SUB2 are adhered with each other while being separated from each other with a certain distance. The liquid crystal layer LQ is sealed between the substrate SUB1 and the substrate SUB2. The substrate SUB1 has an insulating substrate 10 such as a glass substrate or a resin substrate having optical transparency. The substrate SUB1 has a plurality of conductor patterns on the side of the insulating substrate 10 which faces the substrate SUB2. The plurality of conductor patterns include a plurality of scan lines GL, a plurality of signal lines SL, a plurality of common lines CML, a plurality of common electrodes CE, and a plurality of pixel electrodes PE. An insulating film is interposed between the plurality of conductor patterns. The insulating film disposed between adjacent conductor patterns to insulate the conductor patterns from each other includes an insulating film 11, an insulating film 12, an insulating film 13, an insulating film 14, and an orientation film AL1. Note that FIG. 2 illustrates each one of the scan lines GL, the common electrodes CE, and the common lines CML.

Each of the plurality of conductor patterns described above is formed in a plurality of stacked wire layers. In the example illustrated in FIG. 2, the common electrode CE and the pixel electrode PE are formed in different layers from each other, and a three-layered wire layer is provided below the layer where the common electrode CE is formed. The scan line GL is mainly formed in a wire layer WL1 which is the first layer of the three-layered wire layer formed on the insulating substrate 10, the first layer being closest to the insulating substrate 10. The conductor pattern formed in the wire layer WL1 is made of a metal such as chromium (Cr), titanium (Ti), or molybdenum (Mo) or an alloy of them.

The insulating film 11 is formed on the wire layer WL1 and the insulating substrate 10. The insulating film 11 is a transparent insulating film made of, for example, silicon nitride or silicon oxide. Note that not only the scan line GL but also a gate electrode of a pixel switch element, a semiconductor layer, and others are formed between the insulating substrate 10 and the insulating film 11.

On the insulating film 11, a wire layer WL2 which is the second layer is formed. In the wire layer WL2, a signal line SL is mainly formed. The conductor pattern formed in the wire layer WL2 is made of a metal film having a multi-layer structure obtained by, for example, sandwiching aluminum (Al) by molybdenum (Mo), titanium (Ti) or others. The wire material of the wire layer WL2 preferably has a lower resistivity than that of the wire material of the wire layer WL1. The source electrode, the drain electrode, and others of the pixel switch element are also formed on the insulating film 11. In the example illustrated in FIG. 2, the signal line SL extends in the Y axis direction. The insulating film 12 is formed on each of the signal line SL and the insulating film 11. The insulating film 12 is made of, for example, an acrylic-based photosensitive resin.

On the insulating film 12, a wire layer WL3 which is the third layer is formed. In the wire layer WL3, the common line CML is mainly formed. As similar to the wire layer WL2, the conductor pattern formed in the wire layer WL3 is made of a metal film having a multi-layer structure obtained by, for example, sandwiching aluminum (Al) by molybdenum (Mo), titanium (Ti) or others. In the example illustrated in FIG. 2, the common line CML extends in the Y axis direction. The insulating film 13 is formed on each of the common line CML and the insulating film 12. The insulating film 13 is made of, for example, an acrylic-based photosensitive resin.

The common electrode CE is formed on the insulating film 13. Note that a plurality of common electrodes CE are provided as described above, and are also used as the detection electrodes Rx for touch detection. The common electrode CE is preferably made of a transparent conductive material such as ITO (Indium tin oxide) or IZO (Indium Zinc Oxide). When the display device is a display device of the TN mode, the VA mode, or others serving as the vertical electric field mode, note that the common electrode CE may be formed in the substrate SUB2. In the cross section as illustrated in FIG. 2, the insulating film 13 is interposed between the common electrode CE and the common line CML. However, as illustrated in FIG. 3, a part of the common line CML and a part of the common electrode CE are electrically connected to each other. In a case of a reflective type display device that utilizes reflection of external light, the common electrode CE may be a metallic material.

The insulating film 14 is formed on each of the common electrode CE and the insulating film 13. The pixel electrode PE is formed on the insulating film 14. Each pixel electrode PE is disposed between two signal lines SL adjacent to each other, and is disposed at a position facing the common electrode CE. The pixel electrode PE is made of a transparent conductive material such as ITO or IZO or a metal material. The orientation film AL1 covers the pixel electrode PE and the insulating film 14.

Meanwhile, the substrate SUB2 has an insulating substrate 20 having optical transparency such as a glass substrate or a resin substrate. The substrate SUB2 includes a black matrix BM which is a light shielding film, color filters CFR, CFG, and CFB, an overcoat layer OCL, an orientation film AL2, and a conductive film CDF on the side facing the substrate SUB1 of the insulating substrate 20.

The black matrix BM is formed on a surface of the insulating substrate 20 which is close to the substrate SUB1 so as to partition each pixel. Each of the color filters CFR, CFG, and CFB is formed on the surface of the insulating substrate 20 which is close to the substrate SUB1 so that a part of each of the color filters CFR, CFG, and CFB overlaps the black matrix BM in a plan view. The color filter CFR is a red color filter, the color filter CFG is a green color filter, and the color filter CFB is a blue color filter. The overcoat layer OCL covers the color filters CFR, CFG, and CFB. The overcoat layer OCL is made of a transparent resin material. The orientation film AL2 covers the overcoat layer OCL.

The conductive film CDF is disposed on a surface of flat surfaces of the insulating substrate 20, the surface being opposite to a surface facing the liquid crystal layer LQ. The conductive film CDF is made of, for example, a transparent conductive material such as ITO or IZO. The conductive film CDF functions as a shielding layer that suppresses the influence of external electromagnetic waves on the liquid crystal layer LQ and others. When the method for driving the liquid crystal layer LQ is the vertical electric field mode such as TN mode or VA mode, an electrode is provided on the substrate SUB2, and the electrode also functions as the shield layer, and therefore, the conductive film CDF can be omitted. When the touch operation based on the mutual-capacitive method is performed, the plurality of patterned conductive films CDF may be formed on the insulating substrate 20, and the plurality of conductive films CDF may be used as the detection electrode for touch detection.

The display device DSP1 includes an optical device OD1 and an optical device OD2. The optical device OD1 is disposed between the insulating substrate 10 and the backlight unit BL. The optical device OD2 is disposed above the insulating substrate 20, that is, is opposite to the substrate SUB1 across the insulating substrate 20. Each of the optical device OD1 and the optical device OD2 includes at least a polarization plate, and may include a retardation film as necessary.

<Touch Detection Based on Self-Capacitive Method>

Next, explanation will be made about a method for detecting a position of an input tool made of an object such as a finger, i.e., detecting an input position by the display device DSP1 using the detection electrode Rx.

The display device DSP1 according to the present embodiment can determine the input position information on the basis of the change in the electrostatic capacitance detected by the detection electrode Rx using the self-capacitive method. Accordingly, the display device DSP1 can detect that a finger is in contact with the touch detection surface TDS (see FIG. 2) of the display device DSP1 or that the finger is close to the touch detection surface TDS of the display device DSP1. In the present first embodiment, the touch detection surface TDS is a surface of the optical device OD2, the surface being opposite to a side close to the substrate SUB2.

The following is the explanation of the principle and the method of the touch detection (self-capacitive method touch detection) using the self-capacitive method. However, the display device DSP1 may use the mutual-capacitive method to determine the input position information on the basis of the change in the electrostatic capacitances detected by the detection electrode Rx. In the specification of the present application, note that the mutual-capacitive sensing (detection) may be simply referred to as a mutual-capacitive method. For example, the self-capacitive method and the mutual-capacitive method may be alternately performed. Alternatively, when the display device includes the detection electrode for the self-capacitive method and the detection electrode for the mutual-capacitive method so as to be independent from each other, the self-capacitive method and the mutual-capacitive method can be collectively performed.

The input position information based on the self-capacitive method is determined by writing a write signal to each detection electrode Rx and reading a read signal indicating a change in the electrostatic capacitance that occurs in each detection electrode Rx to which the write signal has been written. In other words, when the touch detection is performed based on the self-capacitive method, the driving signal is input into the detection electrode Rx itself, and it is detected that an object is close or in contact, based on a change in a signal that is output from the detection electrode Rx itself.

Next, the principle of the touch detection method using the self-capacitive method will be explained. In the self-capacitive method, the capacitance Cx1 included in the detection electrode Rx is used. And, in the self-capacitive method, the capacitance Cx2 caused by a finger of a user who is touching the detection electrode Rx or others is used. FIG. 5 to FIG. 8 are explanatory diagrams each schematically illustrating a circuit operation of the touch detection based on the self-capacitive method.

Figure 5:
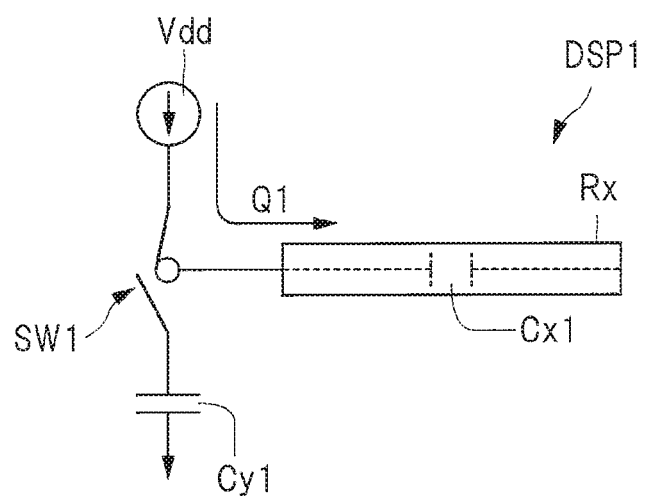
FIG. 5 is an explanatory diagram schematically illustrating a circuit operation of touch detection based on a self-capacitive method.
Figure 6:
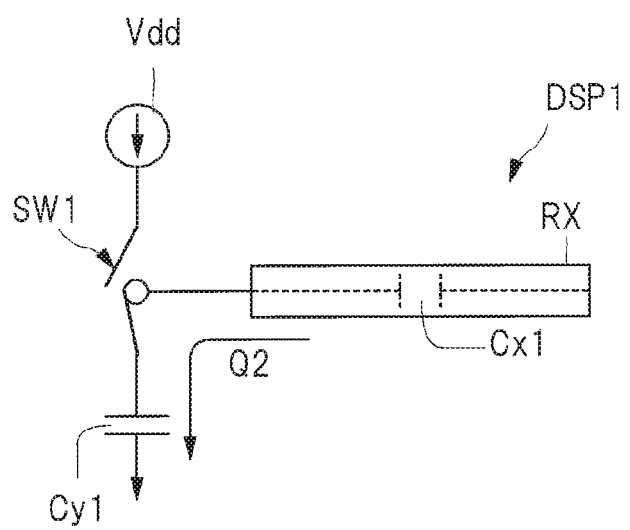
FIG. 6 is an explanatory diagram schematically illustrating a circuit operation of touch detection based on a self-capacitive method.

FIG. 5 and FIG. 6 illustrate a state in which the finger of the user is not touching the touch detection surface of the display device DSP1. Therefore, no electrostatic capacitive coupling occurs between the detection electrode Rx and the finger. FIG. 5 illustrates a state in which the detection electrode Rx is connected to a power supply Vdd by a switch SW1. FIG. 6 illustrates a state in which the detection electrode Rx is separated from the power supply Vdd by the switch SW1 so that the detection electrode Rx is connected to the capacitance Cy1 serving as a capacitor.

In the state as illustrated in FIG. 5, a charge Q1 flows from the power supply Vdd to the capacitance Cx1, so that the capacitance Cx1 is, for example, charged. In the state as illustrated in FIG. 6, a charge Q2 flows from the capacitance Cx1 to the capacitance Cy1, so that the capacitance Cx1 is, for example, discharged. Here, the charging of the capacitance Cx1 means the writing of the write signal into the detection electrode Rx. And, the discharging of the capacitance Cx1 means the reading the read signal indicating the change in the electrostatic capacitance that occurs in the detection electrode Rx.

Figure 7:
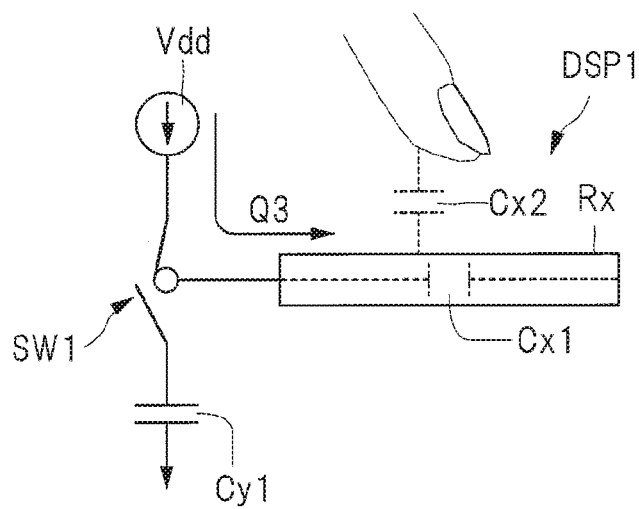
FIG. 7 is an explanatory diagram schematically illustrating a circuit operation of touch detection based on a self-capacitive method.
Figure 8:
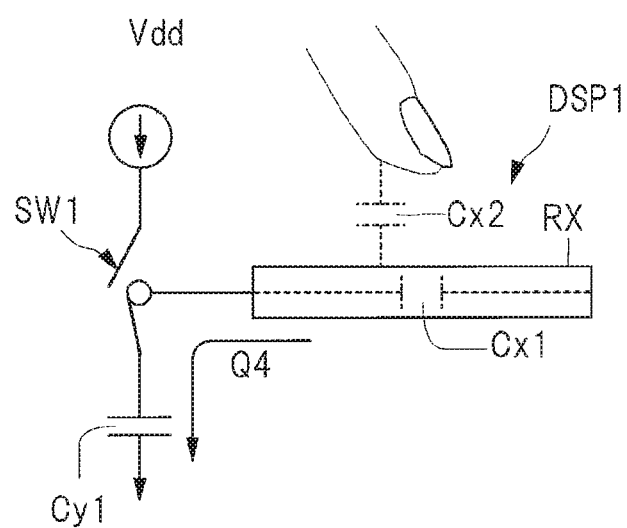
FIG. 8 is an explanatory diagram schematically illustrating a circuit operation of touch detection based on a self-capacitive method.

On the other hand, FIG. 7 and FIG. 8 illustrate a state in which the finger of the user is touching the touch detection surface of the display device DSP1. Therefore, the electrostatic capacitive coupling occurs between the detection electrode Rx and the finger. FIG. 7 illustrates a state in which the detection electrode Rx is connected to the power supply Vdd by the switch SW1. FIG. 8 illustrates a state in which the detection electrode Rx is cut off from the power supply Vdd by the switch SW1 so that the detection electrode Rx is connected to the capacitance Cy1.

In the state as illustrated in FIG. 7, a charge Q3 flows from the power supply Vdd to the capacitance Cx1, so that the capacitance Cx1, for example, is charged. And, in the state as illustrated in FIG. 8, a charge Q4 flows from the capacitance Cx1 to the capacitance Cy1, so that the capacitance Cx1 is, for example, discharged.

Here, the time dependence of the voltage charged to the capacitance Cy1 during the discharge illustrated in FIG. 8 is clearly different from the time dependence of the voltage charged to the capacitance Cy1 during the discharge illustrated in FIG. 6 because of the capacitance Cx2. Therefore, the self-capacitance method utilizes the difference of the time dependence of the voltage of the capacitance Cy1 depending on the existence or the absence of the capacitance Cx2, so that the input position information (indicating, for example, whether the operation input is performed or not) is determined.

Figure 9:
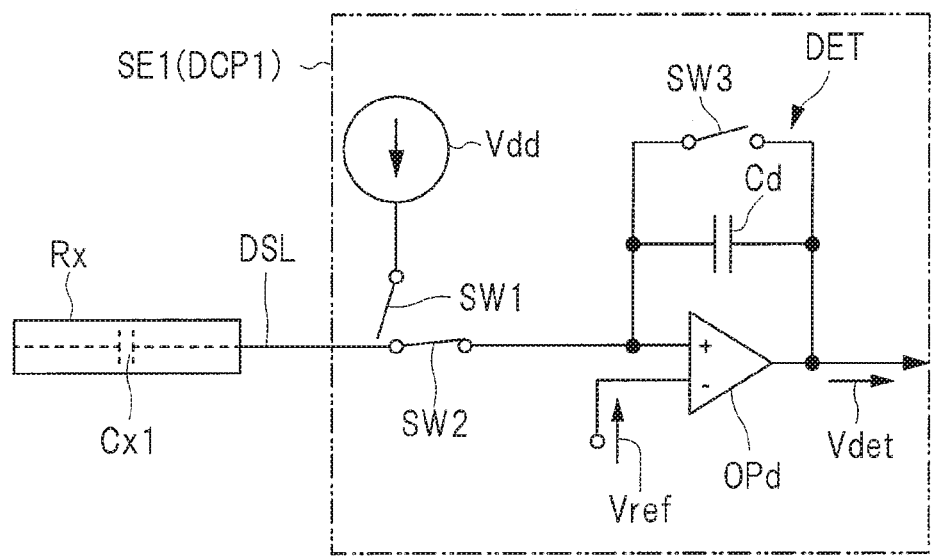
FIG. 9 is a plan view illustrating a wire substrate from which a semiconductor device and a capacitor illustrated in FIG. 3 are removed.
Figure 10:
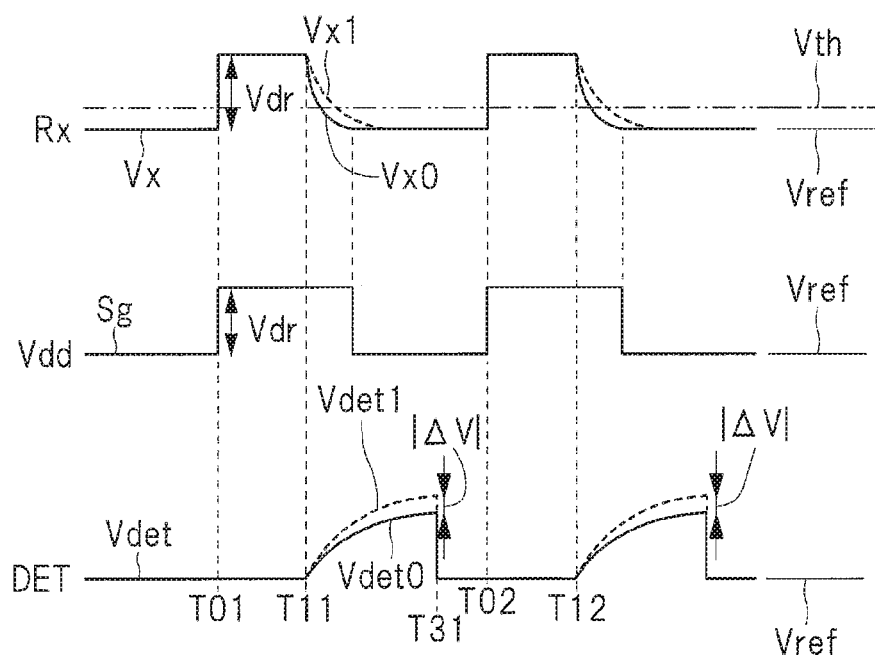
FIG. 10 is a plan view illustrating an example of an alternate current square wave that is output from a power supply, a voltage of the detection electrode, and a time dependence of a voltage serving as an output of the detection device in a circuit illustrated in FIG. 9.

Next, a circuit example that achieves the self-capacitive method will be described. FIG. 9 is a diagram illustrating the circuit example that achieves the self-capacitive method. FIG. 10 is an explanatory diagram illustrating an example of an alternate current square wave that is output from the power supply, the voltage of the detection electrode, and the time dependence of the voltage serving as the output of the detection device in the circuit as illustrated in FIG. 9. Note that FIG. 9 illustrates the capacitance of the detection electrode Rx as the capacitance Cx1. The switch circuit unit SWG illustrated in FIG. 3 is connected between the detection unit SE1 and the detection electrode Rx illustrated in FIG. 9.

As illustrated in FIG. 9, the detection electrode Rx is connected so that its electrical connection with the power supply Vdd can be switched by turning ON or OFF the switch SW1. The detection electrode Rx is connected so that its electrical connection with the detector DET (for example, a voltage detector) can be switched by turning ON or OFF the switch SW2. The detector DET is an integration circuit including, for example, an operational amplifier OPd, a capacitance Cd, and a switch SW3. An inversion input unit of the operational amplifier OPd, i.e., a terminal with a symbol "+" of the operational amplifier OPd as illustrated in FIG. 9 is connected to the detection electrode Rx via the switch SW2. A reference signal Vref is input into a non-inversion input unit of the operational amplifier OPd, i.e., a terminal with a symbol "−" of the operational amplifier OPd as illustrated in FIG. 9.

As illustrated in FIG. 10, the power supply Vdd outputs an alternate current square wave Sg whose cycle is a time difference between a time T01 and a time T02 and which has a waveform height of the voltage Vdr. The alternate current square wave Sg has a frequency of, for example, about several kHz to several hundred kHz. The detector DET converts a current variation in accordance with the alternate current square wave Sg into a voltage variation (a waveform Vdet0 and a waveform Vdet1).

As explained with reference to FIG. 9, the electrical connection state of the detection electrode Rx with the power supply Vdd and the detector DET can be switched by turning ON or OFF the switch SW1 and the switch SW2. In FIG. 10, at the timing of the time T01, the alternate current square wave Sg increases its voltage by the voltage Vdr. At the time T01, the switch SW1 (see FIG. 9) is tuned ON, and the switch SW2 (see FIG. 9) is turned OFF. In this case, at the time T01, the voltage Vx of the detection electrode Rx also increases by the voltage Vdr. Next, before the timing of the time T11, the switch SW1 is turned OFF. At this time, if both of the switch SW1 and the switch SW2 are in the OFF state, the detection electrode Rx is in an electrically floating state (floating state). However, the increase of the voltage Vx of the detection electrode Rx by the voltage Vdr is maintained by the capacitance Cx1 of the detection electrode Rx (see FIG. 5) or capacitance "Cx1+Cx2" obtained by adding the capacitance Cx2 produced by the touching of the finger or others (see FIG. 7) to the capacitance Cx1 of the detection electrode Rx. Further, after the switch SW3 (see FIG. 9) is turned ON before the timing of the time T11, the switch SW3 is turned OFF before the time T11. By this reset operation, the voltage Vdet serving as the output of the detector DET is reset. The voltage Vdet of the detector DET obtained after this reset operation is a voltage substantially equal to the reference signal Vref.

Next, at the timing of the time T11, the switch SW2 is turned ON. As a result, the voltage that is input into the inversion input unit of the detector DET is equal to the voltage Vx of the detection electrode Rx. Then, the voltage of the inversion input unit of the detector DET decreases down to a value almost equal to the reference signal Vref at a response speed in accordance with a time constant caused by the capacitance Cx1 of the detection electrode Rx (or the capacitance Cx1+Cx2 explained above) and the capacitance Cd included in the detector DET (see FIG. 9). In this case, the charge accumulated in the capacitive Cx1 of the detection electrode Rx (or the capacitance Cx1+Cx2) moves to the capacitance Cd included in the detector DET, and therefore, the voltage Vdet of the detector DET increases. When the object such as the finger is not touching the detection electrode Rx, the waveform of the voltage Vdet is a waveform Vdet0 indicated by a solid line, and is expressed by an expression "Vdet0=Cx1 Vdr/Cd". When the object such as the finger is touching so that a capacitance is added caused by the object, the voltage Vdet is a waveform Vdet1 indicated by a broken line, and is expressed by an expression "Vdet1=(Cx1+Cx2)×Vdr/Cd".

Then, at the timing of the time T31 after the charge of the capacitive Cx1 of the detection electrode Rx (or the capacitance Cx1+Cx2) sufficiently moves to the capacitance Cd, the switch SW2 (see FIG. 9) is turned OFF, and the switch SW1 (see FIG. 9) and the switch SW3 (see FIG. 9) are turned ON. By this operation, the voltage of the detection electrode Rx becomes a voltage of a low level of the alternate current square wave Sg, i.e., a voltage equal to a lower voltage level of the square wave. By the above-described reset operation for turning OFF the switch SW2 and turning ON the switch SW3, the voltage serving as the output from the detector DET is reset. At this time, note that the timing at which the switch SW1 is turned ON may be any timing as long as the timing is after the switch SW2 is turned OFF but before or at the time T02. The timing at which the detector DET is reset may be any timing as long as the timing is after the switch SW2 is turned OFF but before or at the time T12.

In the operation period for performing the touch detection, the operation described with reference to FIG. 5 to FIG. 10 is repeated with a predetermined frequency (for example, about several kHz to several hundred kHz) for each of the plurality of detection electrodes Rx illustrated in FIG. 3. And, it can be measured whether the object touching the touch detection surface from the outside exists or not (the touching exists or not) based on the absolute value |ΔV| of the difference between the waveform Vdet0 and the waveform Vdet1.

Note that this section has described the typical example of the operation principle of the self-capacitive method and the circuit achieving the self-capacitive method. However, the method for achieving the self-capacitive method includes various modifications. For example, a touch detection of the following modification as described below may be performed instead of the touch detection based on the self-capacitive method described above or in addition to the touch detection based on the self-capacitive method described above. That is, when the object such as the finger is not touching the touch detection surface, the waveform of the voltage Vx of the detection electrode Rx becomes a waveform Vx0 indicated by a solid line. When the capacitance Cx2 caused by the influence of the touching object such as the finger is added, the waveform of the voltage Vx of the detection electrode Rx becomes a waveform Vx1 indicated by a broken line. Therefore, the presence or absence of the object touching the touch detection surface from the outside (presence or absence of the touch) can be determined by measuring and comparing period of times of the waveform Vx0 and the waveform Vx1 taken down to a threshold value voltage Vth exemplified with a two-dot chain line in FIG. 10.

<Touch Detection Method>

Figure 11:
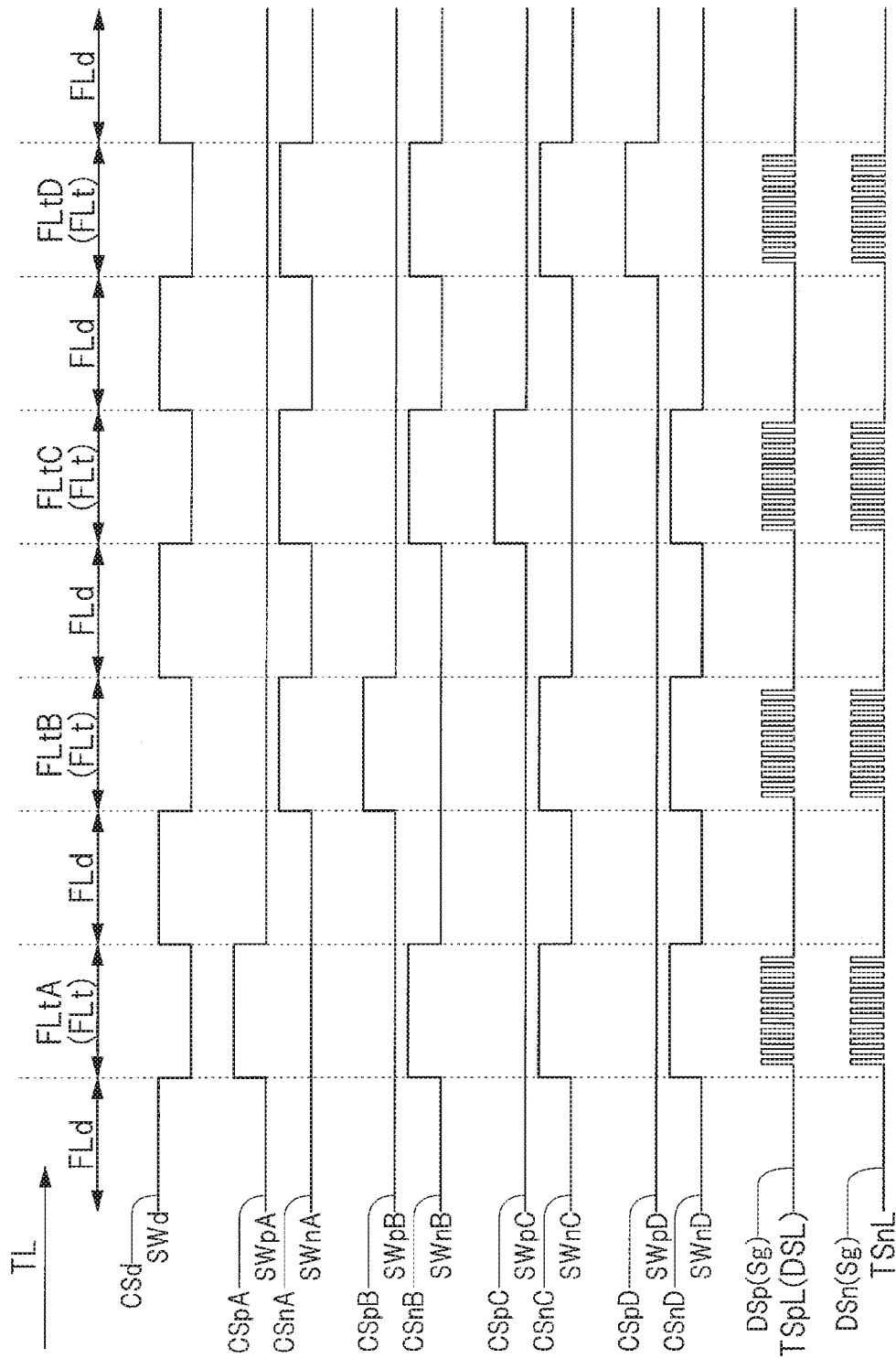
FIG. 11 is an explanatory diagram illustrating an example of a timing chart of a display processing operation and a touch detection operation in the display device illustrated in FIG. 3.
Figure 12:
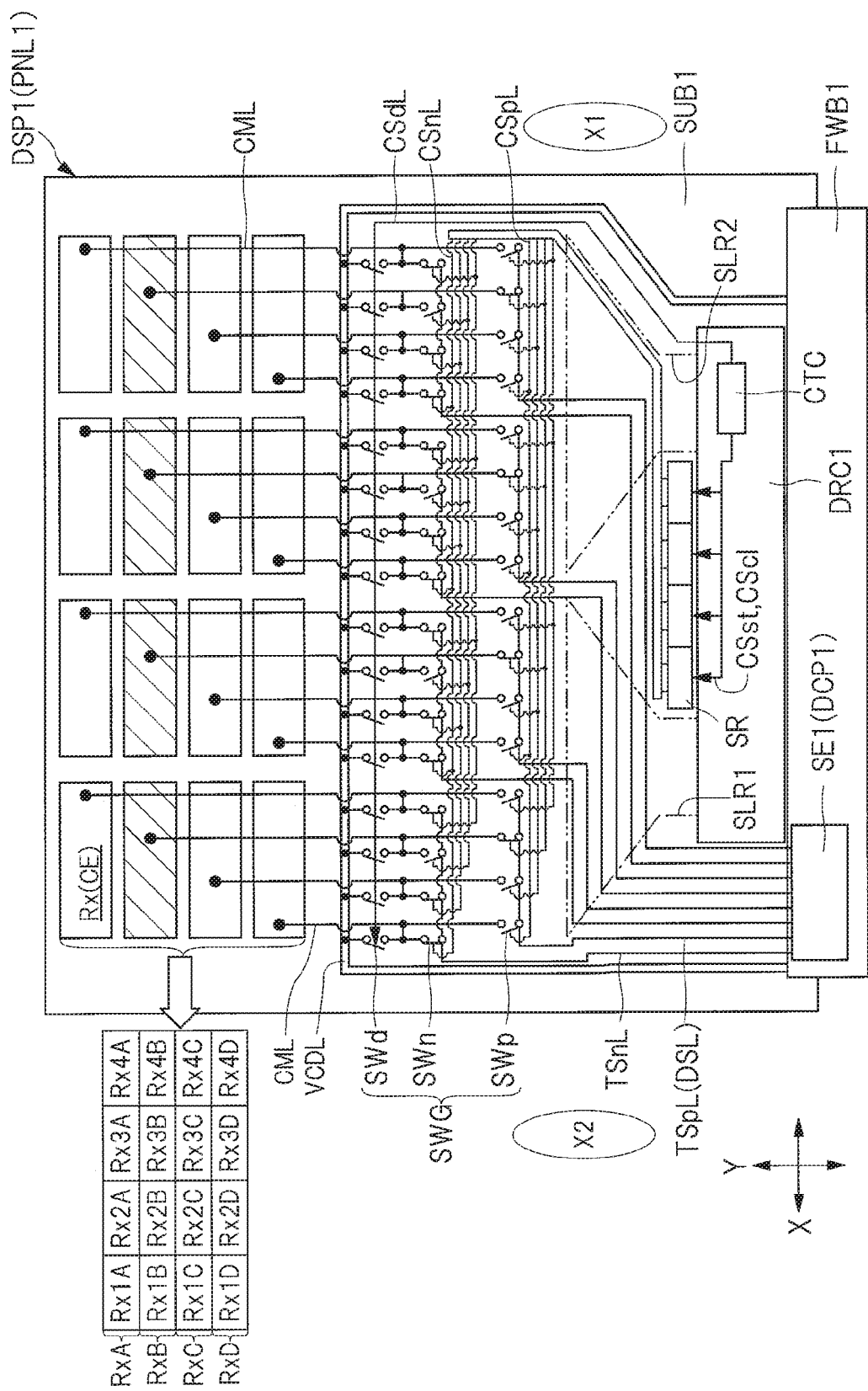
FIG. 12 is a plan view illustrating an example of a wire layout connected to a touch detection circuit illustrated in FIG. 3.
Figure 29:
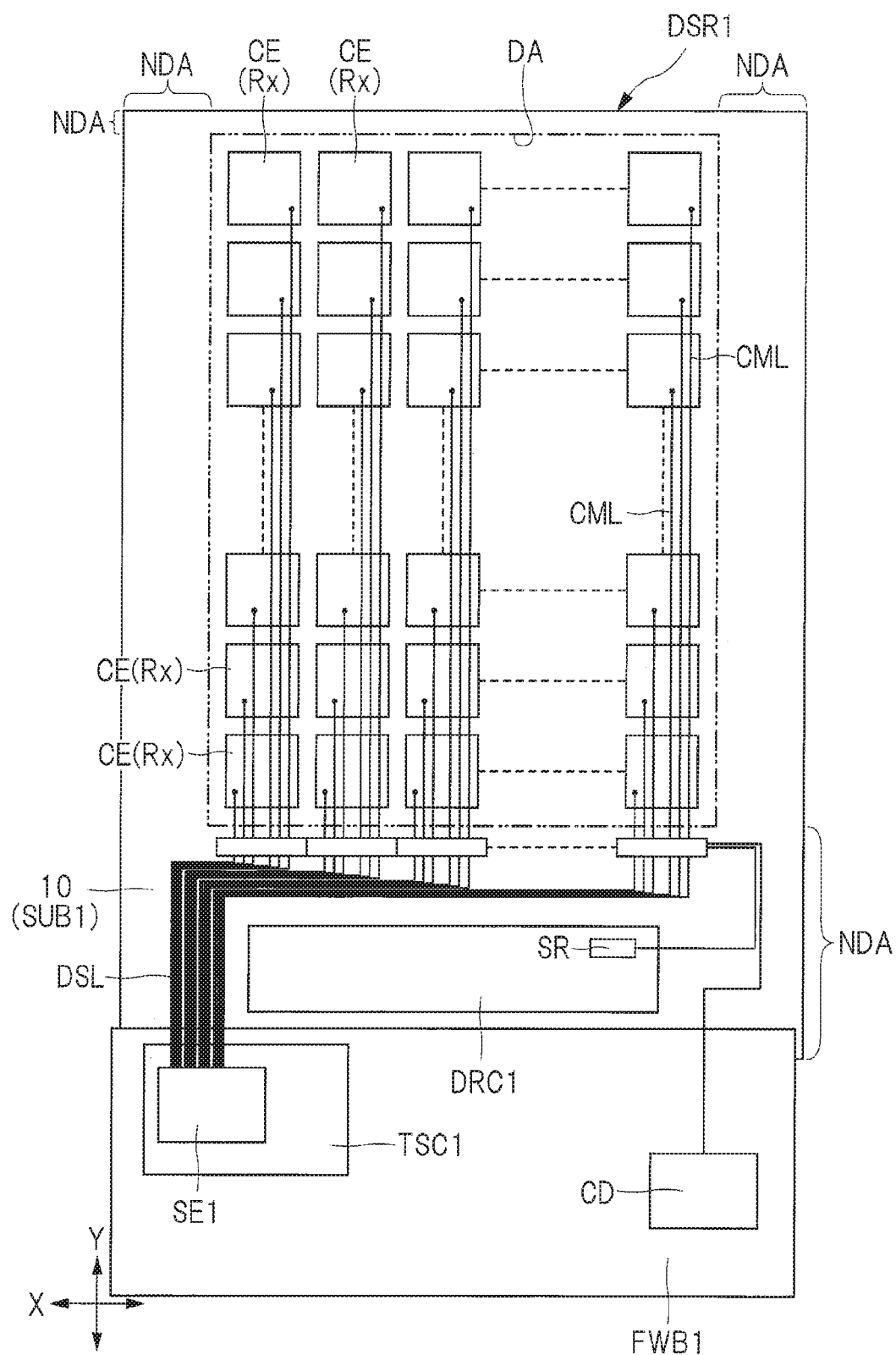
FIG. 29 is a plan view illustrating an example of a layout of detection signal lines in a display device which is a consideration example for FIG. 3.
Figure 30:
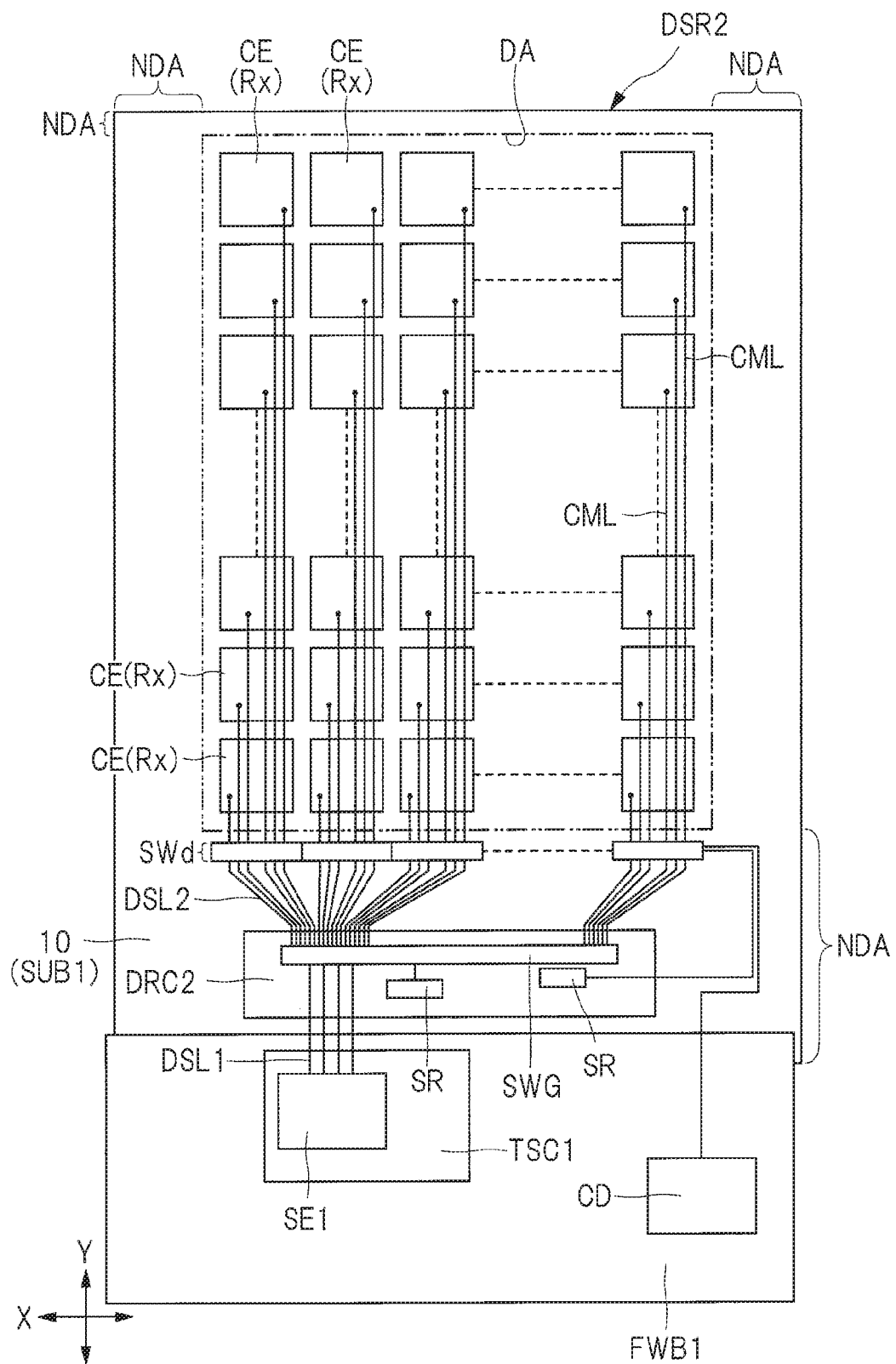
FIG. 30 is a plan view illustrating an example of a layout of detection signal lines in a display device according to another consideration example for FIG. 3.

Next, a method for detecting a touch and a method for outputting coordinates of the touch position on the touch detection surface TDS (see FIG. 2) of the display device DSP1 according to the present embodiment will be explained. FIG. 11 is an explanatory diagram illustrating an example of a timing chart of the display processing operation and the touch detection operation in the display device as illustrated in FIG. 3. FIG. 12 is a plan view illustrating an example of a wire layout connected to a touch detection circuit illustrated in FIG. 3. FIG. 12 schematically illustrates an example of a circuit operation in a detection period FLtB of a plurality of detection periods FLt illustrated in FIG. 11 in the touch detection operation using the touch detection circuit illustrated in FIG. 3. Each of FIG. 29 and FIG. 30 is a plan view illustrating an example of a layout of detection signal lines in a display device according to a consideration example for FIG. 3.

FIG. 12 illustrates an example in which a plurality of detection electrodes Rx are arranged in a form of "4 rows×4 columns" for easily seeing the drawings. A reference symbol corresponding to an arrangement position is added to each of the plurality of detection electrodes Rx. In FIG. 12, for easily seeing the drawings, the arrangement pattern of the plurality of detection electrodes Rx are schematically illustrated so as to be next to the diagram, and the reference symbol corresponding to the arrangement position is shown in the arrangement pattern. In FIG. 12, while a plurality of switch elements SWd, a plurality of switch elements SWn, and a plurality of switch elements SWp are arranged along the X axis direction, a reference symbol is representatively attached to a switch element at one end of each arrangement for easily seeing the drawings. In FIG. 12, hatching is added to a detection electrode Rx in a selected state as a target of touch detection among the plurality of detection electrodes Rx. For example, FIG. 12 exemplifies the ON/OFF states of the switch in the detection period FLtB of each period illustrated in FIG. 11, and illustrates a state in which a detection unit RxB is selected.

As illustrated in FIG. 11, the display device DSP1 according to the present embodiment includes a display operation period for performing a display operation for forming an image displayed on the display surface DS (see FIG. 2) and a touch detection operation period for performing a touch detection operation for detecting touch of an object such as a finger with the touch detection surface TDS. Hereinafter, in the present specification, the display operation period will be referred to as a display period, and the touch detection operation period will be referred to as a detection period. However, a term such as a display operation period, a touch detection operation period, a touch detection period, or others is exceptionally used in some cases.

The display device DSP1 repeatedly performs the display operation and the touch detection operation. For this reason, in the time chart illustrated in FIG. 11, a plurality of display periods FLd and a plurality of detection periods FLt are repeatedly alternately performed along a time axis TL. Note that the method by which the display device DSP1 switches the display period FLd and the detection period FLt is not particularly limited, and various methods can be applied. For example, as illustrated in FIG. 12, when the display device DSP1 includes a control circuit unit CTC provided with a timing control circuit for controlling the operation timing of each circuit of the display device DSP1, the display period FLd and the detection period FLt are switched to each other by the control circuit unit CTC. The control circuit unit CTC includes one or more control circuits capable of outputting a start pulse signal CSst, a clock signal CScl, or a control signal such as a reset signal (not shown), and each circuit of the display device DSP1 receives an input of the control signal and switches the operation states. FIG. 12 schematically illustrates a state in which the control circuit unit CTC outputs the start pulse signal CSst and the clock signal CScl to the shift register circuit SR. In the example illustrated in FIG. 12, the control circuit unit CTC is formed in the driver chip DRC1. However, the position at which the control circuit unit CTC is formed has various modifications. For example, the control circuit unit CTC may be formed in the substrate SUB1, the flexible wiring board FWB1, or the detection chip TSC1 illustrated in FIG. 3.

Incidentally, the methods for performing the touch detection for each of the plurality of detection electrodes Rx include a method for performing the touch detection operation with the same timing for all of the plurality of detection electrodes Rx. In other words, the methods include a method for collectively detecting changes of electrostatic capacitances of all the plurality of detection electrodes Rx. However, in this case, as seen in the display device DSR1 according to the consideration example illustrated in FIG. 29, it is required to electrically connect each of the plurality of detection electrodes Rx with the detection unit SE1 via the detection signal lines DSL isolated from each other. In this case, the arrangement density of the detection signal lines DSL increases, and therefore, a space where other wires (for example, the signal connection wires SCL and others) are arranged is limited.

Methods for improving the density of the wires per unit area in a plan view include a method of arranging a plurality of wires so as to overlap each other by stacking a plurality of wire layers so as to overlap each other in the thickness direction. However, the larger the number of stacked wire layers is, the higher a difficulty level of a technique of stacking the plurality of wire layers in the thickness direction is, and therefore, the manufacturing process is more complicated. When a plurality of wire paths overlap in the thickness direction, an electric current flowing in one of the wire paths has an influence as a noise component on a signal transmitted in the other wire path depending on the type of the signal transmitted in each wire path and how the wire paths overlap each other. In particular, in the touch detection based on the self-capacitive method, the path transmitting the detection signal is easier to be influenced by the noises than that in the touch detection based on the mutual-capacitive method. Therefore, by reducing the wire density in the non-display region NDA (see FIG. 3), the noise components in the plurality of signal transmission paths are reduced, so that the reliability of the signal transmission can be improved. From the viewpoint of reducing the wire density in the non-display region NDA, it is preferable to reduce the number of detection signal lines DSL arranged in the non-display region NDA.

Accordingly, the display device DSP1 according to the present embodiment illustrated in FIG. 12 sequentially selects a group (also referred to as a detection unit, a detection block, or a configuration electrode group) configured by one or more detection electrodes Rx (also referred to as configuration electrodes) of the plurality of detection electrodes Rx in the detection period FLt (see FIG. 11), and performs the touch detection operation on the selected group of detection electrodes Rx. In the example illustrated in FIG. 12, each of a plurality of detection electrodes Rx is configured so that four detection electrodes Rx arranged along the X axis direction configure a detection unit which is a group of detection electrodes Rx detected in a single detection period FLt illustrated in FIG. 11. In the example as illustrated in FIG. 12, a detection unit RxA, a detection unit RxB, a detection unit RxC, and a detection unit RxD detected in the detection periods FLt at different timings from one another are arranged long the Y axis direction.

Each of the detection electrodes Rx configuring each detection unit can also be expressed as follows. That is, the detection unit RxA configured by a plurality of detection electrodes Rx includes a configuration electrode Rx1A, a configuration electrode Rx2A, a configuration electrode Rx3A, and a configuration electrode Rx4A, which are arranged long the X axis direction. The detection unit RxB configured by a plurality of detection electrodes Rx includes a configuration electrode Rx1B, a configuration electrode Rx2B, a configuration electrode Rx3B, and a configuration electrode Rx4B, which are arranged long the X axis direction. The detection unit RxC configured by a plurality of detection electrodes Rx includes a configuration electrode Rx1C, a configuration electrode Rx2C, a configuration electrode Rx3C, and a configuration electrode Rx4C, which are arranged long the X axis direction. The detection unit RxD configured by a plurality of detection electrodes Rx includes a configuration electrode Rx1D, a configuration electrode Rx2D, a configuration electrode Rx3D, and a configuration electrode Rx4D, which are arranged long the X axis direction.

In the detection period FLtA which is the first detection period of the plurality of detection periods FLt illustrated in FIG. 11, the detection electrodes Rx which belong to the detection unit RxA illustrated in FIG. 12 are selected. In other words, in the detection period FLtA, the touch detection operation based on the touch detection operation explained with reference to FIG. 5 to FIG. 10 is performed on each of the configuration electrodes Rx1A to the configuration electrode Rx4A which belong to the detection unit RxA.

In the display period FLd that is performed after the detection period FLt, a display image is formed by driving the liquid crystal layer LQ (see FIG. 2) which is an electro-optical layer based on the video signal as explained with reference to FIG. 1 to FIG. 4. Although described in detail later, the detection period FLt and the display period FLd are switched to each other by operating the switch element SWd, the switch element SWp, and the switch element SWn included in the switch circuit unit SWG on the basis of the control signal that is output from the control circuit unit CTC illustrated in FIG. 12.

Next, in the detection period FLtB which is the second detection period of the plurality of detection periods FLt illustrated in FIG. 11, the detection electrodes Rx which belong to the detection unit RxB illustrated in FIG. 12 are selected. In other words, in the detection period FLtB, the touch detection operation based on the self-capacitive method explained with reference to FIG. 5 to FIG. 10 is performed on each of the configuration electrode Rx1B to the configuration electrode Rx4B which belong to the detection unit RxB. The switching operation from the display period FLd to the detection period FLtB is performed by operating the switch element SWd, the switch element SWp, and the switch element SWn included in the switch circuit unit SWG on the basis of the control signal that is output from the control circuit unit CTC illustrated in FIG. 12.

Hereinafter, similarly, the detection period FLtC and the detection period FLtD illustrated in FIG. 11 are performed while alternately performing the display period FLd and the detection period FLt. The operations performed in the detection period FLtC and the detection period FLtD are the same as those of the detection period FLtA and the detection period FLtB, and therefore, repetitive explanation is omitted.

In the case of the display device DSP1 illustrated in FIG. 12, the touch detection operation for all the detection electrodes Rx is completed when the touch detection operation for the detection electrodes Rx which belong to the detection unit RxD is completed in the detection period FLtD (see FIG. 11). When there is a detection electrode Rx on which the touch has been detected in a period from the detection period FLtA to the detection period FLtD, the coordinates of the position of the detection electrode Rx on which the touch has been detected on the touch detection surface TDS (see FIG. 2) are calculated, and the coordinate data is output to an external circuit. An external circuit not shown changes the image of the display region DA based on the obtained coordinate data. The calculation of the position coordinates and the output of the coordinate data may be performed by, for example, a circuit (for example, a data processing circuit such as an arithmetic processing circuit) included in the detection unit SE1 illustrated in FIG. 12. However, the place where the data processing circuit is formed is not limited to the detection unit SE1. For example, the data processing circuit may be formed on the substrate SUB1, or may be formed inside the driver chip DRC1. The data processing circuit may be formed on the flexible wiring board FWB1 or may be formed at a location away from the display panel PNL1 and connected to the flexible wiring board FWB1.

When there is no detection electrode Rx on which the touch has been detected in a period from the detection period FLtA to the detection period FLtD, the coordinate data is not output to the external circuit. Alternatively, to the external circuit, the data processing circuit may output a signal which means that there is no detection electrode Rx on which the touch has been detected.

Regardless of the presence or absence of the detection electrode Rx on which the touch has been detected, the display device DSP1 repeatedly performs the cycles of the touch detection operation from the detection period FLtA to the detection period FLtD illustrated in FIG. 11. As a result, the presence or absence of the touch can be continuously monitored.

In the case of the method (hereinafter referred to as a "detection unit selection method") which sequentially selects a detection unit configured by one or more detection electrodes Rx and performing the touch detection operations in order as described in the method of the present embodiment, the number of detection signal lines DSL connected to the detection unit SE1 can be reduced. For example, in the example as illustrated in FIG. 12, When the touch detection operation is performed at the same timing for all of the sixteen detection electrodes Rx, the number of the detection signal lines DSL is required to be sixteen. However, as illustrated in FIG. 12, when the detection units RxA, RxB, RxC, and RxD, each of which is configured by four detection electrodes Rx, are sequentially selected, the number of the detection signal lines DSL is required to be only four. In the example as illustrated in FIG. 12, note that eight wires including four detection signal lines DSL are connected to the detection unit SE1. The reason for this will be explained later.

As explained above, When the detection unit selection method is applied, circuits for performing the touch detection operation can be sequentially selected when the switch circuit unit SWG is interposed between the plurality of detection electrodes Rx and the detection unit SE1. Therefore, the number of detection signal lines DSL connected to the detector DET of the detection unit SE1 illustrated in FIG. 9 can be reduced. However, by the studies made by the inventors of the present application, it has been found out that new problems arise depending on the layout of the switch circuit unit SWG. More specifically, when the switch circuit unit SWG is formed in the driver chip DRC2 as similar to the display device DSR2 illustrated as a consideration example in FIG. 30, the number of detection signal lines DSL1 that electrically connect the switch circuit unit SWG of the driver chip DRC2 and the detection unit SE1 can be reduced. However, the number of the detection signal lines DSL2 that electrically connect the switch circuit unit SWG of the driver chip DRC2 and the plurality of detection electrodes Rx is required to be as many as the number of detection electrodes Rx.

In this case, it is required to connect a plurality of detection signal lines DSL2 to the driver chip DRC2 while the plurality of detection signal lines DSL2 are isolated from each other, and therefore, the number of terminals of the driver chip DRC2 is large. The increase in the number of terminals of the driver chip DRC2 results in the increase in the size of the driver chip DRC2 and the complexity in the structure of the driver chip DRC2. The increase in the size of the driver chip DRC2 or the complexity in the structure of the driver chip DRC2 results in a decrease in the manufacturing efficiency of the driver chip DRC2.

Therefore, as illustrated in FIG. 12, in the display device DSP1 according to the present embodiment, the switch circuit unit SWG including the switch element SWp and the switch element SWn is disposed outside the driver chip DRC1. In other words, the switch circuit unit SWG including the switch element SWp and the switch element SWn is electrically connected to the detection electrode Rx without the driver chip DRC1 interposed therebetween. In the example as illustrated in FIG. 12, each of the switch element SWp and the switch element SWn is electrically connected to the detection electrode Rx via the common line CML connected to the drain electrode DT (see FIG. 13). The common line CML extends along the Y axis direction from the connection portion with the detection electrode Rx to the connection portion with each of the switch element SWp and the switch element SWn. The switch elements SWp, SWn are connected to a control wire (a control signal line CSpL or a control signal line CSnL) through which a gate electrode GE (see FIG. 13) is controlled to be turned ON and OFF, and is connected to a source wire (a driving signal line TSpL or a guard signal line TSnL) through which a source electrode ST (see FIG. 13) is connected to a detection circuit DCP1 (see FIG. 3).

When the switch circuit unit SWG is arranged outside the driver chip DRC1 as seen in the display device DSP1, the number of wires connected to the driver chip DRC1 (a driver chip DRC2 in FIG. 30) can be reduced smaller than that of the display device DSR2 illustrated in FIG. 30. More specifically, the display device DSP1 illustrated in FIG. 12 can have the smaller number of terminals than that of the driver chip DRC2 illustrated in FIG. 30. Therefore, the increase in the size of the driver chip DRC1 can be suppressed. Alternatively, the structure of the driver chip DRC1 can be simplified. By the simplification of the structure of the driver chip DRC1, the versatility of the driver chip DRC1 can be improved. And, by the suppression of the increase in the size of the driver chip DRC1 and the simplification of the structure of the driver chip DRC1, the manufacturing efficiency of the driver chip DRC1 can be improved.

Various wires concentrate on the periphery of the driver chip DRC1. Therefore, when the switch circuit unit SWG is connected to the driver chip DRC2 as illustrated in FIG. 30, the limitation on the layout of the detection signal line DSL2 is large. However, when the switch circuit unit SWG is connected to the detection unit SE1 without the driver chip DRC1 interposed therebetween as described in the present embodiment, a plurality of detection signal lines DSL can be arranged at the position except the periphery of the driver chip DRC1. In this case, the degree of freedom of the design of the wire layout of the detection signal line DSL can be improved. Alternatively, when the plurality of detection signal lines DSL are arranged, a pitch between the adjacent detection signal lines DSL can be easily reduced.

Figure 13:
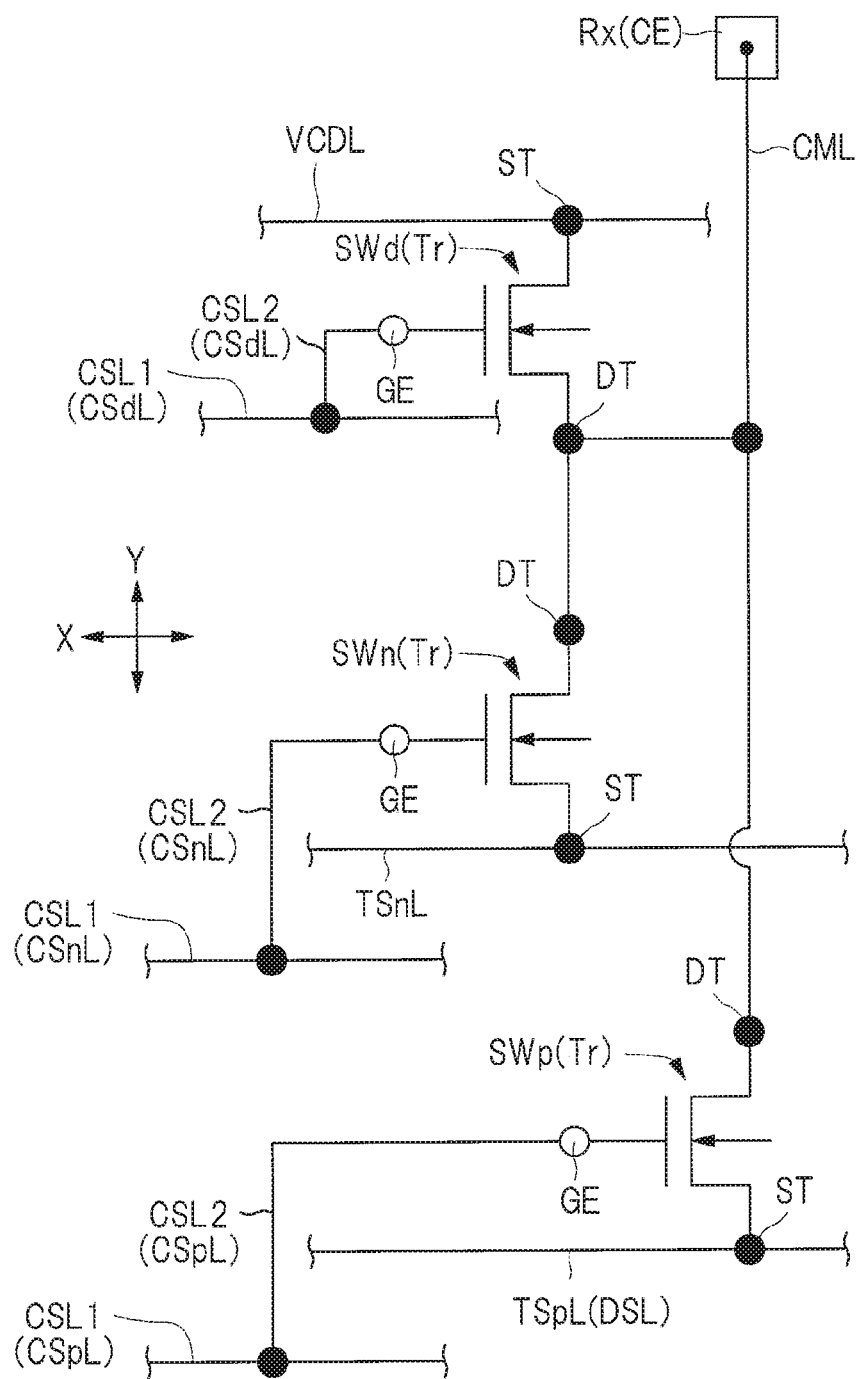
FIG. 13 is a circuit diagram illustrating an example of switch elements illustrated in FIG. 12.
Figure 14:
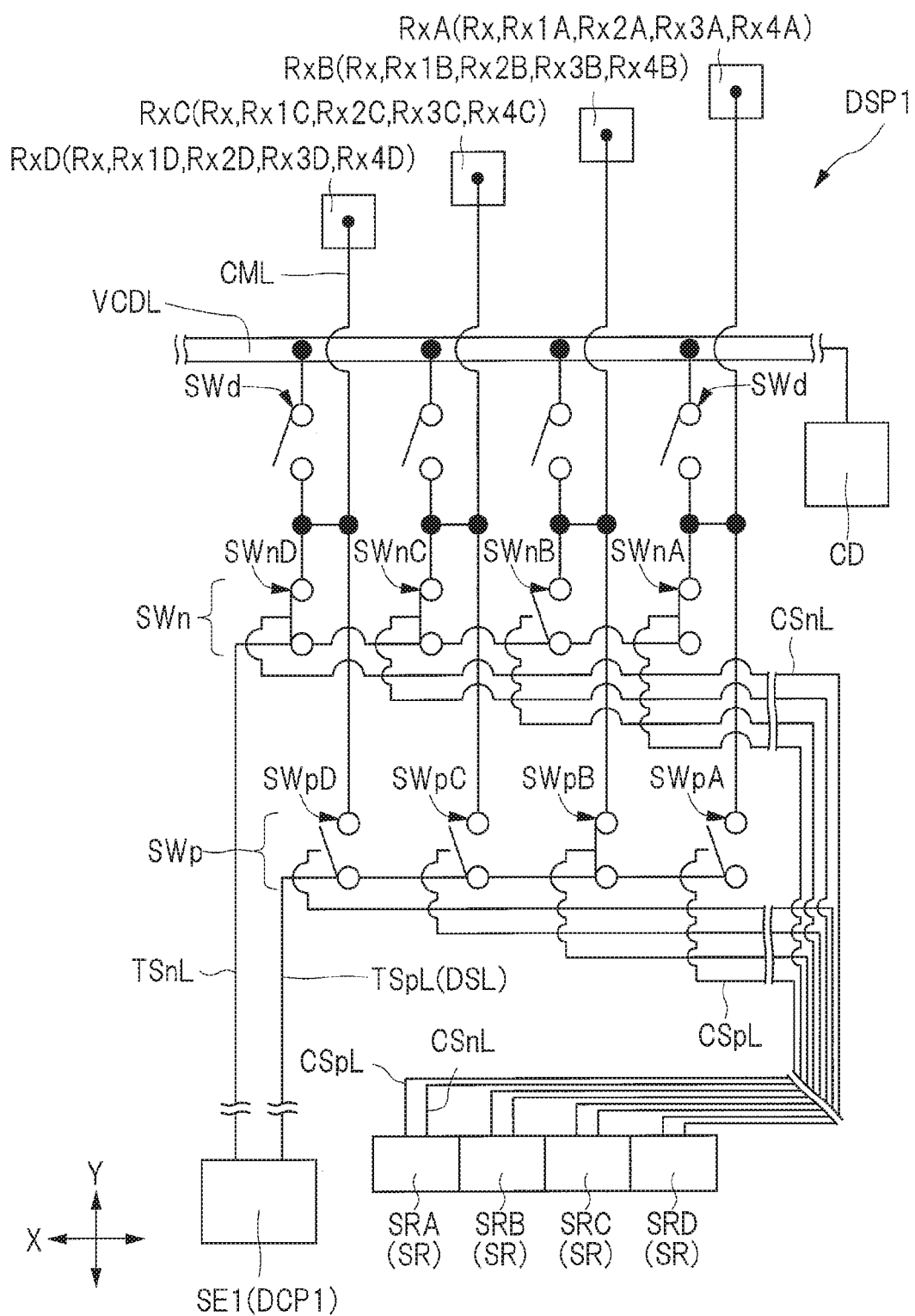
FIG. 14 is an enlarged plan view illustrating a portion of the switch circuit unit illustrated in FIG. 12.

Next, the layout of each circuit component illustrated in FIG. 12 and an operation of the circuit illustrated in FIG. 12 in each period illustrated in FIG. 11 will be explained in detail with reference to FIG. 11, FIG. 12, and FIG. 13 and FIG. 14 which are partial enlarged views of FIG. 12. FIG. 13 is a circuit diagram illustrating an example of switch elements illustrated in FIG. 12. FIG. 14 is a plan view illustrating a part of the switch circuit unit illustrated in FIG. 12 so as to be enlarged.

As described above, the switch circuit unit SWG illustrated in FIG. 12 includes the switch element SWd, the switch element SWp, and the switch element SWn operated to be turned ON/OFF at a timing of the switching between the detection period FLt and the display period FLd illustrated in FIG. 11. The detection period FLt and the display period FLd are switched to each other by the ON/OFF operation of each switch element of the switch circuit unit SWG based on the control signal that is output from the control circuit unit CTC illustrated in FIG. 12. In FIG. 12, each switch element is denoted by a circuit symbol of a general switch in order to easily understanding the ON/OFF state of the switch element. Each of the switch element SWd, the switch element SWp, and the switch element SWn is a transistor element Tr as illustrated in FIG. 13, and is, for example, a field effect transistor having a gate electrode GE.

As illustrated in FIG. 3 already explained, the switch circuit unit SWG of the display device DSP1 is in a part of the non-display region NDA of regions on the substrate SUB1, the part being outside the driver chip DRC1. Therefore, each of the switch element SWd, the switch element SWp, and the switch element SWn included in the switch circuit unit SWG illustrated in FIG. 12 is a thin film transistor (TFT) as similar to, for example, the pixel switch element PSW explained with reference to FIG. 4. The transistor element Tr (see FIG. 13) that configures each switch element may be either a top gate type TFT or a bottom gate type TFT. The semiconductor layer of the transistor element is made of, for example, polycrystalline silicon (polysilicon). However, the semiconductor layer of the transistor element may be made of amorphous silicon.

As illustrated in FIG. 13, each of the plurality of transistor elements Tr has a source electrode ST and a drain electrode DT. The common potential supply line VCDL connected to the source electrode ST of the switch element SWd and supplying the driving potential to the detection electrode Rx serving as the common electrode CE in the display period FLd (see FIG. 11) can also be interpreted as a source wire for supplying a driving potential for display. The detection signal line DSL connected to the source electrode ST of the switch element SWp and transmitting a detection signal from the detection electrode Rx in the detection period FLt (see FIG. 11) can also be interpreted as a source wire for transmitting the detection signal. As described below, note that the detection signal line DSL uses the same wire as the driving signal line TSpL supplying a driving signal DSp that is output from the detection unit SE1 (see FIG. 12) to the selected detection electrode Rx in the detection period FLt. For this reason, the driving signal line TSpL can also be interpreted as a source wire for transmitting the driving signal. The guard signal line TSnL connected to the source electrode ST of the switch element SWn and supplying a guard signal DSn (described in detail later) that is output from the detection unit SE1 to a non-selected detection electrode Rx in the detection period FLt (see FIG. 11) can also be interpreted as a source wire for transmitting the guard signal.

The switch element SWd included in the switch circuit unit SWG illustrated in FIG. 12 electrically connects each of a plurality of detection electrodes Rx and the common electrode driving circuit CD illustrated in FIG. 3 in the display period FLd illustrated in FIG. 11. More specifically, as illustrated in FIG. 14, one terminal (the drain electrode DT illustrated in FIG. 13) of the switch element SWd is electrically connected to the detection electrode Rx. Still more specifically, one terminal of the switch element SWd is electrically connected to the detection electrode Rx via the common line CML. The other terminal (the source electrode ST illustrated in FIG. 13) of the switch element SWd is electrically connected to the common electrode driving circuit CD. More specifically, as illustrated in FIG. 14, the other terminal of the switch element SWd is electrically connected to the common electrode driving circuit CD via the common potential supply line VCDL which is the wire path for supplying the common potential (i.e., common driving potential) to a plurality of detection electrodes Rx operated as the common electrode CE (see FIG. 12) in the display period FLd (see FIG. 11). When the switch element SWd is turned ON, the detection electrode Rx and the common electrode driving circuit CD are electrically connected to each other. When the switch element SWd is turned OFF, the detection electrode Rx and the common electrode driving circuit CD are electrically isolated from each other. In the present embodiment, the switch element SWd is turned ON in the display period FLd, and the switch element SWd is turned OFF in the detection period FLt.

As described above, the ON/OFF operation of the switch element SWd is controlled by the control circuit unit CTC illustrated in FIG. 12. More specifically, the control circuit unit CTC is electrically connected to the gate electrode GE (see FIG. 13) of the switch element SWd via a control signal line CSdL which is a transmission path for a signal which controls the ON/OFF operation of the switch element SWd. The control circuit unit CTC outputs the control signal CSd exemplified in FIG. 11 to the gate electrode GE of each of the plurality of switch elements SWd. In the example illustrated in FIG. 11, the control circuit unit CTC (see FIG. 12) supplies the control signal CSd having a relatively high potential (high level potential) in the display period FLd. As a result, the switch element SWd is turned ON. In addition, the control circuit unit CTC supplies the control signal CSd having a relatively low potential (low level potential) in the detection period FLt. As a result, the switch element SWd is turned OFF. The relation between the level (potential level) of the control signal CSd and the ON/OFF state of the switch element SWd is an example, and the relation may be opposite to the above-described example.

In the display period FLd, for example, the same potential is supplied to all the electrodes of the detection electrodes Rx (see FIG. 12) serving as the common electrode CE (see FIG. 12). As a result, each of the plurality of switch elements SWd illustrated in FIG. 12 and FIG. 14 is turned ON at the same time in the display period FLd (see FIG. 11). Each of the switch elements SWd is turned OFF at the same time in the detection period FLt (see FIG. 11).

In the example of the present embodiment, note that a plurality of switch elements SWd are included in the switch circuit unit SWG as illustrated in FIG. 12. However, as described later as a modified example, the plurality of switch elements SWd may not be included in the switch circuit unit SWG and may be formed at positions away from the switch element SWp and the switch element SWn. In the example illustrated in FIG. 12, a plurality of switch elements SWd, a plurality of switch elements SWp, and a plurality of switch elements SWn are grouped as the switch circuit unit SWG. However, the definition of the switch circuit unit SWG has various modifications. For example, the switch circuit unit SWG may be defined as a first switch circuit unit made of a group of a plurality of switch elements SWp, a second switch circuit unit made of a group of a plurality of switch elements SWn, and a third switch circuit unit made of a group of a plurality of switch elements SWd. As described later in the second embodiment, a set of the switch element SWp and the switch element SWn connected to the detection electrodes Rx which belong to the same detection unit as each other may be defined as one switch circuit unit.

Next, from the display period FLd to the detection period FLt illustrated in FIG. 11, the switch element SWp included in the switch circuit unit SWG illustrated in FIG. 12 electrically connects the detection unit SE1 and the detection electrodes Rx which belong to the detection unit selected as a target for the touch detection. In FIG. 12, a state in which the detection unit RxB is selected is illustrated as one example. Therefore, in the detection period FLtB illustrated in FIG. 11, each of the configuration electrode Rx1B, the configuration electrode Rx2B, the configuration electrode Rx3B, and the configuration electrode Rx4B which belong to the detection unit RxB is electrically connected to the detection unit SE1 via the switch element SWpB (see FIG. 14) and the detection signal line DSL.

In the present embodiment, the touch detection is performed based on the self-capacitance method as described above. Therefore, the wire for connecting the source electrode ST (see FIG. 13) of the switch element SWp and the detection unit SE1 is the driving signal line (source wire) TSpL for touch detection for supplying the driving signal DSp illustrated in FIG. 11, and is also the detection signal line DSL for transmitting the output signal from the detection electrode Rx to the detector DET (see FIG. 9). The driving signal DSp illustrated in FIG. 11 has a pulse potential corresponding to the alternate current square wave Sg illustrated in FIG. 10, and is a signal obtained by repeatedly applying a pulse potential having a potential difference corresponding to the voltage Vdr to the potential of the reference signal Vref.

As described above, in the present embodiment, the touch detection is sequentially performed on the selected detection unit of the plurality of detection electrodes Rx. Therefore, a non-selected detection electrode Rx that is not selected as the target for the touch detection is electrically isolated from the detection signal line DSL in the detection period FLt (see FIG. 11). That is, in one of the plurality of detection periods FLt illustrated in FIG. 11, the switch element SWp connected to the configuration electrode which belongs to the non-selected detection unit is turned OFF. In FIG. 12, the detection unit RxB is selected as one example. As a result, each of the switch elements SWpA, SWpC, and the switch element SWpD of the plurality of switch elements SWp illustrated in FIG. 14 is turned OFF. In other words, each of the configuration electrode Rx1A to the configuration electrode Rx4A, the configuration electrode Rx1C to the configuration electrode Rx4C, and the configuration electrode Rx1D to the configuration electrode Rx4D illustrated in FIG. 12 is electrically isolated from the detection signal line DSL.

The system for selectively connecting some of the plurality of detection electrodes Rx to the detection signal line DSL as described above is achieved by the following configuration. More specifically, as illustrated in FIG. 14, one terminal (the drain electrode DT illustrated in FIG. 13) of the switch element SWp is electrically connected to the detection electrode Rx. More specifically, one terminal of each of the plurality of switch elements SWp is connected via the common line CML to the detection electrode Rx which belongs to any one of the detection unit RxA to the detection unit RxD. The other terminal (the source electrode ST illustrated in FIG. 13) of the switch element SWp is electrically connected to the detection unit SE1. More specifically, as illustrated in FIG. 14, the other terminal of each of the switch element SWpA, the switch element SWpB, the switch element SWpC, and the switch element SWpD is electrically connected to the detection unit SE1 via one detection signal line DSL.

The control signal lines CSpL isolated from each other are connected to the respective gate electrodes GE (see FIG. 13) of the switch element SWpA, the switch element SWpB, the switch element SWpC, and the switch element SWpD. The control signal line CSpL is connected to the gate electrode GE (see FIG. 13) of the transistor element Tr (see FIG. 13), and is a gate line (also referred to as a gate wire) for controlling the ON/OFF operation of the switch element SWp. Each of the switch element SWpA, the switch element SWpB, the switch element SWpC, and the switch element SWpD is connected to the shift register circuit SR via the control signal line CSpL.

The ON/OFF operation of the switch element SWp is controlled by the shift register circuit SR. The shift register circuit SR includes shift register circuits SRA, SRB, SRC, and a shift register circuit SRD which are unit registers. The shift register circuit SR outputs control signals CSpA, CSpB, CSpC, or a control signal CSpD (see FIG. 11) serving as the gate voltage for turning ON the transistor element Tr via the control signal line CSpL to the gate electrodes GE (see FIG. 13) of the plurality of transistor elements Tr (see FIG. 13) configuring the plurality of switch elements SWp. More specifically, the shift register circuit SR supplies the control signals CSpA, CSpB, CSpC, or the control signal CSpD serving as the gate voltage to the gate electrodes GE of the transistor elements Tr serving as the switch elements based on the start pulse signal CSst or the clock signal CScl from the control circuit unit CTC.

In the example illustrated in FIG. 11, the shift register circuit SRA (see FIG. 14) outputs a control signal CSpA having a relatively high potential (high level potential) to the switch element SWpA in the detection period FLtA. The switch element SWpA is turned ON. The control circuit unit CTC supplies a control signal CSpA having a relatively low potential (low level potential) in the display period FLd. As a result, the switch element SWpA is turned OFF.

Next, the shift register circuit SRB (see FIG. 14) outputs a control signal CSpB having a relatively high potential (high level potential) to the switch element SWpB in the detection period FLtB. The switch element SWpB is turned ON. The control circuit unit CTC supplies a control signal CSpB having a relatively low potential (low level potential) in the display period FLd. As a result, the switch element SWpB is turned off.

Although repeated explanation is omitted, the shift register circuit SRC controls the ON/OFF operation of the switch element SWpC in the detection period FLtC by the output of the control signal CSpC, and the shift register circuit SRD controls the ON/OFF operation of the switch element SWpD in the detection period FLtD by the output of the control signal CSpD. Note that the relation between the levels (potential levels) of the control signals CSpA, CSpB, CSpC, and CSpD and the ON/OFF states of the switch element SWpA, the switch element SWpB, the switch element SWpC, and the switch element SWpD are merely an example. The relation may be opposite to the above-described example.

The shift register circuit SR illustrated in FIG. 13 is a control circuit for controlling the ON/OFF operations of the switch element SWp and the switch element SWn explained later. As the control signal for controlling the timing of the operation of the shift register circuit SR itself, for example, the control signal such as the start pulse signal CSst and the clock signal CScl may be output from the control circuit unit CTC to the shift register circuit SR as illustrated in FIG. 12.

As described above, in the present embodiment, in a plurality of time-divided detection periods FLt, the shift register circuit SR sequentially turns ON the switch element SWpA, the switch element SWpB, the switch element SWpC, and the switch element SWpD. In this case, when a selected switch element SWp of the plurality of switch elements SWp is turned ON, the non-selected switch element SWp is turned OFF. In other words, all the switch elements SWp are not turned ON or OFF at the same time. However, as explained above with reference to FIG. 9 and FIG. 10, the plurality of switch elements SWp illustrated in FIG. 13 may be turned OFF at the same time at the timing at which both of the switch SW1 and the switch SW2 illustrated in FIG. 9 are turned OFF during the period of the reset operation for resetting the voltage Vdet serving as the output of the detector DET illustrated in FIG. 9 by the reset operation. Although not illustrated in FIG. 11, the reset operation is performed after, for example, the change from the display period FLd to the detection period FLt, or the change from the detection period FLt to display period FLd. Alternatively, the reset operation may be performed after, for example, the change from the display period FLd to the detection period FLt and the change from the detection period FLt to the display period FLd.

The switch circuit unit SWG according to the present embodiment includes a plurality of switch elements SWn in addition to the switch element SWp. Although not illustrated in the drawings, each of the plurality of switch elements SWn illustrated in FIG. 12 may not be provided as a modification of the present embodiment. In this case, the guard signal line TSnL which is connected to the switch element SWn is not required, either. Therefore, the number of wires connected to the detection unit SE1 is smaller than that of the display device DSP1 illustrated in FIG. 12.

However, it is preferable to provide the switch element SWn from the viewpoint of the reduction of noises influenced by the non-selected detection electrode Rx (see FIG. 12) in the detection period FLt illustrated in FIG. 11. The reason for this will be explained below.

As described in the present embodiment, when the detection unit selection method described above is adopted, a potential difference is made between the non-selected detection electrode Rx and the selected detection electrode Rx by the supply of the driving potential to the selected detection electrode Rx, so that a parasitic capacitance is generated in some cases. For example, when a driving signal DSp (see FIG. 11) is input into the selected detection electrode Rx, a non-selected detection electrode Rx is influenced by the driving signal DSp. If the non-selected detection electrode Rx is in the floating state by turning OFF the switch element SWp connected to the non-selected detection electrode Rx, the influence of the parasitic capacitance can be reduced. However, when a signal having the same waveform as that of the driving signal DSp is input into the non-selected detection electrode Rx, the influence of the parasitic capacitance can be further reduced.

Therefore, in the present embodiment, a guard signal DSn (see FIG. 11) having the same waveform as that of the driving signal DSp is supplied to the non-selected detection electrode Rx by using the plurality of switch elements SWn illustrated in FIG. 12. More specifically, the switch element SWn is turned ON from the display period FLd to the detection period FLt as illustrated in FIG. 11, so that the detection electrode Rx on which the touch has not been detected and the detection unit SE1 are electrically connected to each other. In FIG. 12, a state in which the detection unit RxB is selected is illustrated as one example. As a result, in the detection period FLtB (see FIG. 11), the configuration electrode Rx1A to the configuration electrode Rx4A, the configuration electrode Rx1C to the configuration electrode Rx4C, and the configuration electrode Rx1D to the configuration electrode Rx4D are electrically connected to the detection unit SE1 via the switch element SWnA, the switch element SWnC, and the switch element SWnD illustrated in FIG. 14, respectively. The plurality of switch elements SWn connect the non-selected detection electrodes Rx with the detection unit SE1 via the guard signal line TSnL.

On the other hand, the switch element SWnB (see FIG. 14) connected with each of the configuration electrode Rx1B to the configuration electrode Rx4B which belong to the detection unit RxB is turned OFF. Therefore, each of the configuration electrode Rx1B to the configuration electrode Rx4B is electrically isolated from the guard signal line TSnL.

As described above, the switch element SWn operates so as to be in the ON/OFF state that is opposite to the state of the corresponding switch element SWp. For example, when the switch element SWpA (first switch element) is in the ON state, the switch element SWnA (second switch element) is in the OFF state. In this case, the switch element SWpB, the switch element SWpC, and the switch element SWpD are in the OFF state. Accordingly, the switch element SWnB, the switch element SWnC, and the switch element SWnD are in the ON state. The switch element SWpA and the switch element SWnA are connected to the common configuration electrode Rx1A. Further, as illustrated in FIG. 12, the gate electrodes of the switch element SWpA (third switch element, see FIG. 14) connected to the configuration electrode Rx2A and the switch element SWpA (see FIG. 14) connected to the configuration electrode Rx1A are connected to the common control wire CSpL.

In the detection period FLt illustrated in FIG. 11, the operation of selectively connecting the non-selected detection electrode Rx and the guard signal line TSnL to supply the guard signal DSn is achieved by the following configuration. More specifically, as illustrated in FIG. 14, one terminal (the drain electrode DT illustrated in FIG. 13) of the switch element SWn is electrically connected to the detection electrode Rx. More specifically, one terminal of each of the plurality of switch elements SWn is connected via the common line CML to the detection electrode Rx which belongs to any one of the detection unit RxA to detection unit RxD. The other terminal (the source electrode ST illustrated in FIG. 13) of the switch element SWn is electrically connected to the detection unit SE1. More specifically, as illustrated in FIG. 14, the other terminal of each of the switch element SWnA, the switch element SWnB, the switch element SWnC, and the switch element SWnD (see FIG. 14) is electrically connected to the detection unit SE1 via one guard signal line TSnL.

To the respective gate electrode GE (see FIG. 13) of the switch element SWnA, the switch element SWnB, the switch element SWnC, and the switch element SWnD, the control signal lines CSnL isolated from each other are connected. The control signal line CSnL is connected to the gate electrode GE (see FIG. 13) of the transistor element Tr (see FIG. 13), and is a gate line (also referred to as a gate wire) for controlling the ON/OFF operation of the switch element SWn. Each of the switch element SWnA, the switch element SWnB, the switch element SWnC, and the switch element SWnD is connected to the shift register circuit SR via the control signal line CSnL.

The ON/OFF operation of the switch element SWn is controlled by the shift register circuit SR. More specifically, the shift register circuit SR outputs the control signal CSnA, CSnB, CSnC, or CSnD exemplified in FIG. 11 via the control signal line CSnL to the gate electrode GE (see FIG. 13) of each of the plurality of switch elements SWn. In the example illustrated in FIG. 11, in the detection period FLtA, the shift register circuits SRB, SRC, and SRD (see FIG. 14) output control signals CSnB, CSnC, and the control signal CSnD having a relatively high potential (high level potential) to the switch elements SWnB, SWnC, SWnD. Therefore, each of the switch element SWnB, the switch element SWnC, and the switch element SWnD connected to the non-selected detection electrode Rx is turned ON. In the display period FLd, the shift register circuit SRA supplies the control signal CSnA having a relatively low potential (low level potential). As a result, the switch element SWnA is turned OFF. In other words, the shift register circuit SRA controls the first switch circuit including the switch element SWpA and the switch element SWnA which belong to the same detection unit RxA (see FIG. 12).

Next, in the detection period FLtB, the shift register circuits SRA, SRC, and SRD (see FIG. 14) output the control signals CSnA, CSnC, and the control signal CSnD having a relatively high potential (high level potential) to the switch elements SWnA, SWnC, and SWnD. As a result, each of the switch element SWnA, the switch element SWnC, and the switch element SWnD connected to the non-selected detection electrode Rx is turned ON. In the display period FLd, the shift register circuit SRB supplies a control signal CSpB having a relatively low potential (low level potential). Accordingly, the switch element SWpB is turned OFF. In other words, the shift register circuit SRB controls the second switch circuit including the switch element SWpB and the switch element SWnB which belong to the same detection unit RxB (see FIG. 12).

Since the detection periods FLtC and FLtD can be described as being substantially the same, the repetitive explanation is omitted. Note that the relation between the levels (potential levels) of the control signals CSpA, CSpB, CSpC, and CSpD and the ON/OFF states of the switch elements SWpA, SWpB, SWpC, and SWpD is merely an example, and the relation may be opposite to the above-described example.

In the present embodiment, the control signal line CSpL and the control signal line CSnL are connected to the shift register circuits SRA, SRB, and SRC and the shift register circuit SRD. Each of the plurality of shift register circuits SR outputs an ON signal (for example, high level potential), which is pulse potential, to either one of the control signal line CSpL and the control signal line CSnL, and outputs an OFF signal (for example, low level potential) to the other. For example, when the shift register circuit SR is a complementary metal-oxide-semiconductor (CMOS) transistor element, the p-channel MOSFET and the n-channel MOSFET configure a logic inversion circuit. In this case, signals for allowing the control signal line CSpL and the control signal line CSnL to operate so as to be opposite to each other can be output to the control signal line CSpL and the control signal line CSnL in a synchronized state. Alternatively, a logic inversion circuit may be connected to either one of the control signal line CSpL and the control signal line CSnL.

In the present embodiment, as illustrated in FIG. 12, the shift register circuit SR is arranged between a region SLR1 and a region SLR2 which are arrangement regions of a plurality of signal connection wires SCL (see FIG. 1) in the direction along the X axis direction. The shift register circuit SR is arranged between the switch circuit unit SWG and the driver chip DRC1 in the direction along the Y axis direction. Each of the plurality of signal connection wires SCL illustrated in FIG. 1 electrically connects the driver chip DRC1 and the signal line SL in the display region DA. In the X axis direction, the width of the driver chip DRC1 is smaller than the width of the display region DA. Therefore, the plurality of signal connection wires SCL extend radially from the connection portion with the driver chip DRC1 toward the display region DA. In order to reduce the variation in the path distances of the plurality of signal connection wires SCL, the connection portions between a plurality of signal connection wires SCL and the driver chip DRC1 are preferably gathered and arranged at a plurality of locations. For example, as illustrated in FIG. 12, when a plurality of signal connection wires SCL (see FIG. 1) are arranged in each of the region SLR1 and the region SLR2, the variation in the path distances of the plurality of signal connection wires SCL can be smaller than that in the case in which a plurality of signal connection wires SCL are connected to a periphery of the center of the driver chip DRC1 in the X axis direction. As described above, in the consideration of the equalization of the path distances of the plurality of signal connection wires SCL, the wire density between the region SLR1 and the region SLR2 is lower than that in the other region in the non-display region NDA (see FIG. 3). Therefore, when the shift register circuit SR is arranged between the region SLR1 and the region SLR2, the influence of the noises on the other signal transmission path by the shift register circuit SR can be reduced.

The distance between the shift register circuit SR and the switch circuit unit SWG is preferably short from the viewpoint of the reduction in the path distances of the control signal line CSpL and the control signal line CSnL connected to the shift register circuit SR. As described above, when the start pulse signal CSst and the clock signal CScl are output from the control circuit unit CTC of the driver chip DRC1 to the shift register circuit SR, the distance between the shift register circuit SR and the driver chip DRC1 is preferably short. When the shift register circuit SR is arranged between the switch circuit unit SWG and the driver chip DRC1 as similar to the present embodiment, the path distances of the wires connected to the shift register circuit SR can be shorter than that of a modification (whose illustration is omitted) in which, for example, the shift register circuit SR is arranged on the flexible wiring board FWB1.

In the present embodiment, when a switch element SWn connected to the non-selected detection electrode Rx among a plurality of switch elements SWn is turned ON, the switch element SWn connected to the selected detection electrode Rx is turned OFF. In other words, all the switch elements SWn are not turned ON or OFF at the same time. However, as explained above with reference to FIG. 9 and FIG. 10, during the period of the reset operation for resetting the voltage Vdet serving as the output of the detector DET illustrated in FIG. 9 by the reset operation, the plurality of switch elements SWn illustrated in FIG. 13 may be turned OFF at the same time at the timing in which both of the switch SW1 and the switch SW2 illustrated in FIG. 9 are turned OFF.

As explained above, in the display period FLd illustrated in FIG. 11, a common potential for driving the electro-optical layer is supplied to the plurality of detection electrodes Rx illustrated in FIG. 12. At this time, it is preferable to electrically isolate the detection unit SE1 from the detection electrodes Rx. Therefore, in the display period FLd, it is preferable to turn OFF all the plurality of switch elements SWn and the plurality of switch elements SWp illustrated in FIG. 12.

As illustrated in FIG. 12, in the present embodiment, the wires connected to the switch element SWp, the switch element SWn, and each switch are arranged in the switch circuit unit SWG as follows, so that the distances of the wires are reduced. First, as illustrated in FIG. 12, the switch element SWp and the switch element SWn are arranged along the Y axis direction. To the switch element SWp, it is required to connect the control signal lines CSpL as many as the number of the detection unit RxA to the detection unit RxD. To the switch element SWn, it is required to connect the control signal lines CSnL as many as the number of the detection unit RxA to the detection unit RxD. As illustrated in FIG. 12, When the switch element SWp and the switch element SWn are arranged along the Y axis direction, a plurality of control signal lines CSnL can be arranged between the switch element SWp and the switch element SWn. In FIG. 12 to FIG. 14, note that the switch element SWn is arranged between the switch element SWp and the detection electrode Rx (i.e., the display region DA illustrated in FIG. 3). However, the position relation between the switch element SWn and the switch element SWp is not limited to the embodiments illustrated in FIG. 12 to FIG. 14, and, for example, the switch element SWp may be arranged between the switch element SWn and the detection electrode Rx (in other words, in the display region DA illustrated in FIG. 3). In this case, a plurality of control signal lines CSpL can be arranged between the switch element SWp and the switch element SWn.

As illustrated in FIG. 14, each of the switch element SWpA to the switch element SWpD included in a plurality of switch elements SWp is arranged along the X axis direction that intersects with the Y axis direction. Similarly, each of the switch element SWnA to the switch element SWnD included in the plurality of switch elements SWn is arranged along the X axis direction that intersects with the Y axis direction. In this manner, by intersecting the arrangement direction of the switch element SWp and the switch element SWn and the arrangement direction of the switch element SWpA to the switch element SWpD (and the switch element SWnA to the switch element SWnD), the layout of the wires extending into the gate electrode GE illustrated in FIG. 13 becomes easy.

As illustrated in FIG. 12, when one side in the X axis direction is defined as X1 side and the other side is defined as X2 side, each of a plurality of control signal lines CSpL and a plurality of control signal lines CSnL extends from the X1 side to the X2 side. Each of the plurality of control signal lines CSpL and the plurality of control signal lines CSnL is terminated on the X2 side. More specifically, the end of each of the plurality of control signal lines CSpL and the plurality of control signal lines CSnL is connected to the gate electrode GE (see FIG. 13) of the switch element SWp or the switch element SWn provided on the X2 side. As illustrated in FIG. 13, each of the control signal line CSpL and the control signal line CSnL includes a main wire unit CSL1 extending along the X axis direction. Each of the control signal line CSpL and the control signal line CSnL includes a sub wire unit (also referred to as a branch wire unit) CSL2 electrically connecting the main wire unit CSL1 and the gate electrode GE of each of the plurality of transistor elements Tr which are the switch elements.

As illustrated in FIG. 12, the control signal line CSdL for transmitting the control signal for controlling the ON/OFF operation of each of the plurality of switch elements SWd extends from the X1 side to the X2 side. The control signal line CSdL is terminated on the X2 side. More specifically, as illustrated in FIG. 13, the end of the control signal line CSdL is connected to the gate electrode GE of the switch element SWd provided on the X2 side. The control signal line CSdL includes the main wire unit CSL1 extending in the X axis direction. The control signal line CSdL includes a sub wire unit (also referred to as a branch wire unit) CSL2 electrically connecting the main wire unit CSL1 and the gate electrode GE of each of the plurality of transistor elements Tr which are the switch element.

As illustrated in FIG. 12, the driving signal line TSpL supplying the driving signal DSp (see FIG. 11) to the switch element SWp and the guard signal line TSnL supplying the guard signal DSn (see FIG. 11) to the switch element SWn extend from the X2 side to the X1 side. Each of the plurality of driving signal lines TSpL and the plurality of guard signal lines TSnL included in the display device DSP1 extends to one side in the X axis direction. As described above, when the extension direction of the driving signal line TSpL and the guard signal line TSnL which are source wires connected to the source electrode ST (see FIG. 13) and the extension direction of the control signal line CSpL and the control signal line CSnL which are the gate wires connected to the gate electrode GE (see FIG. 13) have an opposite relation to each other, the wire paths of the source wire and the gate wire can be efficiently arranged. In other words, the wire density in the non-display region NDA (see FIG. 3) can be reduced.

The detection unit SE1 is arranged closer to the X2 side than the driver chip DRC1 in the X axis direction. More specifically, each of the plurality of driving signal lines TSpL and the plurality of guard signal lines TSnL extends to the X2 side which is closer to the detection unit SE1 in the X axis direction. As a result, the wire path distances of the plurality of driving signal line TSpL and the plurality of guard signal lines TSnL can be reduced.

Figure 15:
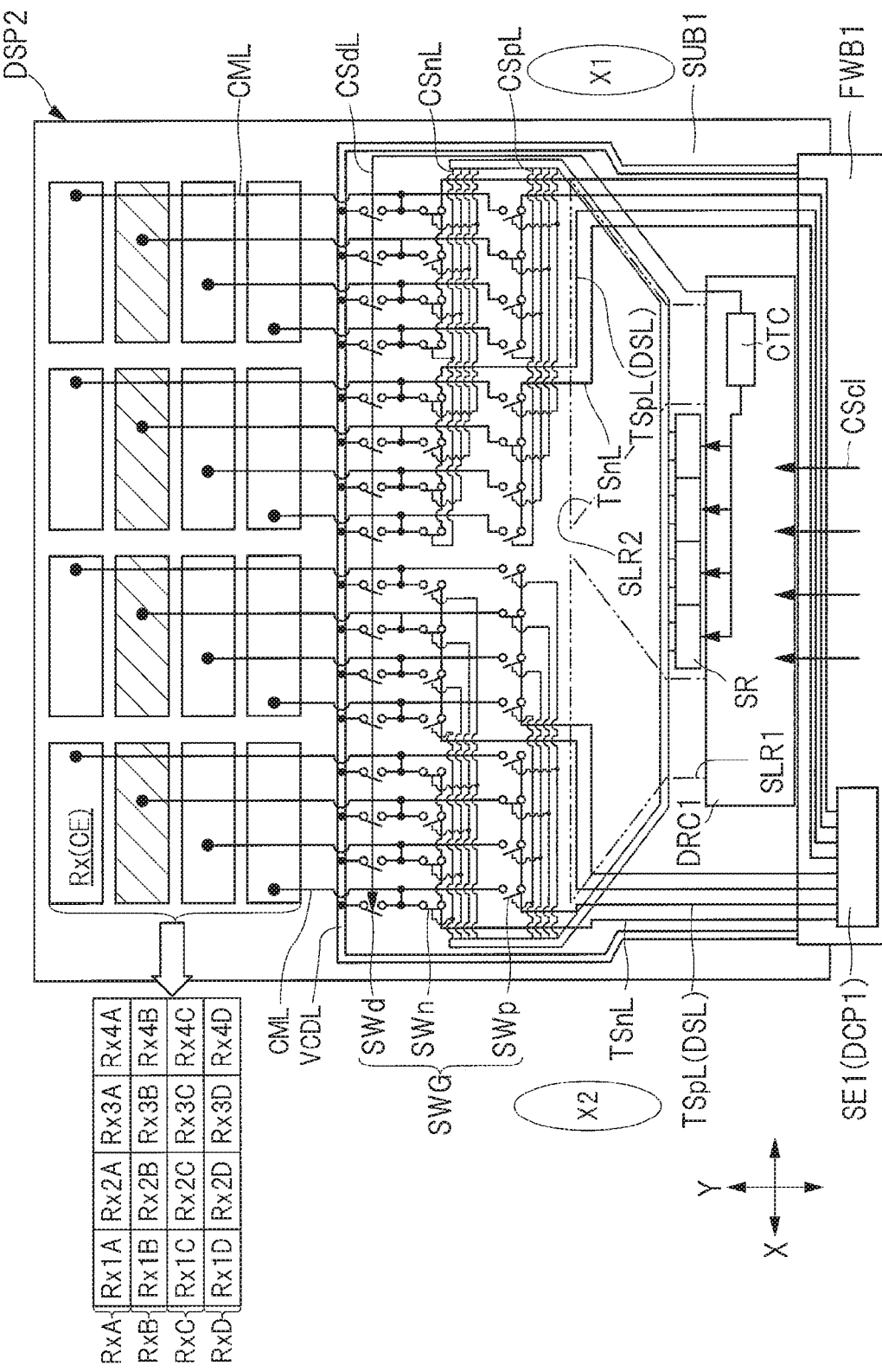
FIG. 15 is a plan view schematically illustrating a circuit configuration example of a display device according to a modification of FIG. 12.

Note that the extension paths of the source wire and the gate wire have various modifications. For example, as seen in the display device DSP2 illustrated in FIG. 15, the source wire may extend to both directions toward the X1 side and the X2 side. FIG. 15 is a plan view schematically illustrating a circuit configuration example of a display device according to a modification of FIG. 12.

The display device DSP2 illustrated in FIG. 15 is different from the display device DSP1 illustrated in FIG. 12 in the method for extending the source wire and the gate wire to the switch circuit unit SWG. More specifically, one (some) of the plurality of driving signal lines TSpL and one (some) of the plurality of guard signal lines TSnL included in the display device DSP2 extend from the X2 side to the X1 side. Another of the plurality of driving signal lines TSpL and another of the plurality of guard signal lines TSnL included in the display device DSP2 extend from the X1 side to the X2 side. In other words, the plurality of driving signal lines TSpL and the plurality of guard signal lines TSnL included in the display device DSP2 extend to both sides facing each other in the X axis direction. In still other words, the plurality of driving signal lines TSpL and the plurality of guard signal lines TSnL included in the display device DSP2 are terminated in the middle of arrangement of the plurality of switch elements SWp or the plurality of switch elements SWn in the X axis direction.

Some of the plurality of control signal lines CSpL and some of the plurality of control signal lines CSnL of the display device DSP2 extend from the X2 side to the X1 side. Some other of the plurality of control signal lines CSpL and some other of the plurality of control signal line CSnL of the display device DSP2 extend from the X1 side to the X2 side. In other words, each of the plurality of control signal lines CSpL and the plurality of control signal lines CSnL of the display device DSP2 extends to both sides facing each other in the X axis direction. In still other words, each of the plurality of control signal lines CSpL and the plurality of control signal lines CSnL of the display device DSP2 is terminated in the middle of arrangement of the plurality of switch elements SWp or the plurality of switch elements SWn in the X axis direction.

When the source wires and the gate wires extend from both of the X1 side and the X2 side in the peripheral portion of the substrate SUB1 as similar to the display device DSP2, the plurality of source wires and gate wires are mainly arranged in the peripheral portion of the substrate SUB1. Therefore, the source wires and the gate wire are difficult to overlap the region SLR1 and the region SLR2 which are the arrangement regions of the plurality of signal connection wires SCL (see FIG. 1). As a result, the influence of the noises between the signal connection wire SCL and each wire for touch detection can be reduced.

When the wires are arranged to extend from both of the X1 side and the X2 side in the peripheral portion of the substrate SUB1 as similar to the display device DSP2, the wire path distances can be reduced in some cases. For example, in the case of the display device DSP2, the wire path distances of the control signal line CSpL and the control signal line CSnL which are the gate wires are shorter than those in the example of the display device DSP1 illustrated in FIG. 12. Therefore, when the wire path distance is shorter, the time constant in the signal transmission path becomes smaller, so that the reliability of the signal transmission is improved.

However, as seen in some of the plurality of driving signal lines TSpL and some of the plurality of guard signal lines TSnL illustrated in FIG. 15, the wire path distances cannot be sufficiently reduced in some cases. The driver chip DRC1 is electrically connected to the flexible wiring board FWB1, and a signal such as the clock signal CScl is supplied from the flexible wiring board FWB1 to the driver chip DRC1. Therefore, when the detection unit SE1 is arranged on the flexible wiring board FWB1, it is preferable to arrange the detection unit SE1 and the driver chip DRC1 so that the positions of the detection unit SE1 and the driver chip DRC1 are shifted from each other in the Y axis direction. In other words, on the flexible wiring board FWB1, it is preferable to arrange the detection unit SE1 so as to be closer to either the X1 side or the X2 side. As described above, when the detection unit SE1 is arranged on the flexible wiring board FWB1 so as to be closer either the X1 side or the X2 side, some of the plurality of driving signal lines TSpL and some of the plurality of guard signal lines TSnL are arranged to go around the arrangement region of the driver chip DRC1. As a result, the wire path distances of the going-around wires are increased.

As illustrated in FIG. 15, when one (some) driving signal line of the plurality of driving signal lines TSpL and one (some) guard signal line of the plurality of guard signal lines TSnL going around the driver chip DRC1 intersect with the supply path of the clock signal CScl in a plan view, the intersecting portion is easily affected by the noises of the clock signal CScl.

In contrast, in the case of the display device DSP1 as illustrated in FIG. 12, each of the plurality of driving signal lines TSpL and the plurality of guard signal lines TSnL passes through the region between the driver chip DRC1 and the switch circuit unit SWG, and is connected to the switch circuit unit SWG, and therefore, the wire path distance can be reduced on the flexible wiring board FWB1. In the case of the display device DSP1 as illustrated in FIG. 12, each of the plurality of driving signal lines TSpL and the plurality of guard signal lines TSnL passes through the region between the driver chip DRC1 and the switch circuit unit SWG, and is connected to the switch circuit unit SWG, and therefore, the portion is difficult to be affected by the noises of the clock signal CScl and others supplied to the driver chip DRC1.

In the case of the display device DSP1, when each of the control signal lines CSpL, CSnL, CSdL, the driving signal line TSpL, and the guard signal line TSnL extends to one side in the X axis direction as described above, the space of the peripheral portion of the substrate SUB1 can be smaller than that of the display device DSP2 as illustrated in FIG. 15. As a result, an area of the non-display region NDA illustrated in FIG. 3, in other words, an area of a frame region of the display device DSP1 can be reduced.

The display device DSP2 illustrated in FIG. 15 is similar to the display device DSP1 illustrated in FIG. 12 except for the above-described difference. Therefore, overlapped explanation is omitted.

Incidentally, as illustrated in FIG. 12, in the display device DSP1, a plurality of wires intersect with each other in a plan view. Therefore, as explained with reference to FIG. 2, the display device DSP1 includes a plurality of stacked wire layers, and a plurality of wires of the display device DSP1 are led by the plurality of wire layers so as to be insulated from each other. An example of a wire layout using the plurality of wire layers will be described below.

Figure 16:
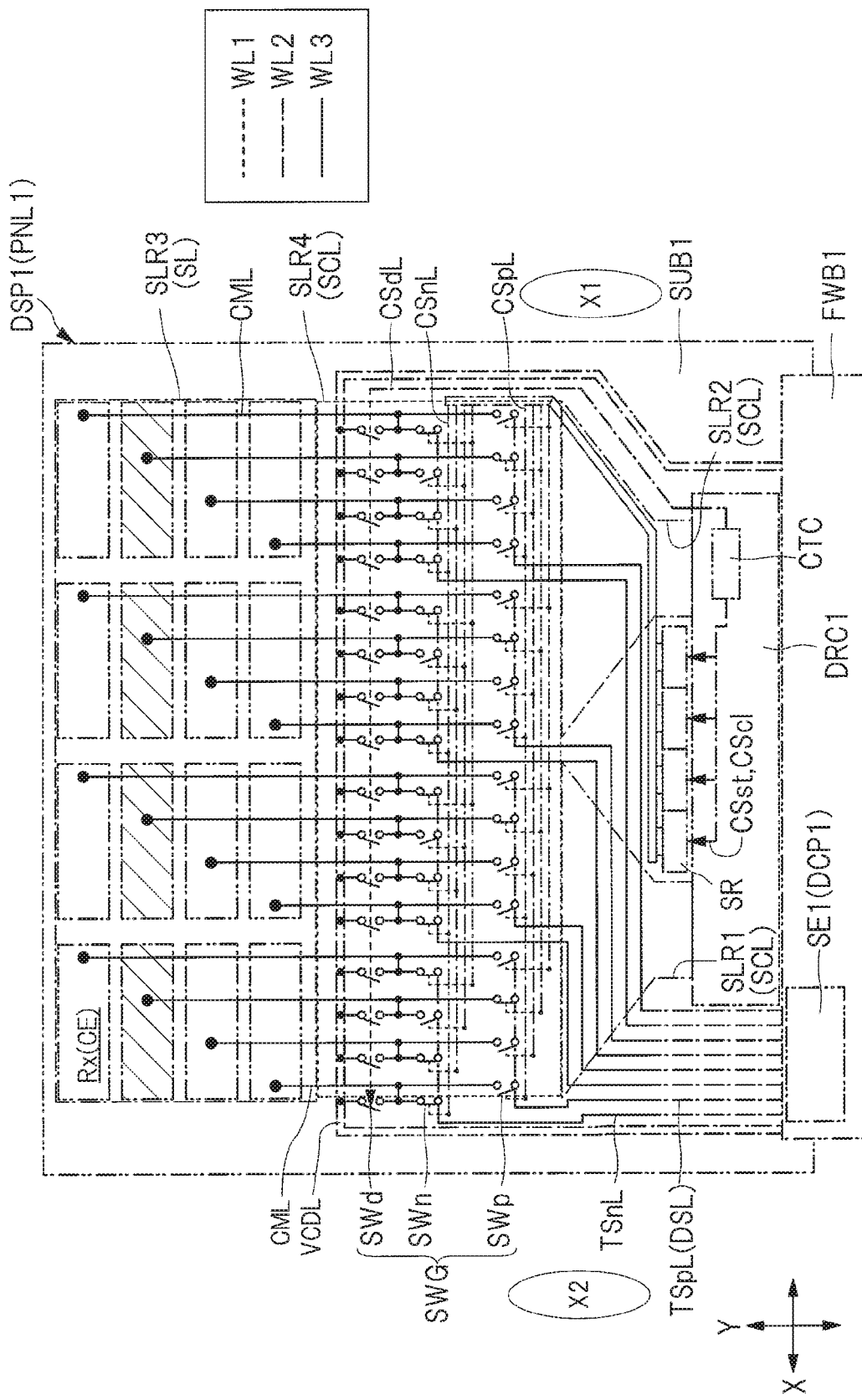
FIG. 16 is a plan view illustrating a plurality of wires illustrated in FIG. 12 so that the wires can be identified for each arranged wire layer.
Figure 17:
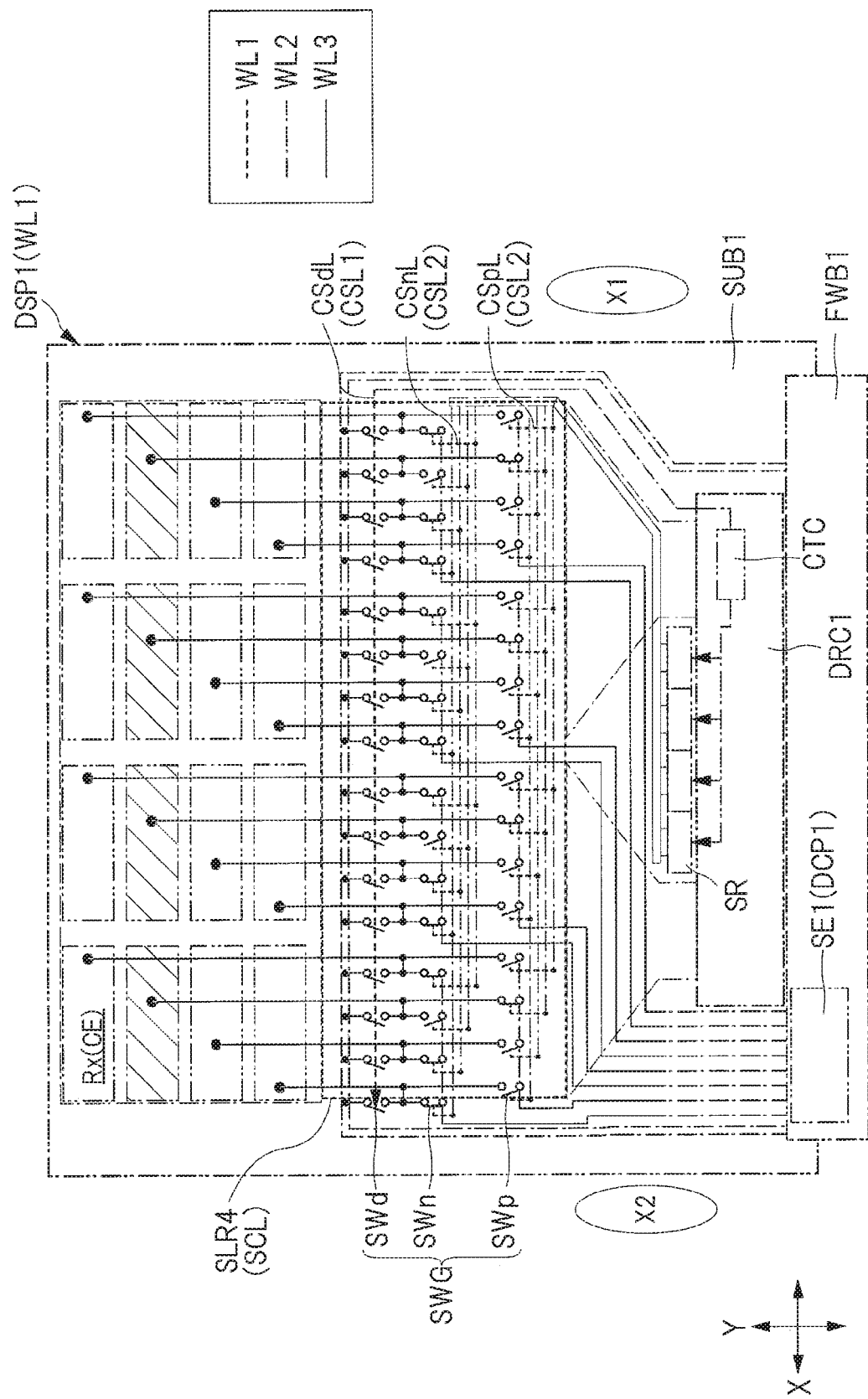
FIG. 17 is a plan view illustrating wires which are arranged in the first layer among the plurality of wires illustrated in FIG. 12.
Figure 18:
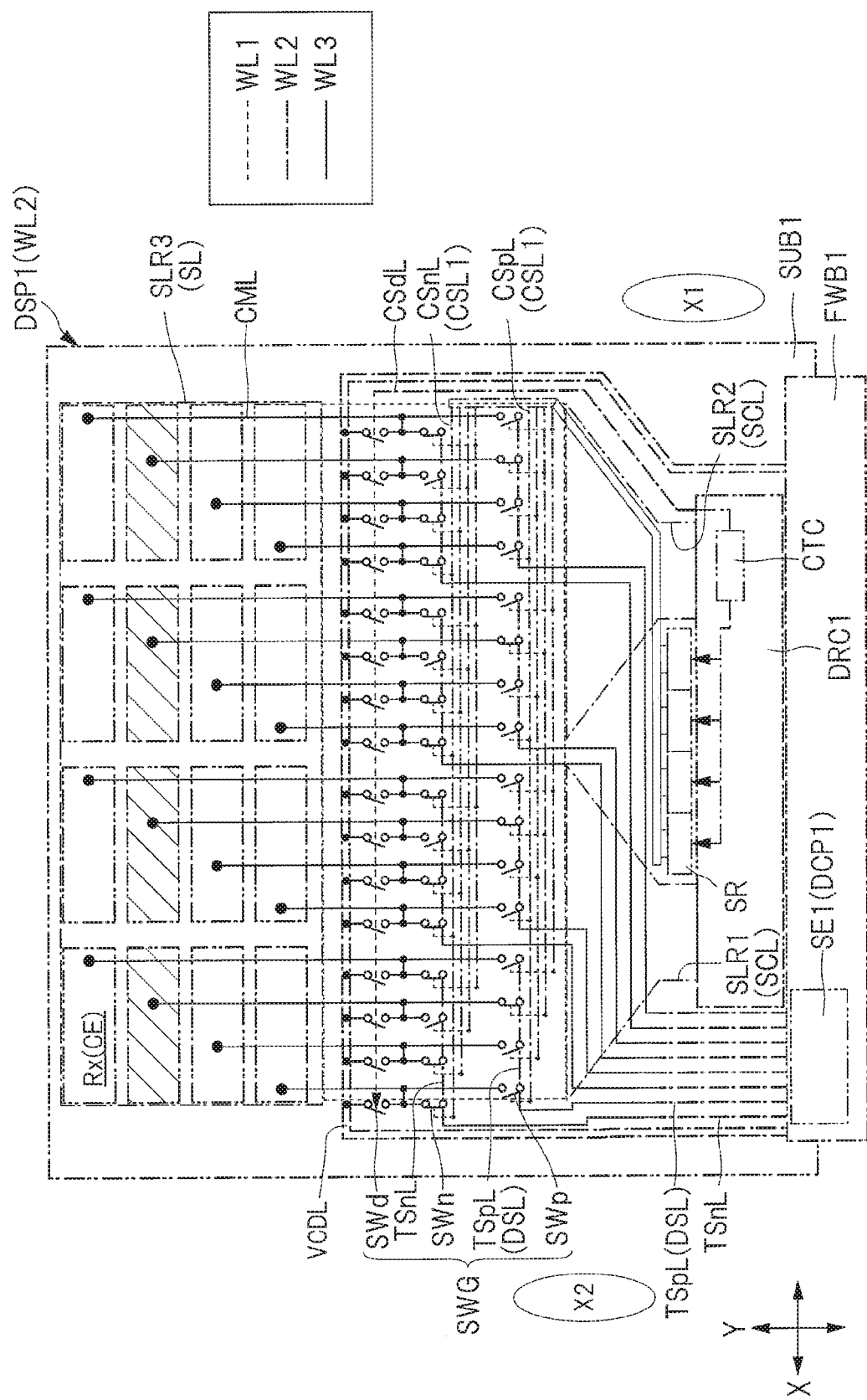
FIG. 18 is a plan view illustrating wires which are arranged in the second layer among the plurality of wires illustrated in FIG. 12.
Figure 19:
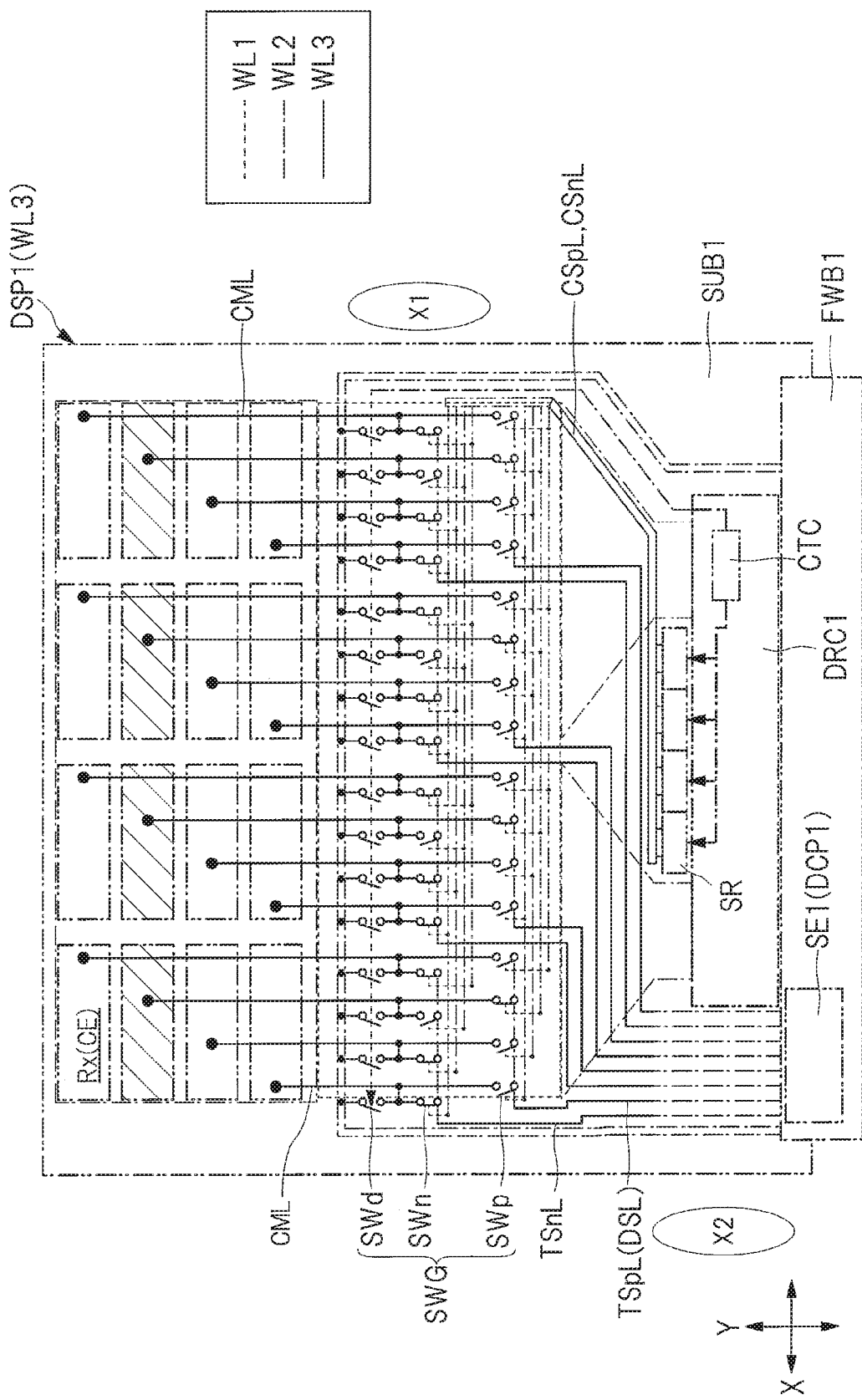
FIG. 19 is a plan view illustrating wires which are arranged in the third layer among the plurality of wires illustrated in FIG. 12.

FIG. 16 to FIG. 19 are plan views illustrating the plurality of wires illustrated in FIG. 12 so that the wires can be identified for each wire layer in which the wires are arranged. In FIG. 16 to FIG. 19, the contours of the substrate SUB1, the driver chip DRC1, the control circuit unit CTC, the shift register circuit SR, the flexible wiring board FWB1, and the detection unit SE1 are indicated by two-dot chain lines. In FIG. 16 and FIG. 17, some of the plurality of wires arranged in the wire layer WL1 (see FIG. 2) which is the first layer is indicated by a broke line, and some of them arranged in the other wire layers are indicated by light gray lines. In FIG. 16 and FIG. 18, some of the plurality of wires arranged in the wire layer WL2 (see FIG. 2) which is the second layer is indicated by a dashed-dotted line, and some of them arranged in the other wire layers are indicated by light gray lines. In FIG. 16 and FIG. 19, some of the plurality of wires arranged in the wire layer WL3 (see FIG. 2) which is the third layer is indicated by a black solid line, and some of them arranged in the other wire layers are indicated by light gray lines. FIG. 16 to FIG. 19 illustrate a legend of line types indicating the respective wire layers. In order to easily see the drawings, FIG. 16 to FIG. 19 illustrate the regions SLR1 to the area SLR4 in which the plurality of signal lines SL and the plurality of signal connection wires SCL are arranged, and the reference symbols of the signal line SL and the signal connection wire SCL are attached to the respective regions.

As illustrated in FIG. 16, FIG. 17, and FIG. 18, the signal connection wire SCL which is the video signal is formed over the plurality of wire layers. More specifically, as illustrated in FIG. 16 and FIG. 18, in the region SLR1 and the region SLR2 connected to the driver chip DRC1, the signal connection wire SCL is arranged in the wire layer WL2 (see FIG. 18) which is the second layer. In the region SLR3 overlapping the display region DA (see FIG. 1), the signal line SL is arranged in the wire layer WL2 (see FIG. 18) which is the second layer. However, as illustrated in FIG. 16 and FIG. 17, in the present embodiment, the signal connection wire SCL is arranged in the wire layer WL1 (see FIG. 17) which is the first layer in a plan view in the region SLR4 located between the region SLR3 (see FIG. 16) and the region SLR1 (see FIG. 16) and between the region SLR3 (see FIG. 16) and the region SLR2 (see FIG. 16).

As illustrated in FIG. 2, the signal line SL is formed in a wire layer different from that in the scan line GL since the signal line SL and the scan line GL intersect with each other. Therefore, the signal line SL is formed in the wire layer WL2 different from the wire layer WL1 in which the scan line GL is mainly formed. Therefore, as similar to the signal line SL, the wire structure can be more simplified when the signal connection wire SCL (see FIG. 16) connected to the signal line SL is formed in the wire layer WL2. Since the wire layer WL2 is formed after the semiconductor layer formation process of the transistor, it is not required to consider a high temperature in the formation process. Therefore, a degree of freedom to select the material is high, and it is easier to reduce the resistivity than that in the wire layer WL1. However, as illustrated in FIG. 18, in the present embodiment, a part of the switch circuit unit SWG is formed in the wire layer WL2. In particular, for the detection signal line DSL that transmits the detection signal, it is important to reduce the resistance value of the wire path from the viewpoint of the reduction in the influence of the noises. The source electrodes ST (see FIG. 13) of the transistor elements Tr (see FIG. 13) configuring the switch elements SWn, SWp, and the switch element SWd are arranged in the wire layer WL2. Therefore, in the region SLR4 in which the switch circuit unit SWG is arranged, the signal connection wire SCL is arranged in the wire layer WL1, so that the switch circuit unit SWG and the signal connection wire SCL can intersect with each other.

However, as illustrated in FIG. 17, each of the main wire unit CSL1 of the control signal line CSdL, the sub wire unit CSL2 of the control signal line CSpL, and the sub wire unit CSL2 of the control signal line CSnL among the wires configuring the switch circuit unit SWG is formed in the wire layer WL1. Therefore, in the region SLR4, some of the signal connection wires SCL are preferably formed in a wire layer other than the wire layer WL1 so that these wires and the signal connection wires SCL are electrically insulated from each other. For example, at the cross portion between the signal connection wire SCL and the main wire unit CSL1 of the control signal line CSdL, the signal connection wire SCL is preferably formed in a wire layer other than the wire layer WL1.

As illustrated in FIG. 16, in a plan view, a part of the signal connection wire SCL (more specifically, a part of each of the plurality of signal connection wires SCL) overlaps the driving signal line TSpL supplying the driving signal DSp (see FIG. 11) to the switch element SWp. In other words, in a plan view, the signal connection wire SCL intersects with the driving signal line TSpL. As described above, in a plan view, the signal connection wire SCL and the driving signal line TSpL intersect with each other, so that the wire path distance of the driving signal line TSpL (and the detection signal line DSL) can be reduced. Accordingly, the influence of the noises on the driving signal line TSpL (and the detection signal line DSL) can be reduced, and therefore, the reliability of the touch detection can be improved.

In a plan view, a part of the signal connection wire SCL (more specifically, a part of each of the plurality of signal connection wires SCL) overlaps the guard signal line TSnL supplying the guard signal DSn (see FIG. 11) to the switch element SWn. In other words, in a plan view, the signal connection wire SCL intersect with the guard signal line TSnL. Therefore, as illustrated in FIG. 16, the driving signal line TSpL and the guard signal line TSnL are arranged so as to extend adjacently in parallel to each other. When the driving signal line TSpL and the guard signal line TSnL are arranged so as to extend adjacently in parallel to each other, the transmission path distances of the driving signal DSp (see FIG. 11) and the guard signal DSn (see FIG. 11) can be equalized to each other. In this case, it is difficult to cause a difference between the waveform of the driving signal DSp and the waveform of the guard signal DSn, and therefore, the generation of the parasitic capacitances in the detection period FLt (see FIG. 11) can be suppressed.

As described above, when the signal connection wire SCL and the driving signal line TSpL intersect with each other in a plan view, it is only required at the intersecting portion between the signal connection wire SCL and the driving signal line TSpL to form the signal connection wire SCL and the driving signal line TSpL in wire layers different from each other. For example, although not illustrated in the drawings, either one of the signal connection wire SCL and the driving signal line TSpL may be arranged in the wire layer WL1 (see FIG. 2), and the other may be arranged in the wire layer WL2 (see FIG. 2). For example, as illustrated in FIG. 16, FIG. 18, and FIG. 19, the signal connection wire SCL may be arranged in the wire layer WL2 (see FIG. 18), and the intersecting portion of the driving signal line TSpL with the signal connection wire SCL may be arranged in the wire layer WL3.

As described above, in the wire layer WL2 illustrated in FIG. 18, the resistance value of wires is easier to be reduced than that in the wire layer WL1 illustrated in FIG. 17. Therefore, from the viewpoint of the reduction in the resistance value of the signal connection wire SCL, at least a part of the signal connection wire SCL is preferably formed in the wire layer WL2.

The wire layer WL3 illustrated in FIG. 19 has a lower arrangement density of wires than that in the wire layer WL1 illustrated in FIG. 17 and the wire layer WL2 illustrated in FIG. 18. For this reason, in the wire layer WL3, the resistance value of the wire is easy to be reduced by taking measures such as increasing the wire width. Therefore, as illustrated in FIG. 16 and FIG. 19, the case of the arrangement of the intersecting portion of the driving signal line TSpL with the signal connection wire SCL in the wire layer WL3 is preferable because the resistance value of the wire can be more reduced than that in the case of the arrangement of the same in the wire layer WL1.

As a modification for FIG. 16 to FIG. 19, the entire driving signal line TSpL may be arranged in the wire layer WL3. However, even in the wire layer WL2, a periphery of a portion which is of the wire path of the driving signal line TSpL and which is connected to the flexible wiring board FWB1 has a relatively lower arrangement density of the wires. Therefore, as illustrated in FIG. 16 and FIG. 18, even when a portion of the driving signal line TSpL which does not intersect with the signal connection wire SCL is arranged in the wire layer WL2 (see FIG. 18), the resistance value of the wire can be reduced. When the portion of the driving signal line TSpL which is connected with the flexible wiring board FWB1 is arranged in the wire layer WL2, the number of wire layers can be reduced in the periphery of the flexible wiring board FWB1.

Note that the layout of the driving signal line TSpL has been mainly explained above. However, when the driving signal line TSpL and the guard signal line TSnL are arranged to extend adjacently in parallel to each other as described above, it is difficult to cause the difference between the waveform of the driving signal DSp and the waveform of the guard signal DSn. Therefore, the generation of the parasitic capacitances in the detection period FLt can be suppressed. For this reason, the intersecting portion of the guard signal line TSnL with the signal connection wire SCL is preferably arranged in the wire layer WL3. The portion of the guard signal line TSnL which does not intersect with the signal connection wire SCL is preferably arranged in the wire layer WL2.

As illustrated in FIG. 17, the main wire unit CSL1 of the control signal line CSdL which is the transmission path of a signal for controlling the ON/OFF operation of the switch element SWd is arranged in the wire layer WL1. In the case of the switch element SWd, all of the plurality of switch elements SWd are similarly turned ON or OFF. Therefore, the number of the main wire unit CSL1 of the control signal line CSdL for all the switch elements SWd is required to be, for example, only one. In this case, the wire structure can be simplified, and therefore, the distance of the sub wire unit CSL2 can be reduced as long as the main wire unit CSL1 is formed in the wire layer WL1 (see FIG. 17) in which the gate electrode GE illustrated in FIG. 13 is formed.

On the other hand, as illustrated in FIG. 18, each of the main wire unit CSL1 of the control signal line CSpL and the main wire unit CSL1 of the control signal line CSnL is arranged in the wire layer WL2. In the case of the switch element SWp and the switch element SWn, some of the plurality of switch elements SWp and some of the plurality of switch elements SWn selectively operate. Therefore, a plurality of main wire units CSL1 of the control signal lines CSpL and a plurality of main wire units CSL1 of the control signal lines CSnL are required, and therefore, the wire structure is complicated. In this case, the main wire units CSL1 of the control signal lines CSpL and the main wire units CSL1 of the control signal lines CSnL are preferably formed in the wire layer WL2 whose wire pitch is easier to be reduced than that in the wire layer WL1.

As illustrated in FIG. 18, the common potential supply line VCDL is formed in the wire layer WL2. The common potential supply line VCDL is arranged so as to surround the switch circuit unit SWG, the region SLR1, and the region SLR2. In the example illustrated in FIG. 18, each of the plurality of driving signal lines TSpL and the plurality of guard signal lines TSnL is surrounded by a common potential supply line VCDL. The common potential supply line VCDL supplies the same potential to all the common electrodes CE in the display period FLd (see FIG. 11). Therefore, by forming the common potential supply line VCDL in the wire layer WL2, it is preferable to reduce the resistance value of the common potential supply line VCDL. When the common potential supply line VCDL extends along the peripheral portion of the substrate SUB1, the limitation of the layout of other wires can be reduced even when the wire width of the common potential supply line VCDL is large.

As illustrated in FIG. 19, each of the plurality of common lines CML is formed in the wire layer WL3. Therefore, each of the plurality of common lines CML intersects with the scan line GL (see FIG. 1) and can reliably be electrically insulated from the plurality of signal lines SL (see FIG. 1).

As illustrated in FIG. 19, in a plan view, overlapping portions of the control signal line CSpL and the control signal line CSnL with the signal connection wire SCL (see FIG. 16) are formed in the wire layer WL3. Although not illustrated in the drawings, as a modification of the present embodiment, the control signal line CSpL and the control signal line CSnL may be formed in the wire layer WL1 illustrated in FIG. 17. However, as illustrated in FIG. 19, it is preferable to form the control signal line CSpL and the control signal line CSnL in the wire layer WL3 because the wiring pitch can be reduced.

Modification of First Embodiment

The display device DSP1 according to the present embodiment includes various modifications in addition to the above-described modification examples. A typical modification of the present first embodiment will be described below. Note that the display device DSP2 described with reference to FIG. 15 is also included in the typical modification of the present first embodiment, but it has already been explained. Therefore, the overlapped explanation is omitted. In the explanation about the modification, the differences from the display device DSP1 illustrated in FIG. 12 will be mainly explained, and the overlapped explanation about the portions having similar configuration as those of the display device DSP1 is omitted.

Figure 20:
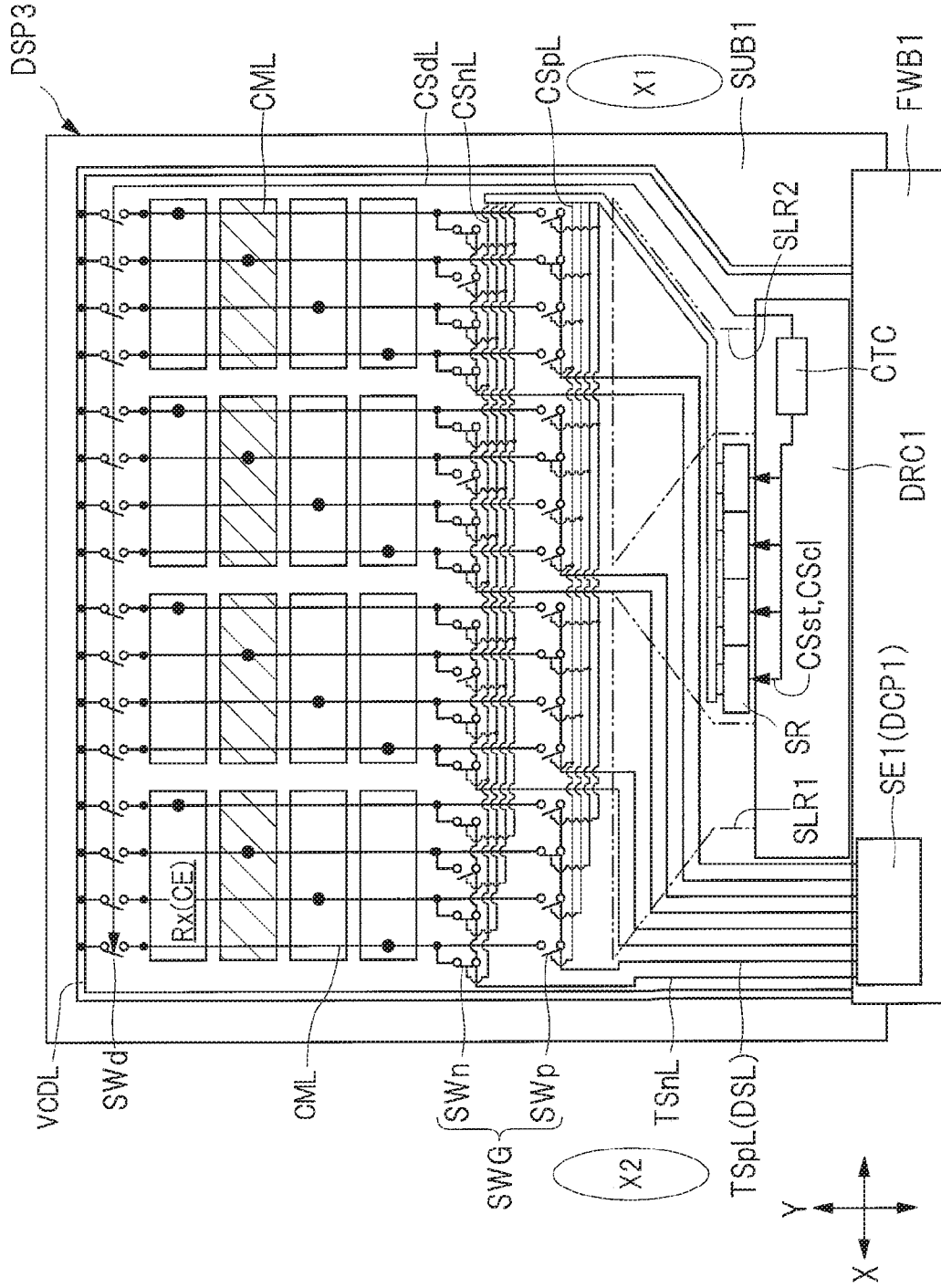
FIG. 20 is a plan view illustrating a modification of FIG. 18.

In the display device DSP1 illustrated in FIG. 12, the plurality of switch elements SWd are included in the switch circuit unit SWG. However, as seen in the display device DSP3 illustrated as the modification in FIG. 20, the plurality of switch elements SWd may not be included in the switch circuit unit SWG and may be formed at positions away from the switch element SWp and the switch element SWn. FIG. 20 is a plan view illustrating another modification of FIG. 12.

The display device DSP3 is different from the display device DSP1 illustrated in FIG. 12 in that the switch element SWd is arranged in a region other than the region between the plurality of detection electrodes Rx and the driver chip DRC1. More specifically, in the case of the display device DSP3, the switch circuit unit SWG including the switch element SWp and the switch element SWn is arranged between the plurality of detection electrodes Rx and the driver chips DRC1. Meanwhile, the plurality of switch elements SWd are arranged in the region opposite to the switch circuit unit SWG across the display region DA (see FIG. 1) in which the plurality of detection electrodes Rx are arranged. In other words, the plurality of switch elements SWd are arranged between the plurality of detection electrodes Rx and the peripheral portion of the substrate SUB1 in the Y axis direction.

In the case of the display device DSP3, the separation distance between the display region DA (see FIG. 1) and the driver chip DRC1 can be smaller than that of the display device DSP1 illustrated in FIG. 12. Therefore, the width of the non-display region NDA (see FIG. 1) between the display region DA (see FIG. 1) and the driver chip DRC1 can be reduced.

In the case of the display device DSP1 described with reference to FIG. 12, the wire widths of the plurality of driving signal lines TSpL and the plurality of guard signal lines TSnL are the same as each other as exemplified in FIG. 21. However, as seen in the modification illustrated in FIG. 22 and FIG. 23, the wire widths of the plurality of driving signal lines TSpL and the plurality of guard signal lines TSnL may be different from each other. Note that the wire width is the wire length in the direction perpendicular to the wire extension direction.

Figure 21:
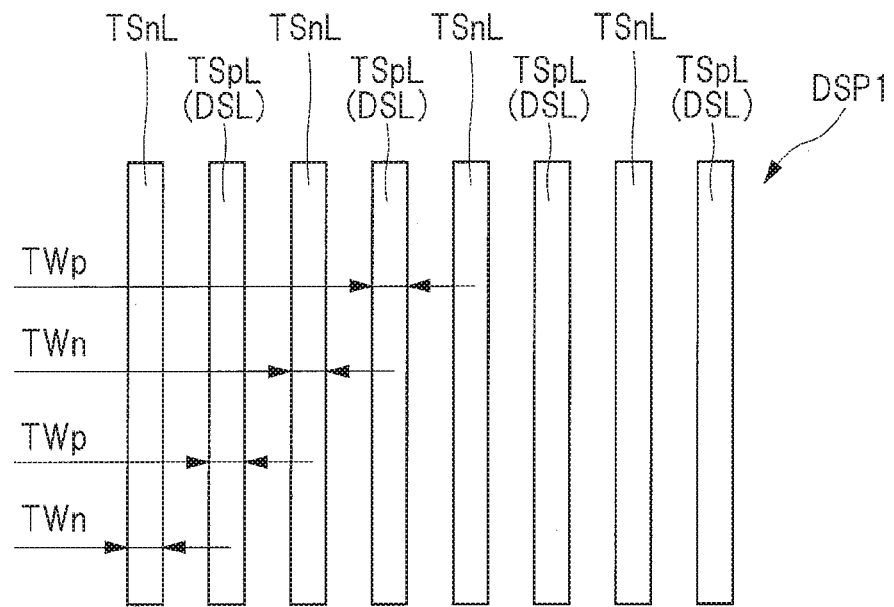
FIG. 21 is an enlarged plan view illustrating a portion of driving signal lines and guard signal lines illustrated in FIG. 12.

FIG. 21 is an enlarged plan view illustrating an enlarged portion of the driving signal lines and the guard signal lines illustrated in FIG. 12. Each of FIG. 22 and FIG. 23 is an enlarged plan view illustrating a modification of FIG. 21.

As illustrated in FIG. 21, the wire width TWp of each of the plurality of driving signal lines TSpL and the wire width TWn of each of the plurality of guard signal lines TSnL included in the display device DSP1 are the same as each other. On the other hand, in the case of the display device DSP4 as illustrated in FIG. 22, the wire width TWn of each of the guard signal lines TSnL is larger than the wire width TWp of each of the driving signal lines TSpL. In other words, the guard signal line TSnL has a lower wire resistance than that of the driving signal line TSpL. As explained with reference to FIG. 12 to FIG. 14, the guard signal line TSnL supplies the guard signal DSn (see FIG. 11) to the non-selected detection electrode Rx (see FIG. 12). In this case, as compared with the driving signal line TSpL, the guard signal DSn is supplied to many detection electrodes Rx at the same time. Therefore, the waveform of the guard signal DSn can be stabilized by reducing the wire resistance of the guard signal line TSnL.

Figure 22:
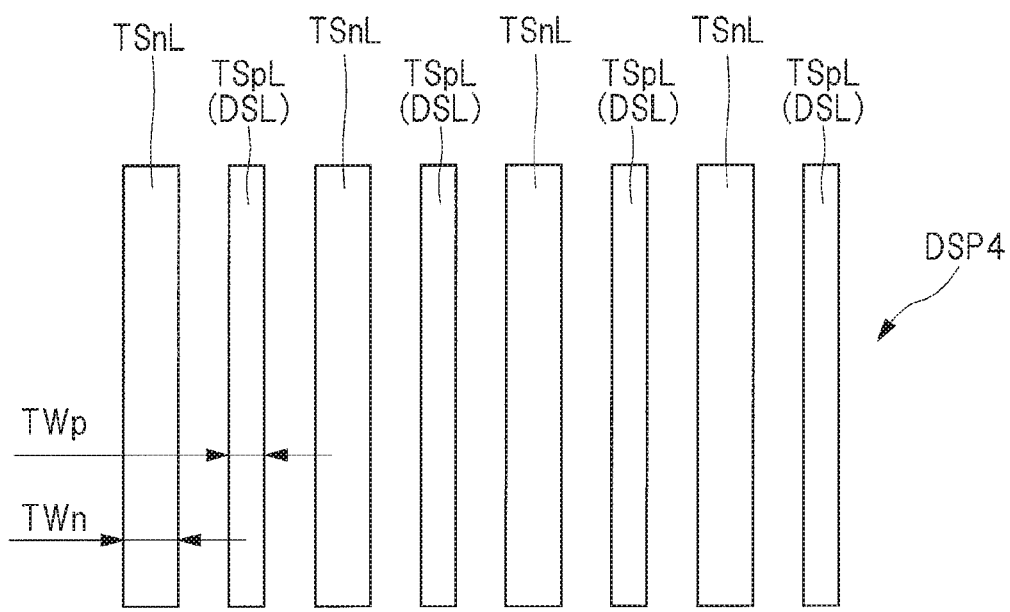
FIG. 22 is an enlarged plan view illustrating a modification of FIG. 21.
Figure 23:
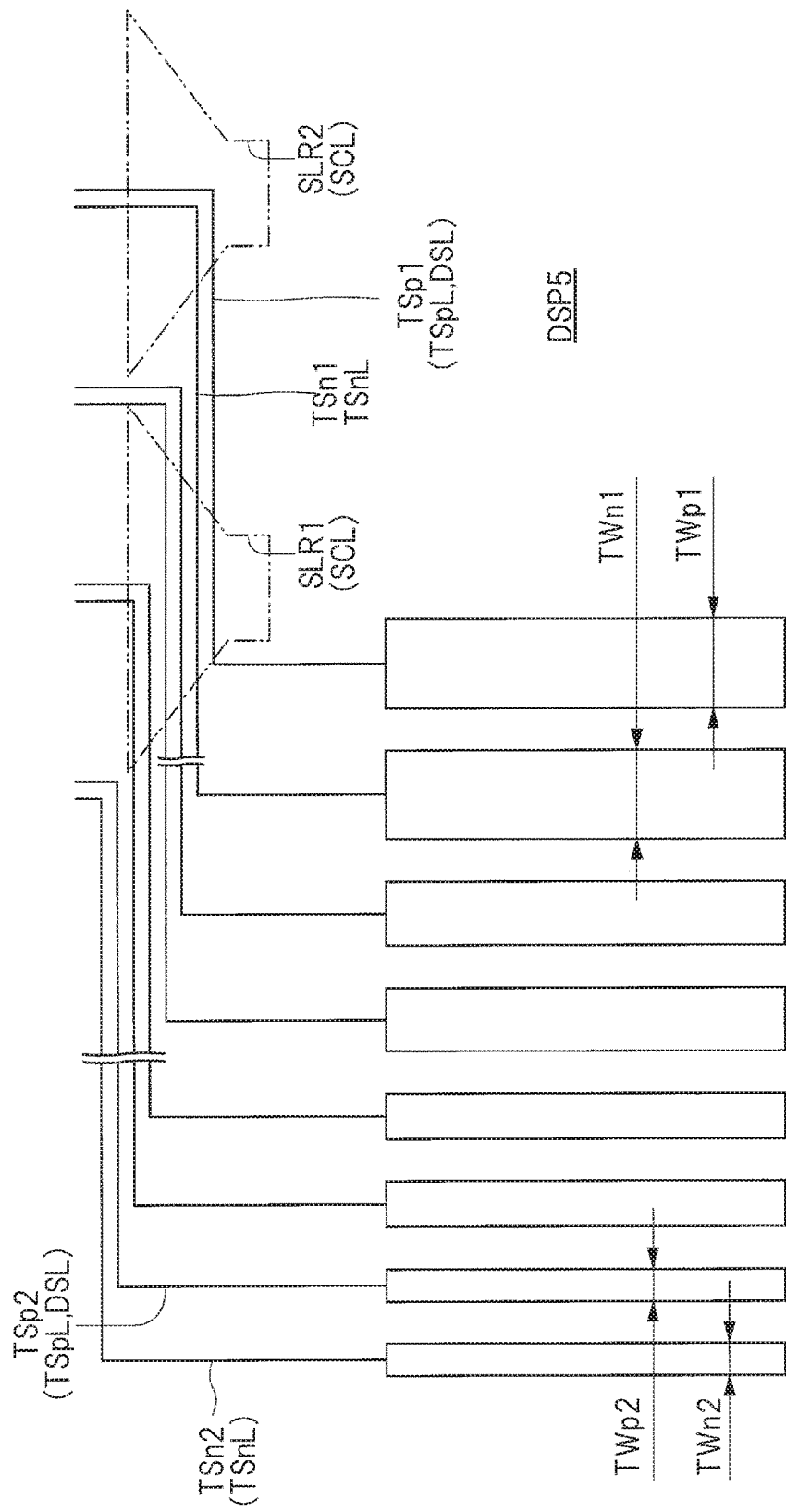
FIG. 23 is an enlarged plan view illustrating another modification of FIG. 21.

However, as seen in the comparison between FIGS. 21 and 22, the larger the wire width TWn of each of the plurality of guard signal lines TSnL is, the wider a space for arranging the driving signal lines TSpL and guard signal lines TSnL is. Therefore, from the viewpoint of the reduction in the arrangement space, the wire width TWp of each of the plurality of driving signal lines TSpL and the wire width TWn of each of the plurality of guard signal lines TSnL are preferably equal to each other as illustrated in FIG. 21.

In the example of the display device DSP4, note that the method for increasing the wire width has been explained as an example of a method for achieving a state in which the guard signal line TSnL has a lower wire resistance than the driving signal line TSpL. However, the method for reducing the wire resistance of the guard signal line TSnL has various modifications. For example, when a cross section area of the guard signal line TSnL is large, the wire resistance can be reduced. Therefore, the thickness of the guard signal line TSnL may be large than the thickness of the driving signal line TSpL. Incidentally, the method for reducing the wire resistance by the wire width as illustrated in FIG. 22 and the method for reducing the wire resistance by the thickness of the wire may be combined with each other.

In the case of the display device DSP5 illustrated in FIG. 23, the wire width TWp1 of the driving signal line TSp1 is larger than the wire width TWp2 of the driving signal line TSp2. In other words, the driving signal line TSp1 has a lower wire resistance than that of the driving signal line TSp2. The wire width TWn1 of the guard signal line TSn1 is larger than the wire width TWn2 of the guard signal line TSn2. In other words, the guard signal line TSn1 has a lower wire resistance than that of the guard signal line TSn2. As illustrated in FIG. 12, when a plurality of driving signal lines TSpL (and a plurality of guard signal lines TSnL) are connected to one detection unit SE1, it is difficult to equalize the wire path distances of the plurality of driving signal lines TSpL (and the plurality of guard signal lines TSnL). It is difficult to equalize the overlapping length of each of the plurality of driving signal lines TSpL (and the plurality of guard signal lines TSnL) with the region SLR1 and the region SLR2 in a plan view.

For example, in the example as illustrated in FIG. 23, the wire path distance of the driving signal line TSp1 is longer than the wire path distance of the driving signal line TSp2. In this case, the waveform of the detection signal or the driving signal DSp (see FIG. 11) flowing in the driving signal line TSp1 can be stabilized by reducing the wire resistance of the driving signal line TSp1. The wire path distance of the guard signal line TSn1 is longer than the wire path distance of the guard signal line TSn2. In this case, the waveform of the guard signal DSn (see FIG. 11) flowing in the guard signal line TSn1 can be stabilized by reducing the wire resistance of the guard signal line TSn1.

In the example as illustrated in FIG. 23, in a plan view, the overlapping length of the driving signal line TSp1 with the region SLR1 and the region SLR2 is larger than the overlapping length of the driving signal line TSp2 with the region SLR1 and the region SLR2. In FIG. 23, note that the driving signal line TSp2 does not overlap the region SLR1 and the region SLR2. However, the term "the overlapping length of the driving signal line TSp2 with the region SLR1 and the region SLR2" includes a value of zero. When the wires overlap each other, there is a risk of increase in the wire resistance because of generation of a capacitance. Therefore, the waveform of the detection signal or the driving signal DSp (see FIG. 11) flowing in the driving signal line TSp1 can be stabilized by reducing the wire resistance of the driving signal line TSp1. In a plan view, the overlapping length of the guard signal line TSn1 with the region SLR1 and the region SLR2 is larger than the overlapping length of the guard signal line TSn2 with the region SLR1 and the region SLR2. In this case, the waveform of the guard signal DSn (see FIG. 11) flowing in the guard signal line TSn1 can be stabilized by similarly reducing the wire resistance of the guard signal line TSn1.

Second Embodiment

Figure 24:
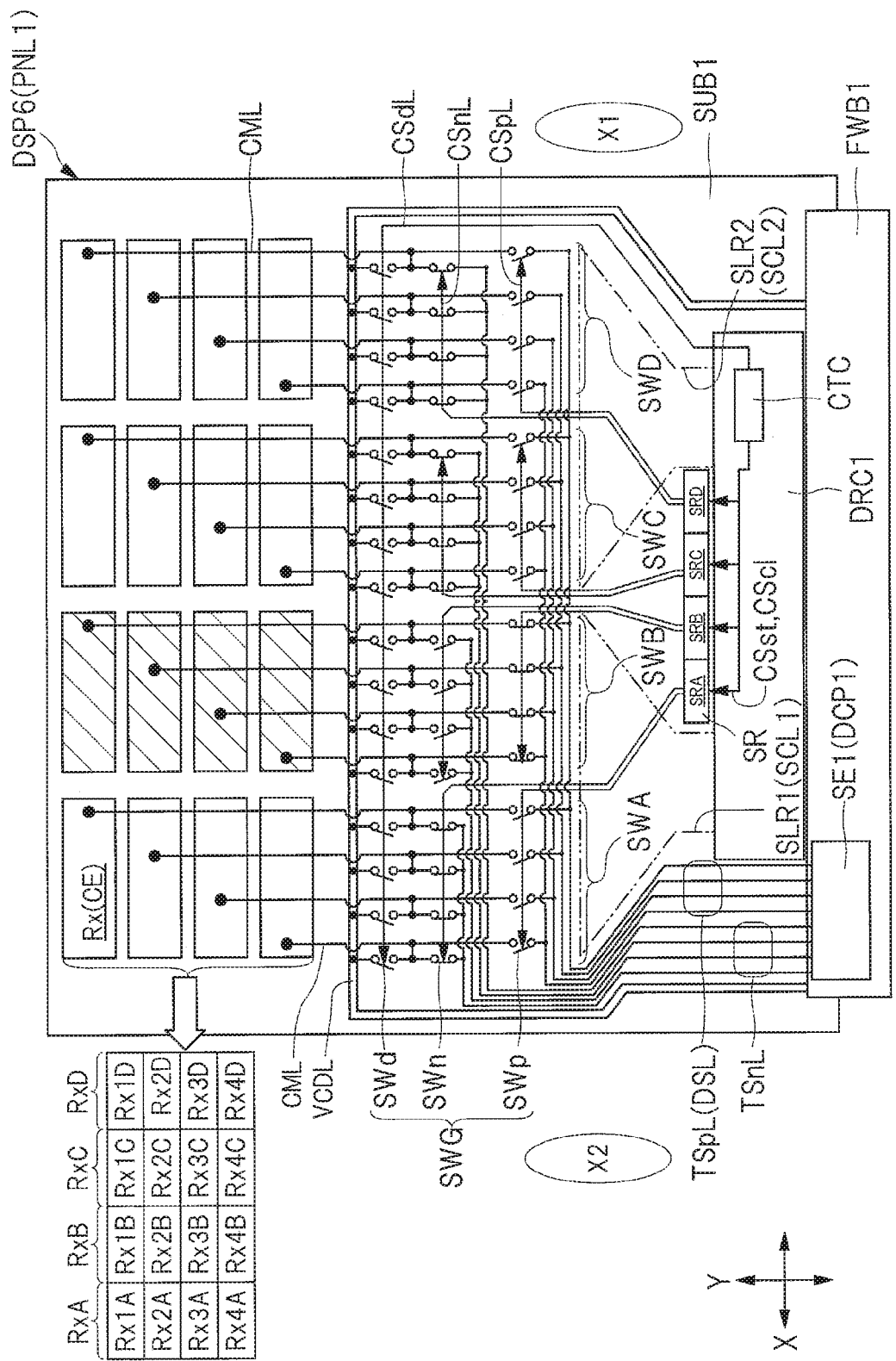
FIG. 24 is a plan view illustrating another example of a wire layout connected to the touch detection circuit illustrated in FIG. 3.

The first embodiment has explained the aspect in which the detection unit RxA to the detection unit RxD detected in the detection period FLt (see FIG. 11) at timings different from each other are arranged along the Y axis direction. The present second embodiment will explain an aspect in which, for example, the detection unit RxA to the detection unit RxD are arranged along the X axis direction as seen in a display device DSP6 illustrated in FIG. 24. FIG. 24 is a plan view illustrating another example of a wire layout connected to the touch detection circuit illustrated in FIG. 3.

Note that either one of the display device explained in the present second embodiment and the display device DSP1 explained in the first embodiment corresponds to a modification example of the other. Therefore, in the present second embodiment, differences among the display device DSP1 to the display device DSP5 explained in the above-described embodiment will be mainly explained, and the overlapping explanation will be omitted in principle. When portions having similar structures to those of the display device DSP1 to the display device DSP5 already explained in the first embodiment are described, each drawing explained in the first embodiment is cited as necessary. For example, the display device DSP6 is different from the display device DSP1 in the layout of the wires configuring the touch detection circuit. However, the operation of the switch element in the display period FLd illustrated in FIG. 11 and the configuration of the display panel PNL1 other than the touch detection circuit are similar to those of the display device DSP1.

For example, as similar to the display device DSP1 explained in the above-described embodiment, the display device DSP6 includes a liquid crystal layer LQ (see FIG. 2) which is an electro-optical layer, a pixel electrode PE (see FIG. 2) driving the liquid crystal layer LQ, and a common electrode CE. The display device DSP6 includes a driver chip DRC1 (see FIG. 24) for supplying a video signal Spic (see FIG. 4) to the pixel electrode PE. As illustrated in FIG. 24, the display device DSP6 is disposed outside the driver chip DRC1, and selects a potential supplied to the common electrode CE serving as the detection electrode Rx, and includes a switch circuit unit SWG including a switch element SWp and a switch element SWn. The display device DSP6 includes a shift register circuit SR connected to the switch circuit unit SWG and a detection unit SE1 for detecting that the object is close or in contact. Each of the switch element SWp and the switch element SWn is selectively turned ON or OFF by the shift register circuit SR, so that the detection unit SE1 is electrically connected with the switch element SWp and the switch element SWn.

While the display device DSP6 detects the touch by using the self-capacitive method as similar to the display device DSP1, the display device DSP6 can also use the mutual-capacitive method. The principle of the self-capacitive method has already explained with reference to FIG. 5 to FIG. 10, and therefore, the overlapping explanation will be omitted. Further, the timing chart of the display processing operation and the touch detection operation of the display device DSP6 are the same as that of FIG. 11.

The display device DSP6 as illustrated in FIG. 24 is different from the display device DSP1 illustrated in FIG. 12 in the arrangement direction of the detection units RxA, RxB, RxC, and the detection unit RxD configured by the plurality of detection electrodes Rx. That is, in the display device DSP6, the detection unit RxA, the detection unit RxB, the detection unit RxC, and the detection unit RxD detected in the detection period FLt (see FIG. 11) at timings different from each other are arranged along the X axis direction.

More specifically, the detection unit RxA configured by a plurality of detection electrodes Rx includes a configuration electrode Rx1A, a configuration electrode Rx2A, a configuration electrode Rx3A, and a configuration electrode Rx4A, which are arranged long the Y axis direction. The detection unit RxB includes a configuration electrode Rx1B, a configuration electrode Rx2B, a configuration electrode Rx3B, and a configuration electrode Rx4B, which are arranged long the Y axis direction. The detection unit RxC includes a configuration electrode Rx1C, a configuration electrode Rx2C, a configuration electrode Rx3C, and a configuration electrode Rx4C, which are arranged long the Y axis direction. The detection unit RxD includes a configuration electrode Rx1D, a configuration electrode Rx2D, a configuration electrode Rx3D, and a configuration electrode Rx4D, which are arranged long the Y axis direction.

In the example as illustrated in FIG. 24, a plurality of switch elements included in the switch circuit unit SWG are distinguished from each other in accordance with the detection unit to which the detection electrode Rx for controlling the ON/OFF operation belongs. More specifically, the switch circuit unit SWG includes a switch circuit unit SWA including a switch element SWp and a switch element SWn connected to each of the configuration electrode Rx1A to the configuration electrode Rx4A. The switch circuit unit SWG includes a switch circuit unit SWB including a switch element SWp and a switch element SWn connected to each of the configuration electrode Rx1B to the configuration electrode Rx4B. The switch circuit unit SWG includes a switch circuit unit SWC including a switch element SWp and a switch element SWn connected to each of the configuration electrode Rx1C to the configuration electrode Rx4C. The switch circuit unit SWG includes a switch circuit unit SWD including a switch element SWp and a switch element SWn connected to each of the configuration electrode Rx1D to the configuration electrode Rx4D. Further, the source electrodes ST (see FIG. 13) of the switch element SWp (first switch element) and the switch element SWn (second switch element) connected to the configuration electrode Rx1A are connected to source wires (the driving signal line TSpL or the guard signal line TSnL) different from each other. On the other hand, the source electrodes ST of the switch element SWp (first switch element) connected to the configuration electrode Rx1A and the switch element SWp (third switch element) connected to the configuration electrode Rx1B are connected to the common source wire.

Figure 25:
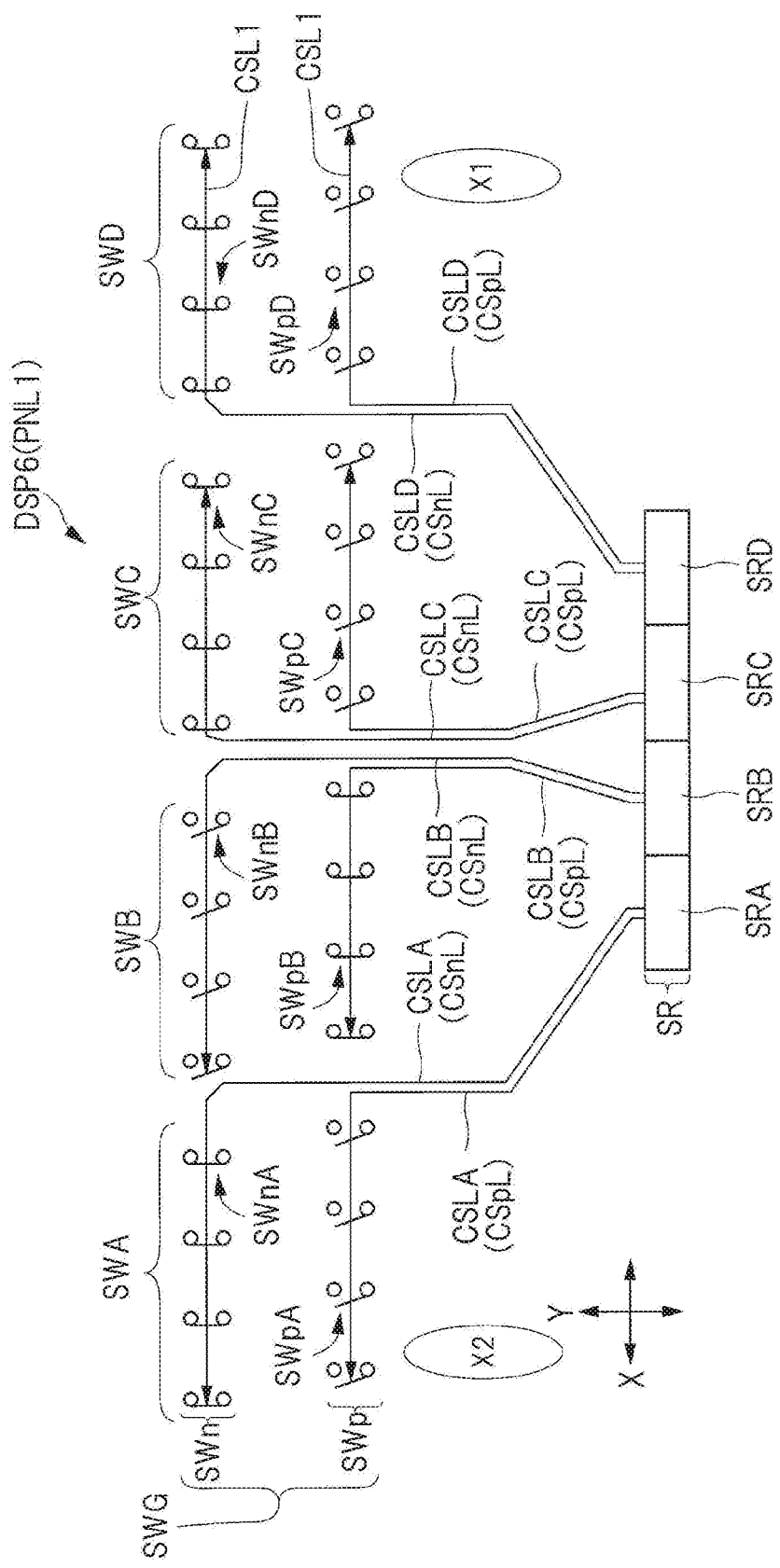
FIG. 25 is a plan view illustrating a plurality of switch elements for detection operation and control signal lines for controlling the ON/OFF operations of the switch elements in the plurality of circuits illustrated in FIG. 24.

As similar to the display device DSP1, in the display device DSP6, the plurality of switch elements SWp and the plurality of switch elements SWn are turned ON during one detection period FLt illustrated in FIG. 11. Here, when FIG. 12 and FIG. 24 are compared with each other, it is found that the display device DSP1 and the display device DSP6 are different from each other in the following points. More specifically, in the case of the display device DSP1 illustrated in FIG. 12, the plurality of switch elements which are in the ON state during one detection period FLt (see FIG. 11) are arranged in the arrangement region of the switch circuit unit SWG so as to widely disperse. On the other hand, in the case of the display device DSP6 illustrated in FIG. 24, the plurality of switch elements SWp which are in the ON state during one detection period FLt (see FIG. 11) are arranged in the arrangement region of the switch circuit unit SWG so as to be gathered in a relatively small region. In other words, in the case of the display device DSP6, a plurality of switch elements SWp which are in the ON state during one detection period FLt are arranged along the X axis direction so as to be adjacent to each other. More specifically, as illustrated in FIG. 25, the plurality of switch elements SWpA connected to the shift register circuit SRA are arranged to be adjacent to each other. FIG. 25 is a plan view illustrating a plurality of switch elements for detection operation and control signal lines for controlling the ON/OFF operations of the switch elements in the plurality of circuits illustrated in FIG. 24. The plurality of switch elements SWnA connected to the shift register circuit SRA are arranged adjacent to each other. Although the repetitive explanation is omitted, the plurality of switch elements SWpB, SWnB, SWpC, SWnC, SWpD, and the plurality of switch elements SWnD are also similarly arranged adjacent to each other.

As described above, when the plurality of switch elements SWp which are in the ON state during one detection period FLt are arranged to be adjacent to each other, the wire path distances of the plurality of control signal lines CSpL supplying the control signals for controlling the ON/OFF operations of the plurality of switch elements SWp can be shortened. Regarding the plurality of switch elements SWn in the case of the display device DSP6, the plurality of switch elements SWn which are in the ON state during one detection period FLt are arranged along the X axis direction so as to be adjacent to each other. Therefore, the wire path distances of the plurality of control signal lines CSnL supplying the control signals for controlling the ON/OFF operations of the plurality of switch elements SWn can be shortened. Hereinafter, this will be explained with reference to FIG. 25.

As illustrated in FIG. 25, the shift register circuit SR includes a shift register circuit SRA for controlling the ON/OFF operation of the switch element SWp and the switch element SWn included in the switch circuit unit SWA. The shift register circuit SRB includes a shift register circuit SRB for controlling the ON/OFF operation of the switch element SWp and the switch element SWn included in the switch circuit unit SWB. The shift register circuit SRC includes a shift register circuit SRC for controlling the ON/OFF operation of the switch element SWp and the switch element SWn included in the switch circuit unit SWC. The shift register circuit SRD includes a shift register circuit SRD for controlling the ON/OFF operation of the switch element SWp and the switch element SWn included in the switch circuit unit SWD. In the detection period FLtA (see FIG. 11), the shift register circuit SRA turns ON switch element SWpA (see FIG. 25) and turns OFF the switch element SWnA. In the detection period FLtB (see FIG. 11), the shift register circuit SRA turns OFF the switch element SWpA (see FIG. 25) and turns ON the switch element SWnA. Although the repetitive explanation is omitted, each of the shift register circuits SRB, SRC, and the shift register circuit SRD controls the ON/OFF operation of the switch element SWp and the switch element SWn connected to the shift register circuit itself as similar to the above description. This point is similar to the display device DSP1 explained with reference to FIG. 14.

Each of the control signal line CSpL and the control signal line CSnL which are the control wires includes a control wire CSLA connected to the shift register circuit SRA, a control wire CSLB connected to the shift register circuit SRB, a control wire CSLC connected to the shift register circuit SRC, and a control wire CSLD connected to the shift register circuit SRD. In other words, each the control wire CSLA, CSLB, CSLC, and control wire CSLD includes the control signal line CSpL and the control signal line CSnL. Although not denoted with reference symbols in FIG. 14 in order to easily see the drawings, the control signal lines CSpL and the control signal lines CSnL connected to the shift register circuit SPA, SRB, SRC, and the shift register circuit SRD illustrated in FIG. 14 correspond to the control wires CSLA, CSLB, CSLC, and the control wire CSLD (see FIG. 25), respectively.

As illustrated in FIG. 25, the switch circuit units SWA, the switch circuit units SWB, SWC, and the switch circuit unit SWD are arranged along the X axis direction. When one side in the X axis direction is defined as X1 side and the other side is defined as X2 side, the main wire units CSL1 of the control wire CSLA and the control wire CSLB extend from the X1 side to the X2 side. On the other hand, the main wire units CSL1 of the control wire CSLC and the control wire CSLD extend from the X2 side to the X1 side. In other words, the main wire units CSL1 of the control wire CSLA and the control wire CSLB and the main wire units CSL1 of the control wire CSLC and the control wire CSLD extend in directions opposite to each other. This structure is different from the structure of the display device DSP1 illustrated in FIG. 12. However, the display device DSP2 explained with reference to FIG. 15 is configured so that one (some) of the plurality of control signal lines and another of the plurality of control signal lines extend in directions opposite to each other.

When one (some) of the plurality of control signal lines and another of the plurality of control signal lines extend in directions opposite to each other as similar to the display device DSP6 illustrated in FIG. 25 and the display device DSP2 illustrated in FIG. 15, the wire path distance of each of the control signal lines can be reduced. For example, in the case of the display device DSP6, the wire path distances of the control signal line CSpL and the control signal line CSnL which are gate wires are shorter than those in the example of the display device DSP1 illustrated in FIG. 12. As explained with reference to FIG. 15, when the wire path distance becomes short, the time constant in the signal transmission path becomes smaller, so that the reliability of the signal transmission is improved.

In the display device DSP6, portions (extension portions extending in the Y axis direction) of the control wire CSLB and the control wire CSLC of the plurality of control wires extend along the Y axis direction between the switch circuit unit SWB and the switch circuit unit SWC arranged adjacent to each other. This structure is different from the structure of the display device DSP1 illustrated in FIG. 12 and the structure of the display device DSP2 illustrated in FIG. 15.

As illustrated in FIG. 24, in the X axis direction, the shift register circuit SR of the display device DSP6 is arranged between the region SLR1 and the region SLR2 which are arrangement regions of the plurality of signal connection wires SCL (see FIG. 1). In this case, from the following viewpoint, each of the control wires CSLA, CSLB, CSLC, and the control wire CSLD is preferable when extending in the Y axis direction between two adjacent ones of the switch circuit units SWA, SWB, SWC, and the switch circuit unit SWD as illustrated in FIG. 25. More specifically, as the viewpoint, each of the control wires CSLA, CSLB, CSLC, and the control wire CSLD does not cross the region SLR1 (see FIG. 24) and the region SLR2 (see FIG. 24) along the X axis direction. This case can have the shorter wiring path distance than that of an aspect in which the control signal line CSpL crosses the region SLR1 or the region SLR2 and extends to the peripheral edge portion of the substrate SUB as seen in the display device DSP1 (see FIG. 12) and the display device DSP2 (see FIG. 15).

For example, each of the switch circuit unit SWB and the switch circuit unit SWC is arranged at the position overlapping the shift register circuit SR in the Y axis direction. A portion of each of the control wire CSLB and the control wire CSLC extends along the Y axis direction between the switch circuit unit SWB and the switch circuit unit SWC, and therefore, the wire path distances of the control wire CSLB and the control wire CSLC are shorter than the wire path distance of other control wires.

The configuration in which the wire path distances of the control wire CSLB and the control wire CSLC are short can also be expressed as follows. More specifically, portions (extension portions extending in the Y axis direction) of the control wire CSLB and the control wire CSLC of the plurality of control wires extend between the region SLR1 and the region SLR2. The switch circuit unit SWB is arranged at a position overlapping the region SLR1 in the Y axis direction, and the switch circuit unit SWC is arranged at a position overlapping the region SLR2 in the Y axis direction.

Portions (extension portions extending in the Y axis direction) of the control wires CSLA of the plurality of control wires overlap the signal connection wire SCL1 of the region SLR1 illustrated in FIG. 24. Portions (extension portions extending in the Y axis direction) of the control wires CSLD of the plurality of control wires overlap the signal connection wire SCL2 of the region SLR2 illustrated in FIG. 24. Each of the signal connection wire SCL1 and the signal connection wire SCL2 is a wire included in the signal connection wires SCL described with reference to FIG. 1 in the first embodiment, and is a video signal wire transmitting a video signal. The switch circuit unit SWA connected to the control wire CSLA is arranged at a position overlapping the region SLR1 in the Y axis direction, and the switch circuit unit SWD connected to the control line CSLD is arranged at a position overlapping the region SLR2 in the Y axis direction. More specifically, since the control wire CSLA extends toward the switch circuit unit SWA to be connected, the wire bypass distance is small. Since the control wire CSLD extends toward the switch circuit unit SWA to be connected, the wire bypass distance is small. More specifically, in the present embodiment, the bypass distances of the control wire CSLA and the control wire CSLB can be reduced, and therefore, the wire path distances of the control wire CSLA and the control wire CSLB can be shortened.

In the display device DSP6, since the detection unit RxA to the detection unit RxD are arranged along the X axis direction, the arrangement of the switch element SWp and the switch element SWn is different from that of the display device DSP1 (see FIG. 12), but the ON OFF control method of each switch is the same as that of the display device DSP1.

For example, in the detection period FLtB illustrated in FIG. 11, the driving signal DSp (see FIG. 11) is supplied via the switch element SWp to the configuration electrode Rx1B to the configuration electrode Rx4B of the plurality of detection electrodes Rx illustrated in FIG. 24. In the detection period FLtB, the guard signal DSn (see FIG. 11) is supplied via the switch element SWn to each of the configuration electrode Rx1A to the configuration electrode Rx4A, the configuration electrode Rx1C to the configuration electrode Rx4C, and the configuration electrode Rx1D to the configuration electrode Rx4D. More specifically, the guard signal DSn is supplied to the non-selected detection electrode Rx. Therefore, the influence of the parasitic capacitance which is possible to occur by the supply of the driving signal DSp to some of the detection electrodes Rx can be reduced.

For example, the switch element SWp includes the switch element SWpA (see FIG. 25) and the switch element SWpB having such a relation that one of them is turned ON when the other is turned OFF in the detection period FLt. The configuration electrode Rx1A to the configuration electrode Rx4A are electrically connected to the switch element SWpA and the switch element SWnA. The switch element SWn includes the switch element SWnA and the switch element SWnB having such a relation that one of them is turned ON when the other is turned OFF in the detection period FLt. The configuration electrode Rx1B to the configuration electrode Rx4B are electrically connected to the switch element SWpB and switch element SWnB. FIG. 25 illustrates the switch elements SWpC, SWpD, SWnC, and the switch element SWnD, but the repetitive explanation is omitted.

The switch element SWp included in the switch circuit unit SWG illustrated in FIG. 24 electrically connects the detection unit SE1 and the detection electrode Rx which belongs to the detection unit selected as a touch detection target in the detection period FLt illustrated in FIG. 11. More specifically, the source electrodes ST (see FIG. 13) of the plurality of switch elements SWp are electrically connected to the detection signal line DSL (also serving as the driving signal line TSpL), and are connected via the detection signal line DSL to the detection unit SE1. As one example, FIG. 24 illustrates a state in which the detection unit RxB is selected. Therefore, in the detection period FLtB (see FIG. 11), each of the configuration electrode Rx1B, the configuration electrode Rx2B, the configuration electrode Rx3B, and the configuration electrode Rx4B which belong to the detection unit RxB is electrically connected to the detection unit SE1 via the switch element SWpB (see FIG. 14) of the plurality of switch elements SWp and the detection signal line DSL. The usage of the wire configuring the detection signal line DSL also as the wire configuring the driving signal line TSpL has been as already described above. As a result, the configuration electrode to be the touch detection target among the plurality of detection electrodes Rx can be selectively connected to the detector DET (see FIG. 9).

In the detection period FLt illustrated in FIG. 11, each switch element SWn included in the switch circuit unit SWG illustrated in FIG. 24 electrically connects the detection unit SE1 which is the supply source of the guard signal DSn (see FIG. 11) and the detection electrode Rx belonging to the detection unit that is not selected as the touch detection target. More specifically, the source electrodes ST (see FIG. 13) of the plurality of switch elements SWn are electrically connected to the guard signal line TSnL, and are connected to the detection unit SE1 via the guard signal line TSnL. As one example, FIG. 24 illustrates a state in which the detection unit RxB is selected. Therefore, in the detection period FLtB as illustrated in FIG. 11, each of the configuration electrode Rx1A to the configuration electrode Rx4A, the configuration electrode Rx1C to the configuration electrode Rx4C, and the configuration electrode Rx1D to the configuration electrode Rx4D which belong to the detection unit RxA is electrically connected to the detection unit SE1 via the switch elements SWnA, SWnC, SWnD (see FIG. 14) of the plurality of switch elements SWn and the guard signal line TSnL. Therefore, the configuration electrode which has not been selected as the touch detection target among the plurality of detection electrodes Rx can be selectively connected to the power supply Vdd (see FIG. 9) as the supply source of the guard signal DSn (see FIG. 11).

As illustrated in FIG. 24, the driving signal line TSpL supplying the driving signal DSp (see FIG. 11) to the switch element SWp and the guard signal line TSnL supplying the guard signal DSn (see FIG. 11) to the switch element SWn extend from the X2 side to the X1 side in the X axis direction. The detection unit SE1 is arranged closer to the X2 side than the driver chip DRC1 in the X axis direction. More specifically, each of the plurality of driving signal lines TSpL and the plurality of guard signal lines TSnL extends to the X2 side closer to the detection unit SE1 in the X axis direction. As a result, the wire path distances of the plurality of driving signal lines TSpL and the plurality of guard signal lines TSnL can be reduced.

The control signal line CSdL transmitting a control signal for controlling the ON/OFF operation of each of the plurality of switch elements SWd extends from the X1 side to the X2 side. The control signal line CSdL is terminated on the X2 side. In other words, the control signal line CSdL extends to the peripheral portion on the X1 side of the substrate SUB1, and the driving signal line TSpL and the guard signal line TSnL extend to the peripheral portion on the X2 side of the substrate SUB1. Therefore, the space of the peripheral portion of the substrate SUB1 can be efficiently used. This point is the feature of the display device DSP6 which is different from the display device DSP1 illustrated in FIG. 12.

In the region SLR1 and the region SLR2 in the case of the display device DSP6, as illustrated in FIG. 24, the driving signal line TSpL and the guard signal line TSnL do not overlap the signal connection wire SCL which is the video signal line. In other words, in a plan view, the driving signal line TSpL and the guard signal line TSnL are arranged so as to bypass the region SLR1 and the region SLR2. As a result, the influence of noises caused by the overlapping of the signal connection wire SCL with the driving signal line TSpL or the guard signal line TSnL can be reduced.

In the case of the display device DSP6, as illustrated in FIG. 24, the plurality of driving signal lines TSpL are arranged so as to be adjacent to each other. The plurality of guard signal lines TSnL are arranged so as to be adjacent to each other. The switch element SWp and the switch element SWn are arranged along the Y axis direction. By this circuit layout, the driving signal line TSpL and the switch element SWp can be connected efficiently, and the guard signal line TSnL and the switch element SWn can be connected efficiently. This point is the feature of the display device DSP6 which is different from the display device DSP1 illustrated in FIG. 12.

In the display device DSP6 according to the present second embodiment, a plurality of wires intersect with each other in a plan view as similar to the display device DSP1 (see FIG. 12) according to the first embodiment. However, as explained above, the display device DSP6 and the display device DSP1 are different from each other in the type of the wire layer in which each wire is arranged because of the difference in the wire layout in a plan view as explained above.

Figure 26:
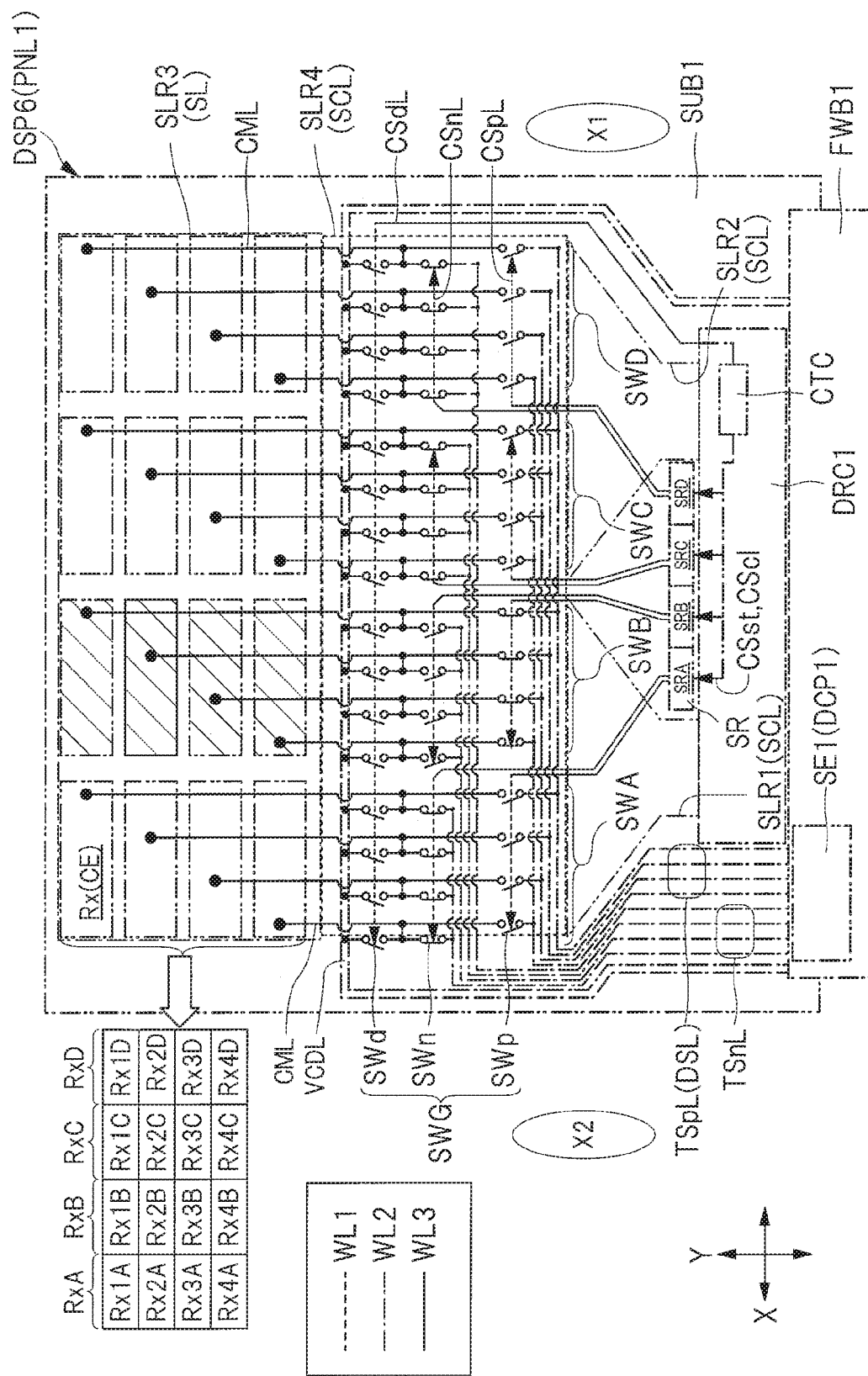
FIG. 26 is a plan view illustrating a plurality of wires illustrated in FIG. 24 so that the wires can be identified for each arranged wire layer.

FIG. 26 is a plan view illustrating a plurality of wires illustrated in FIG. 24 so that the wires can be identified for each wire layer in which the wires are arranged. In FIG. 26, note that a line type of a line is determined based on the same rule as FIG. 16 explained in the first embodiment. For example, a part of the plurality of wires arranged in the wire layer WL1 (see FIG. 2) which is the first layer is indicated by a broken line, a part of the same arranged in the wire layer WL2 (see FIG. 2) which is the second layer is indicated by an alternate long and short dash line, and a part of the same arranged in the wire layer WL3 (see FIG. 2) which is the third layer is indicated by a black solid line. In order to easily see the drawings, for the plurality of signal line SL and the plurality of signal connection wires SCL, FIG. 26 illustrates the regions SLR1 to SLR4 in which these wires are arranged, and reference symbols of the signal line SL and the signal connection wire SCL are attached to these regions.

As illustrated in FIG. 26, the signal connection wire SCL is formed over the plurality of wire layers. More specifically, in the region SLR1 and the region SLR2 connected to the driver chip DRC1, the signal connection wire SCL is arranged in the wire layer WL2 (see FIG. 2) which is the second layer. In the region SLR3 overlapping the display region DA (see FIG. 1), the signal line SL is arranged in the wire layer WL2 (see FIG. 2) which is the second layer. However, in the region SLR4 between the region SLR3 and the region SLR1 and between the region SLR3 and the region SLR2, the signal connection wire SCL is arranged in the wire layer WL1 (see FIG. 17) which is the first layer. This point is that of the same as the display device DSP1 illustrated in FIG. 16.

As explained above, in the case of the display device DSP6, each of the driving signal line TSpL and the guard signal line TSnL does not overlap the signal connection wire SCL in the region SLR1 and the region SLR2. Therefore, in the example as illustrated in FIG. 26, a wire path extending from the portion connected with the flexible wiring board FWB1 to the source electrode ST (see FIG. 13) of the switch element SWp or the switch element SWn is arranged only in the wire layer WL2 (see FIG. 2) which is the second layer. The wire layer WL2 is the same layer as the wire layer in which the signal connection wire SCL is arranged in the region SLR1 and the region SLR2, and the wire layer WL2 is a wire layer whose wire resistance is easier to be reduced than that of the wire layer WL1 (see FIG. 2) as explained above. More specifically, in the present embodiment, each of the driving signal line TSpL and the guard signal line TSnL does not overlap the signal connection wire SCL in the region SLR1 and the region SLR2. Therefore, the wire resistances of the driving signal line TSpL and the guard signal line TSnL can be reduced.

However, as a modification of FIG. 26, the entire of a part of the driving signal line TSpL may be formed in a wire layer different from the wire layer WL2. For example, the entire or a part of the driving signal line TSpL may be arranged in the wire layer WL3 (see FIG. 2).

In the case of the display device DSP6, the main wire unit CSL1 (see FIG. 25) of the control signal line CSpL and the main wire unit CSL1 (see FIG. 25) of the control signal line CSnL are arranged in the wire layer WL1. As explained above, the plurality of switch elements SWp and the plurality of switch elements SWn which are turned ON in one detection period FLt are arranged so as to be adjacent to each other along the X axis direction. Therefore, all of the plurality of switch elements SWp (or the switch elements SWn) adjacent to each other are similarly turned ON or OFF. Accordingly, the number of the main wire unit CSL1 of the control signal line CSdL is only required to be, for example, one for a switch group configured by the plurality of switch elements SWp arranged adjacent to each other. In this case, the wire structure can be simplified, and therefore, the distance of the sub wire unit CSL2 can be reduced as long as the main wire unit CSL1 is formed in the wire layer WL1 (see FIG. 2) in which the gate electrode GE as illustrated in FIG. 13 is formed.

As illustrated in FIG. 26, note that the common potential supply line VCDL and the plurality of common lines CML are similar to the example explained with the display device DSP1 illustrated in FIG. 16. The overlapping portions of the control signal line CSpL and the control signal line CSnL with the signal connection wire SCL in a plan view are similar to those explained with the display device DSP1 illustrated in FIG. 16. Therefore, the overlapping explanation is omitted.

Modification of Second Embodiment

The display device DSP6 according to the present embodiment includes not only the modification explained above but also various modifications. A typical modification of the present first embodiment will be explained below. As explained above, note that either one of the display device explained in the present second embodiment and the display device DSP1 explained in the first embodiment to the other as a relation of the modification. Therefore, the modifications explained in the first embodiment can be combined and applied. Hereinafter, typical modifications of the present second embodiment will be described. Only differences will be mainly explained in modifications to which a technical concept of the modifications already explained in the first embodiment can be applied.

In the display device DSP6 illustrated in FIG. 24, a plurality of switch elements SWd are included in the switch circuit unit SWG. However, as similar to the display device DSP3 illustrated in FIG. 20 explained in the first embodiment, a plurality of switch elements SWd may not be included in the switch circuit unit SWG, and may be formed at a position away from the switch element SWp and the switch element SWn.

Although illustration and the overlapping explanation are omitted, as the modification of the display device DSP6 illustrated in FIG. 24, the switch element SWd may be arranged in a region other than the region between a plurality of detection electrodes Rx and the driver chip DRC1 as seen in the display device DSP3 illustrated in FIG. 20. This case can have the smaller separation distance between the display region DA (see FIG. 1) and the driver chip DRC1 than that of the display device DSP6 illustrated in FIG. 24. Therefore, the width of the non-display region NDA (see FIG. 1) between the display region DA (see FIG. 1) and the driver chip DRC1 can be reduced.

In the case of the display device DSP6 explained with reference to FIG. 24, the wire widths of a plurality of driving signal lines TSpL and a plurality of guard signal lines TSnL are the same as each other. However, as explained with reference to FIG. 22 and FIG. 23 in the first embodiment, the wire widths of the plurality of driving signal lines TSpL and the plurality of guard signal lines TSnL may be different from each other. For example, as explained with reference to FIG. 22, the wire width TWn of each of the guard signal lines TSnL may be wider than the wire width TWp of each of the driving signal lines TSpL. In this case, the guard signal line TSnL has a lower wire resistance than that of the driving signal line TSpL. As similar to the explanation in the first embodiment, the guard signal line TSnL supplies the guard signal DSn (see FIG. 11) to the non-selected detection electrodes Rx (see FIG. 24). In this case, as compared with the driving signal line TSpL, the guard signal DSn is supplied to many detection electrodes Rx at the same time. Therefore, the waveform of the guard signal DSn can be stabilized by reducing the wire resistance of the guard signal line TSnL.

In FIG. 21 and FIG. 22 explained in the first embodiment, note that the driving signal line TSpL and the guard signal line TSnL are alternately arranged. This becomes the layout of the display device DSP6 when the plurality of driving signal lines TSpL and the plurality of guard signal lines TSnL are arranged so as to be adjacent to each other as illustrated in FIG. 24. Therefore, illustration of the drawings corresponding to FIG. 21 and FIG. 22 is omitted.

Figure 27:
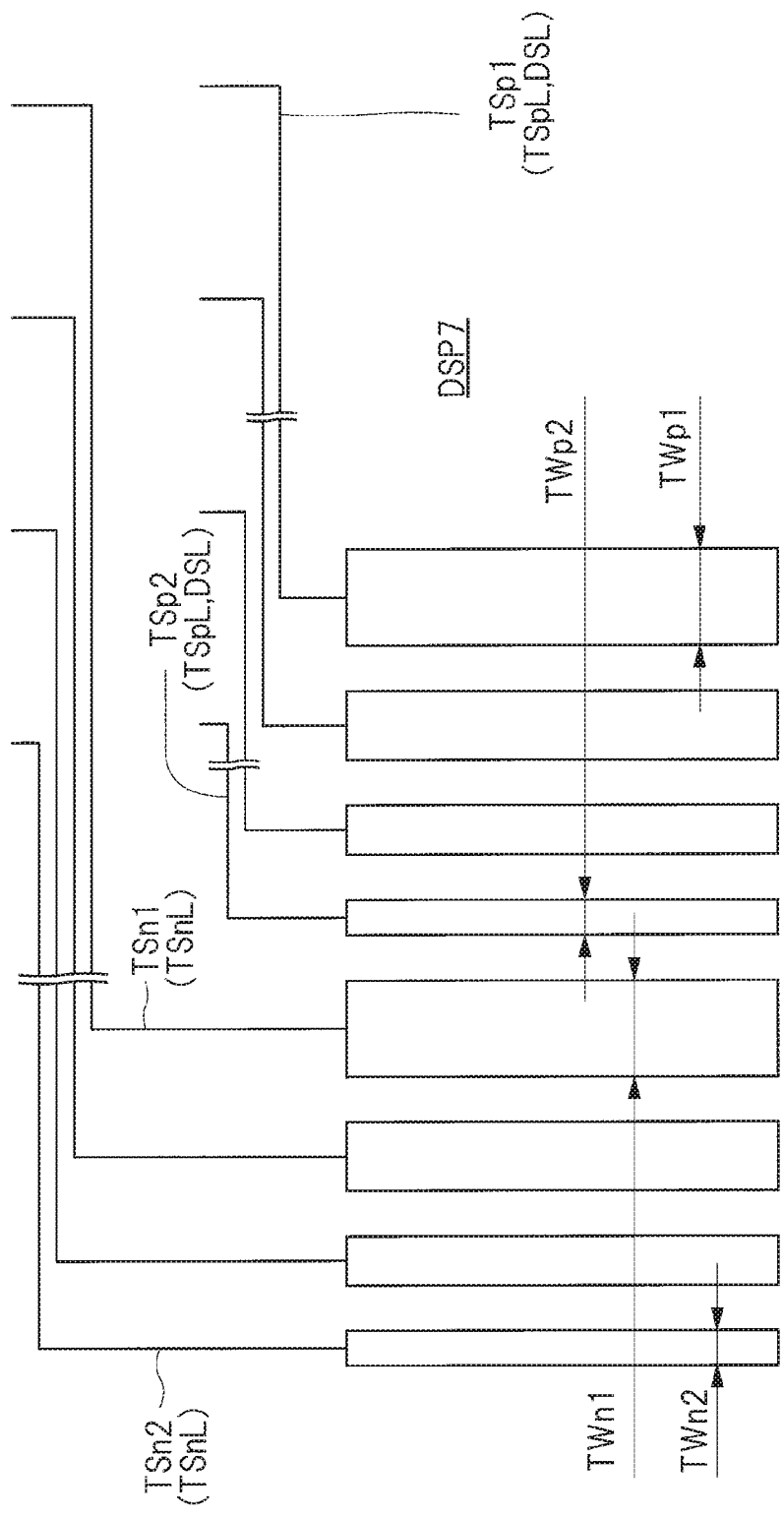
FIG. 27 is an enlarged plan view illustrating a portion of the driving signal lines and the guard signal lines of the display device according to the modification of FIG. 24 so as to be enlarged.

FIG. 27 is an enlarged plan view illustrating a part of the driving signal lines and the guard signal lines of a display device according to a modification of FIG. 24. In the case of the display device DSP7 illustrated in FIG. 27, the wire width TWp1 of the driving signal line TSp1 is wider than the wire width TWp2 of the driving signal line TSp2. In other words, the driving signal line TSp1 has a lower wire resistance than that of the driving signal line TSp2. In addition, the wire width TWn1 of the guard signal line TSn1 is wider than the wire width TWn2 of the guard signal line TSn2. In other words, the guard signal line TSn1 has a lower wire resistance than that of the guard signal line TSn2. In the example illustrated in FIG. 27, the wire path distance of the driving signal line TSp1 is longer than the wire path distance of the driving signal line TSp2. In this case, the waveform of the detection signal or the driving signal DSp (see FIG. 11) flowing through the driving signal line TSp1 can be stabilized by reducing the wire resistance of the driving signal line TSp1. The wire path distance of the guard signal line TSn1 is longer than the wire path distance of the guard signal line TSn2. In this case, the waveform of the guard signal DSn (see FIG. 11) flowing through the guard signal line TSn1 can be stabilized by reducing the wire resistance of the guard signal line TSn1.

Figure 28:
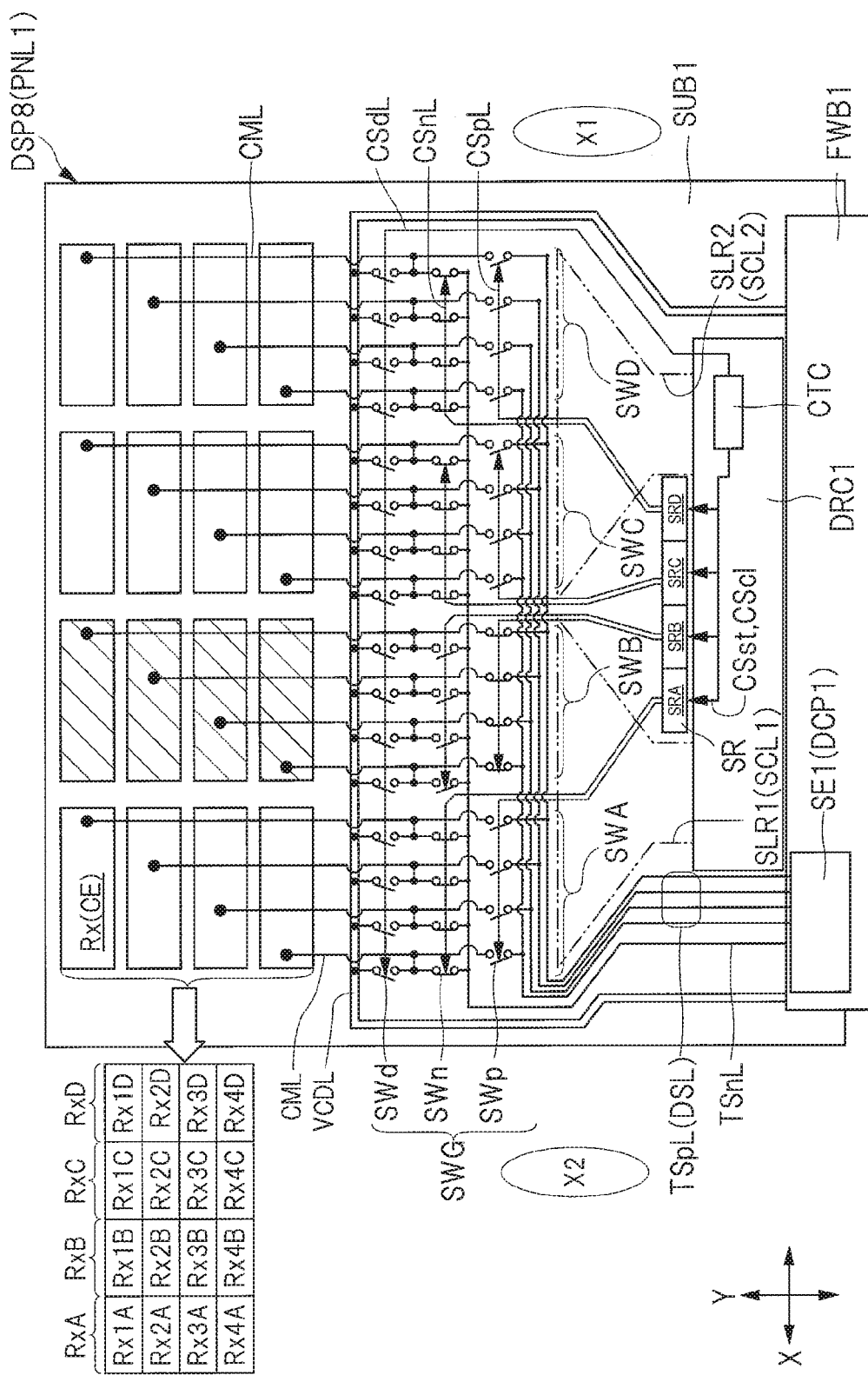
FIG. 28 is a plan view illustrating a modification of the display device illustrated in FIG. 24.

In the example as illustrated in FIG. 24, the number of driving signal lines TSpL and the number of guard signal lines TSnL are the same as each other. However, as similar to a display device DSP8 illustrated in FIG. 28, the number of guard signal lines TSnL may be smaller than the number of driving signal lines TSpL (i.e., detection signal lines DSL). FIG. 28 is a plan view illustrating a modification of the display device illustrated in FIG. 24. As similar to the display device DSP6 illustrated in FIG. 24, in a plan view in the display device DSP8, the guard signal line TSnL does not overlap the region SLR1 and the region SLR2, and extends to the peripheral edge portion on the X2 side of the substrate SUB1. The number of the guard signal line TSnL is only required to be one because of only supplying the guard signal DSn (see FIG. 11) to the non-selected detection electrodes Rx. Therefore, in the present embodiment, the number of guard signal lines TSnL can be smaller than the number of driving signal line TSpL as similar to the display device DSP8. When the number of guard signal lines TSnL is small, the space where the guard signal lines TSnL are arranged can be narrowed. Therefore, in the Y axis direction, the distance between the driver chip DRC1 and the display region DA (see FIG. 1) can be reduced.

However, as explained above, in one detection period FLt (see FIG. 11), the guard signal line TSnL supplies the guard signal DSn is supplied to many detection electrodes Rx at the same time as compared with the driving signal line TSpL. Therefore, the waveform of the guard signal DSn can be stabilized by reducing the wire resistance of the guard signal line TSnL. Therefore, as illustrated in FIG. 28, when the number of guard signal lines TSnL is small, the wire width of the guard signal line TSnL is particularly preferable to be wider than the wire width of the driving signal line TSpL.

As the difference between the waveform of the guard signal DSn illustrated in FIG. 11 and the waveform of the driving signal DSp is smaller, the occurrence of the parasitic capacitance can be further reduced. Therefore, from a viewpoint in an attempt to provide the same signal waveform by forming the wire path of the guard signal line TSnL and the wire path of the driving signal line TSpL to be similar to each other in a wire shape, the number of driving signal lines TSpL and the number of guard signal lines TSnL are preferably the same as each other as illustrated in FIG. 24.

In the foregoing, the invention made by the present inventors has been concretely described based on the embodiments. However, it is needless to say that the present invention is not limited to the foregoing embodiments and various modifications and alterations can be made within the scope of the present invention.

For example, in the above-described embodiments, the case of the liquid crystal display device has been exemplified as the disclosure example. However, as another application example, various types of flat-panel display devices such as an organic EL display device, other self-luminous type display device, and an electronic-paper type display device having an electrophoretic element can be exemplified. And, it is needless to say that the present invention is applicable to display devices ranging from small- or middle-sized one to large one without any particular limitation.

In the scope of the concept of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

The present invention is effectively applied to a display device having an input device or an input detection function.

What is claimed is:

1. A display device comprising:
an electro-optical layer;
a plurality of driving electrodes arranged in a first direction;
a driver chip outputting a video signal;
a switch circuit, formed outside of the driver chip, and including a plurality of first switch elements and a plurality of second switch elements;
a plurality of control signal line connecting to the switch circuit; and
a detection circuit detecting a touch or an approach of an object,
wherein each of the plurality of first switch elements and each of the plurality of second switch elements is controlled by a signal supplied by the plurality of control signal lines respectively,
the detection circuit is electrically connected to the plurality of driving electrodes by the plurality of first switch elements respectively,
each of the plurality of second switch elements supplies a pulse signal to the plurality of driving electrodes respectively,
the plurality of first switch elements are arranged in a same line which is along a second direction intersecting with the first direction,
the plurality of second switch elements are arranged in a same line which is along the second direction,
a row of the plurality of first switch elements and a row of the plurality of second switch elements are arranged in the first direction, and
a width in a second direction of the row of the plurality of first switch elements and second switch elements is smaller than that of the plurality of driving electrodes.

2. The display device according to claim 1,
wherein one of the plurality of first switch elements and one of the plurality of second switch elements are arranged in the first direction and make a pair of switch elements.

3. The display device according to claim 2,
wherein a first switch element of the pair of switch elements and a second switch element of the pair of switch elements are electrically connected by a common electrode.

4. The display device according to claim 3,
wherein a plurality of common electrodes are formed between the plurality of first switch elements and the plurality of second switch elements.

5. The display device according to claim 4,
wherein one of the plurality of common electrodes and one of the plurality of driving electrodes are electrically connected by a connecting line.

6. The display device according to claim 5,
wherein each of the plurality of driving electrodes and the connecting line are electrically connected by a connecting portion.

7. The display device according to claim 6,
wherein a plurality of connecting portions is arranged in a third direction which is inclined to the first direction and the second direction.

8. A display device comprising:
an electro-optical layer;
a plurality of driving electrodes arranged in a first direction;
a driver chip outputting a video signal;
a switch circuit formed outside of the driver chip and including a plurality of first switch elements and a plurality of second switch elements;
a plurality of control signal line connecting to the switch circuit; and
a detection circuit detecting a touch or an approach of an object,
wherein each of the plurality of first switch elements and each of the plurality of second switch elements is controlled by a signal supplied by the plurality of control signal lines respectively,
the detection circuit is electrically connected to the plurality of driving electrodes by the plurality of first switch elements respectively,
each of the plurality of second switch elements supplies a pulse signal to the plurality of driving electrodes respectively,
the plurality of first switch elements are arranged in a same line which is along a second direction intersecting with the first direction,
the plurality of second switch elements are arranged in a same line which is along the second direction,
a row of the plurality of first switch elements and a row of the plurality of second switch elements are arranged in the first direction,
one of the plurality of first switch elements and one of the plurality of second switch elements are arranged in the first direction and make a pair of switch elements,
a first switch element of the pair of switch elements and a second switch element of the pair of switch elements are electrically connected by a common electrode, and
a plurality of the common electrodes are arranged in the second direction.

9. The display device according to claim 8,
wherein a width in a second direction of the row of the plurality of first switch elements and second switch elements is smaller than that of the plurality of driving electrodes.

10. The display device according to claim 8,
wherein one of the plurality of common electrodes and one of the plurality of driving electrodes are electrically connected by a connecting line.

11. The display device according to claim 10,
wherein each of the plurality of driving electrodes and the connecting line are electrically connected by a connecting portion.

12. The display device according to claim 11,
wherein a plurality of connecting portions is arranged in a third direction which is inclined to the first direction and the second direction.

* * * * *